US007738886B1

(12) United States Patent
Connolly et al.

(10) Patent No.: US 7,738,886 B1
(45) Date of Patent: Jun. 15, 2010

(54) WIRELESS DIGITAL PERSONAL COMMUNICATIONS SYSTEM HAVING VOICE/DATA/IMAGE TWO-WAY CALLING AND INTERCEL HAND-OFF

(75) Inventors: David A. Connolly, Arlington Heights, IL (US); Lewis Holt, Barrington, IL (US); Morris W. Westerhold, Naperville, IL (US); Samuel N. Zellner, Hoffman Estates, IL (US); Frank A. Ciannella, Jr., South Holland, IL (US); Ronald L. Czaplewski, Glendale Heights, IL (US); Gary J. Bannack, Glendale Heights, IL (US); Kenneth B. Hallman, Arlington Heights, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 08/926,187

(22) Filed: Sep. 9, 1997

Related U.S. Application Data

(63) Continuation of application No. 08/328,356, filed on Oct. 24, 1994, now abandoned, which is a continuation-in-part of application No. 08/184,298, filed on Jan. 21, 1994, now abandoned, which is a continuation of application No. 08/000,363, filed on Jan. 4, 1993, now Pat. No. 5,325,419.

(51) Int. Cl.
*H04Q 7/22* (2006.01)

(52) U.S. Cl. ........................ 455/461; 455/435; 455/411

(58) Field of Classification Search ................... 379/58, 379/59, 61, 62, 63, 60; 455/33.1, 33.2, 54.1, 455/54.2, 53.1, 56.1, 403, 422, 461, 435, 455/436, 524, 550, 410–411, 450; 370/431, 370/433, 442, 522, 437; 380/28, 46, 47
See application file for complete search history.

(56) References Cited

U.S. PATENT DOCUMENTS 4,775,997 A * 10/1988 West, Jr. et al. ............... 379/58

(Continued)

*Primary Examiner*—William G Trost
(74) *Attorney, Agent, or Firm*—Toler Law Group

(57) ABSTRACT

A wireless digital personal communications system (or PCS) having a plurality of radio cell base stations, fixed terminals, and portable handset terminals, each having a predetermined radio cell coverage area. The wireless PCS has a full digital network interface. The personal communications system facilitates the interconnection and switching of PCS call traffic through the digital network interface and the public switched telephone network, or any switched network. The personal communications system has voice/data/image (or any combination thereof) and incoming and outgoing calling capability. The PCS is fully operational and compatible with any and all modulation approaches selected for wireless communications. The intercell protocol hand-off being provided through distributed logic which is implemented in software that is resident in the intelligent portable handset terminals, in the intelligent fixed terminals, in the intelligent base stations, and in the public switched telephone network (or any switched network). Alternative embodiments of the present invention include a wireless digital personal communications system having authentication means for authenticating a remote device; a wireless digital personal communications system having a combination of authentication means for authenticating a remote device and security means for securing signal and message content between an intelligent base station and a remote device, the security means including a predetermined encryption and decryption technique; a wireless digital personal communications system having dynamic zone grouping of portable handset terminals or fixed terminals; and a wireless digital personal communications system having call forwarding for unanswered calls.

27 Claims, 24 Drawing Sheets

U.S. PATENT DOCUMENTS 4,777,646 A * 10/1988 Harris ...................... 379/59 X
4,890,315 A * 12/1989 Bendixen et al. .............. 379/59
5,260,988 A * 11/1993 Schellinger et al. ........... 379/59
5,325,419 A * 6/1994 Connolly et al. .............. 379/60
5,329,578 A * 7/1994 Brennan et al. ........... 379/59 X
5,428,668 A * 6/1995 Dent et al. .................... 379/59

* cited by examiner

WIRELESS DIGITAL PERSONAL COMMUNICATIONS SYSTEM HAVING VOICE/DATA/IMAGE TWO-WAY CALLING AND INTERCEL HAND-OFF

This application is a continuation of application Ser. No. 08/328,356, filed Oct. 24, 1994, now abandoned, which is a continuation-in-part of U.S. patent application Ser. No. 08/184,298 filed Jan. 21, 1994, now abandoned, which is a continuation of application Ser. No. 08/000,363, filed Jan. 4, 1993, now U.S. Pat. No. 5,325,419, titled "Wireless Digital Personal Communications System Having Voice/Data/Image Two-Way Calling And Intercell Hand-Off Provided Through Distributed Logic Resident In Portable Handset Terminals, Radio Cell Base Stations and Switched Telephone Network" and is assigned to the assignee of the present invention.

BACKGROUND OF THE INVENTION

This invention relates generally to a wireless digital personal communications systems having a plurality of intelligent base stations, intelligent portable handset terminals, and intelligent fixed terminals, each having a predetermined radio cell coverage area, and more particularly to a digital, radio cell, radio-telephone, personal communications system (or PCS) having a full ISDN interface (or any standardized digital network interface), thereby facilitating direct interconnection and switching of PCS call traffic through the ISDN interface and the Public Switched Telephone Network (PSTN), or any switched network, the personal communications system having voice/data/image (or any combination thereof) and two-way full-duplex incoming and outgoing calling capability, and being fully operational and compatible with any modulation approach selected for wireless communications, with the intercell protocol hand-off being provided through distributed logic which is implemented in software that is resident in the intelligent base stations, intelligent portable handset terminals, intelligent fixed terminals, and the public switched telephone network (or any switched network) equipped with a PCS service control data base.

SUMMARY OF THE INVENTION

The increasing availability of mobile, portable, and fixed communications over the past decade is freeing business and residential users from the physical constraints of a totally wired telecommunications network. Particularly, cellular communications systems, together with paging and other complementary services (for example, call forwarding, voice mail, facsimile, electronic mail, etc.) has brought true mobility to telecommunications services for the first time. Significant technical advances in mobile, portable and fixed wireless technologies, as well as in new technologies such as digital transmission with respect to wireless telecommunications, have substantially expanded the number and types of wireless telecommunications services utilizing the radio spectrum that can be made available to the user. These prospective services include, but are not limited to, advanced forms of cellular telephone service, advanced digital cordless telephone service, portable facsimile services, wireless CENTREX and other switching center basic services, wireless private branch exchange services, and wireless local area network services, etc., and may be used through the existing public switched telephone network, or any switched network, or through alternative local wired networks (for example, cable television systems). As such, digital personal communications systems can exist independently of, and in conjunction with, local wired networks, filling gaps that are existing in current communications systems, and also in creating important new markets, many of which are yet to be defined. The advent of PCS will have a great impact on the future development and configuration of all telecommunications networks by significantly improving their flexibility and functionality. Accordingly, providers of PCS will have the ability to reach and serve existing and new markets nationally in an economic and responsive manner. It would be an advantage to construct a digital PCS network that could share the functionality of the Public Switched Telephone Network through a standardized digital interface (for example, ISDN), or any standardized digital interface, that may currently exist, or are expected to exist, to effectively and efficiently provide a broad set of standardized functions.

Personal communications requirements in the United States are rapidly changing as the demand for instantaneous communications increases due to the increased mobility of the user. One of the advantages of PCS is that it will use a portable or fixed communications device, as well as a plurality of communications devices, to reach anyone, anytime, anywhere. PCS will facilitate increased mobility and flexibility of the user, since this approach solves the underlying problem of being in constant communications with the user. PCS wireless will enable users not to miss important calls, as well as reduce the time and expense in returning calls. PCS combines the functionality of radio communications and the Public Switched Telephone Network technologies and infrastructure, and will accommodate full-duplex capabilities (two-way incoming and outgoing calling) and hand-off between radio cells (allowing users to freely move from one radio cell to another without interrupting the user's call within one switching center).

It is important to remember that there has been a steady increasing demand for new PCS services and technologies for numerous, sometimes incompatible, applications, namely, wireless private branch exchanges, smaller lighter portable cellular phones, portable fax machines, multi-channel cordless telephones, fixed terminals, etc., and additional services which are targeting the facilitation of contacting a particular individual user (rather than contacting a particular station). Current radio equipment and related services presently offered (i.e., cordless telephones, radio paging, and existing cellular radio) cannot fully meet the demands for these new types of PCS services. For example, cordless telephones are used in and around the home or office, operate on only a very few channels (10 or so) and are limited to use in the immediate vicinity of its associated base station. Radio paging services are only one-way and have limited capabilities. Cellular and specialized mobile radio services cannot meet the full range of expected demand for PCS. Generally speaking, PCS will facilitate communications equipment with additional features or functionality. Over time, PCS will have standardized equipment having common modules in hardware resulting in the improved quality and reliability in the associated equipment and which will also be less vulnerable to transient interference from external sources, have automatic call registration, automatic call forwarding, voice mail, faxing capability, easy roaming features, remote data transfer, increased privacy protection/caller ID/class services, increased battery life, and common protocols. Further, wireless PCS may eventually eliminate the need to have a building hardwired for communications.

In order to best fulfill this marketplace mandate, a digital PCS is a necessity. A digital PCS will facilitate technical advances and improvements in underlying communications equipment, systems and design. Presently, various digital personal communications systems are known in the art, none of which will allow direct interconnection and full featured switching of PCS call traffic through an ISDN interface, or any standardized digital interface, and the Public Switched Telephone Network, or any switched network. Accordingly, it would be advantageous for any PCS to have a ISDN interface, or any standardized digital interface, to connect a particular radio cell with the Public Switched Telephone Network, or any switched network, thereby allowing direct interconnection and switching of PCS call traffic through the ISDN interface, or any standardized digital interface, and the Public Switched Telephone Network, or any switched network.

Similarly, with respect to the various digital personal communications systems known in the art, none have the ability to directly handle user registration with the Public Switched Telephone Network (or any switched network), user validation by the Public Switched Telephone Network (or any switched network), voice/data/image information (or any combination thereof), and two-way full-duplex incoming and outgoing calling, and the capability of hand-off from one radio cell to a another radio cell via the public switched telephone network (or any switched network). Accordingly, it would be advantageous for any PCS to have these multiple capabilities and functionalities.

Another possible advantage would be if a digital PCS could be developed which would have a rather simplified system architecture resulting in associated logic being distributed, rather than being centralized. For example, it would be advantageous if a digital PCS could be developed which had its associated logic resident in the portable handset terminals, in the fixed terminals, in the radio cell base stations, and in the Public Switched Telephone Network (or in any switched network), thereby allowing the portable handset terminal, or the fixed terminal, to seek radio cell hand-off whenever required.

Accordingly, it is an object of the present invention to provide a novel and improved wireless digital personal communications system that will have incoming or outgoing call capability for either voice/data/image information, or any combination thereof.

Another object of the present invention is to provide a novel and improved wireless digital personal communications system that will have a standard ISDN interface (or any standardized digital network interface) for connecting at least one radio cell with the Public Switched Telephone Network, or any switched network.

It is another object of the present invention to provide a novel and improved wireless digital personal communications system that will facilitate the direct interconnection and switching of PCS call traffic through the ISDN interface (or any standardized digital network interface) and the Public Switched Telephone Network, or any switched network.

It is still another object of the present invention to provide a novel and improved wireless digital personal communications system that will facilitate, but not be limited to, the direct interconnection and switching of PCS call traffic through the ISDN interface (or any standardized digital network interface) and the Public Switched Telephone Network, or any switched network, and not require an adjunct control unit located between the radio cell base station and the Public Switched Telephone Network, or any switched network.

It is still a further object of the present invention to provide a novel and improved wireless digital personal communications system that will be able to convert ISDN protocol (or the associated protocol for any standardized digital network interface) to a second protocol that provides interconnection to the distributed data base.

It is still a further object of the present invention to provide a novel and improved wireless digital PCS which can control the signaling information sent to the Public Switched Telephone Network, or any switched network from the portable handset terminals, or the fixed terminals, through the use of a dynamic zone grouping concept.

It is still another object of the present invention to provide a novel and improved wireless digital personal communications system having the ability to authenticate portable handset terminals, or fixed terminals, to validate their identity.

It is still a further object of the present invention to provide a novel and improved wireless digital personal communications system to encrypt information being transmitted between the portable handset terminals, or the fixed terminals, and the radio cell base station.

It is still another object of the present invention to provide a novel and improved wireless digital personal communications system that will have a distributed and partitioned Service Control Point data base, or PCS data base, containing portable handset terminal feature profiles, and fixed terminal feature profiles, and maintaining the location registration data for each portable handset terminal, and each fixed terminal.

It is yet another object of the present invention to provide a novel and improved wireless digital personal communications system having the radio cell protocol hand-off being provided through distributed logic implemented in software that is resident in the intelligent portable handset terminals, in the intelligent fixed terminals, in the intelligent base stations, and in the Public Switched Telephone Network (or any switched network), equipped with a PCS service control point data base.

It is yet a further object of the present invention to provide a novel and improved wireless digital personal communications system having a simplified architecture with respect to system equipment and hardware, and software configuration requirements, and yet will be fully operational and compatible with any modulation approach selected for the wireless communications that is utilized by the equipment and hardware in the system.

It is yet another object of the present invention to provide a novel and improved wireless digital personal communications system having portable handset terminals, fixed terminals, radio cell base stations, and the Public Switched Telephone Network (or any switched network) which will have increased reliability and flexibility, and which will fulfill anticipated demand for new state-of-the-art cellular communication products aimed at increasing personal communications with the user.

Briefly, according to one embodiment of the present invention there is provided a wireless digital personal communications system, said system having a plurality of predetermined areas of radio cell coverage, said system having incoming and outgoing calling capability for either voice/data/image information, or any combination thereof, said system having an ISDN interface which allows for the interconnection and switching of wireless traffic through a switched network and for connecting at least one radio cell with a switched network, said system having a service control point data base using transaction application protocols, said system having intercell hand-off provided through distributed logic that is resident in the portable handset terminals, distributed logic that is resident in the fixed terminals, distributed logic that is resident in the radio cell base stations, and distributed logic that is resident at predetermined locations in the switched network, said system comprising in combination: a plurality of radio cell base station means, each radio cell base station means having a predetermined radio cell coverage area, each radio cell base station means having means for receiving and transmitting signal messages and a plurality of communications messages, each radio cell base station means including: means for digital communications with the ISDN interface; means for assigning a communications channel to a specific portable handset terminal means in the coverage area from a plurality of available communications channels; means for assigning a communications channel to a specific fixed terminal means in the coverage area from a plurality of available communications channels; means for registration of a portable handset terminal means within a radio cell coverage area for incoming or outgoing calling on the assigned communications channel; means for registration of a fixed terminal means within a radio cell coverage area for incoming or outgoing calling on the assigned communications channel; means for effectuating communications between each portable handset terminal means in said radio cell coverage area and a switched network means; and means for effectuating communications between each fixed terminal means in said radio cell coverage area and a switched network means; a plurality of portable handset terminal means, each portable handset terminal means operatively disposed with said radio cell base station means, each portable handset terminal means having means for receiving and transmitting signal messages and a plurality of communications messages, each portable handset terminal means including: means for initially selecting a radio cell base station means for registration of the portable handset terminal means with a switched network means; means for selecting a communications channel of an operatively disposed radio cell base station means by scanning the available channels, comparing the quality of the signals, and then selecting the communications channel based upon said comparison; and means for seeking and determining an intercell hand-off from an existing radio cell base station means to a second radio cell base station means; a plurality of fixed terminal means, each fixed terminal means operatively disposed with said radio cell base station means, each fixed terminal means having means for receiving and transmitting signal messages and a plurality of communications messages, each fixed terminal means including: means for initially selecting a radio cell base station means for registration of the fixed terminal means with a switched network means; means for selecting a communications channel of an operatively disposed radio cell base station means by scanning the available channels, comparing the quality of the signals, and then selecting the communications channel based upon said comparison; and means for seeking and determining an intercell hand-off from an existing radio cell base station means to a second radio cell base station means; at least one switched network means, each switched network means operatively disposed with said radio cell base station means, each switched network means including: means for connecting the digital network to each of the radio cell base station means to the switched network means; means for effectuating intercell hand-off from a first radio cell coverage area to a second radio cell coverage area; means for converting a first predetermined digital network protocol to a second protocol for interconnection to a service control point data base means; and means for determining and accepting calls to and from a plurality of switched networks means; and a service control point data base means including: means for registration of the portable handset terminal means with a specific radio cell coverage area; and means for registration of the fixed terminal means with a specific radio cell coverage area, whereby the personal communications system facilitates interconnection and switching of wireless call traffic through the ISDN interface and the public switched telephone network, or any switched network.

Alternative embodiments of the PCS built in accordance with the present invention further include a wireless digital personal communications system having authentication means for authenticating a remote device; a wireless digital personal communications system having authentication means for authenticating a remote device and security means for securing signal and message content between an intelligent base station and a remote device, the security means including a predetermined encryption and decryption technique; a wireless digital personal communications system having dynamic zone grouping of fixed terminals and/or portable handset terminals or any combination thereof; and a wireless digital personal communications system having call forwarding for unanswered calls.

In practicing a second embodiment of the present invention also includes a wireless digital personal communications system, said system having a plurality of predetermined areas of radio cell coverage, said system having incoming and outgoing calling capability for either voice/data/image information, or any combination thereof, said system having an ISDN interface which allows for the interconnection and switching of wireless traffic through a switched network and for connecting at least one radio cell with a switched network, said system having a service control point data base using transaction application protocols, said system having intercell hand-off provided through distributed logic that is resident in the portable handset terminals, distributed logic that is resident in the fixed terminals, distributed logic that is resident in the radio cell base stations, and distributed logic that is resident at predetermined locations in the switched network, said system comprising in combination: a plurality of radio cell base station sites having at least one radio cell base station means, each site having a predetermined radio cell coverage area, each radio cell base station means having a predetermined radio cell coverage area, each radio cell base station means having means for receiving and transmitting signal messages and a plurality of communications messages, each radio cell base station means including: means for digital communications with the ISDN interface; means for assigning a communications channel to a specific portable handset terminal means in the coverage area from a plurality of available communications channels; means for assigning a communications channel to a specific fixed terminal means in the coverage area from a plurality of available communications channels; means for registration of a portable handset terminal means within a radio cell coverage area for incoming or outgoing calling on the assigned communications channel; means for registration of a fixed terminal means within a radio cell coverage area for incoming or outgoing calling on the assigned communications channel; means for effectuating communications between each portable handset terminal means in said radio cell coverage area and a switched network means; and means for effectuating communications between each fixed terminal means in said radio cell coverage area and a switched network means; a plurality of portable handset terminal sites, each portable handset terminal site operatively disposed initially with an associated radio cell base station site, each portable handset terminal site having a predetermined radio cell reception area, each portable handset terminal site having a plurality of portable handset terminal means, each radio cell reception area having a predetermined relationship with respect to said radio cell coverage area, each portable handset terminal means having means for receiving and transmitting signal messages and a plurality of communications messages, each portable handset terminal means including: means for initially selecting a radio cell base station means for registration of the portable handset terminal means with a switched network means; means for selecting a communications channel of an operatively disposed radio cell base station means by scanning the available channels, comparing the quality of the signals, and then selecting the communications channel based upon said comparison; and means for seeking and determining an intercell hand-off from an existing radio cell base station means to a second radio cell base station means; a plurality of fixed terminal sites, each fixed terminal site operatively disposed initially with an associated radio cell base station site, each fixed terminal site having a predetermined radio cell reception area, each fixed terminal site having a plurality of fixed terminal means, each radio cell reception area having a predetermined relationship with respect to said radio cell coverage area, each fixed terminal means having means for receiving and transmitting signal messages and a plurality of communications messages, each fixed terminal means including: means for initially selecting a radio cell base station means for registration of the fixed terminal means with a switched network means; means for selecting a communications channel of an operatively disposed radio cell base station means by scanning the available channels, comparing the quality of the signals, and then selecting the communications channel based upon said comparison; and means for seeking and determining an intercell hand-off from an existing radio cell base station means to a second radio cell base station means; at least one switched network means, each switched network means operatively disposed with said radio cell base station means, each switched network means including: means for connecting the digital network to each of the radio cell base station means to the switched network means; means for effectuating intercell hand-off from a first radio cell coverage area to a second radio cell coverage area; means for converting a first predetermined digital network protocol to a second protocol for interconnection to a service control point data base means; and means for determining and accepting calls to and from a plurality of switched networks means; and a service control point data base means including: means for registration of the portable handset terminal means with a specific radio cell coverage area; and means for registration of the fixed terminal means with a specific radio cell coverage area, whereby the personal communications system facilitates interconnection and switching of wireless call traffic through the ISDN interface and the public switched telephone network, or any switched network.

Alternative embodiments for the PCS built in accordance with the present invention further include a wireless digital personal communications system having authentication means for authenticating a remote device; a wireless digital personal communications system having authentication means for authenticating a remote device and security means for securing signal and message content between an intelligent base station and a remote device, the security means including a predetermined encryption and decryption technique; a wireless digital personal communications system having dynamic zone grouping of fixed terminals and/or portable handset terminals or any combination thereof; and a wireless digital personal communications system having call forwarding for unanswered calls.

This invention is directed to solving these and other disadvantages of the prior art. Other objects, features, and advantages of this invention will become apparent from the following detailed description of the preferred embodiment of this invention, as illustrated in the accompanying drawings.

BRIEF DESCRIPTION OF THE DRAWINGS

These and other objects, features, and advantages of the present invention, as well as its organization, construction and operation, will be best understood from an examination of the following detailed description of an illustrative embodiment of the invention when read in connection with the accompanying drawings. Accordingly, the invention, together with the further objects and advantages thereof, may be understood by reference to the following detailed description of the preferred embodiment of the invention taken in conjunction with the accompanying drawings, in which.

DETAILED DESCRIPTION OF THE PREFERRED EMBODIMENT

The personal communications system (PCS) of the present invention utilizes Integrated Services Digital Network (ISDN), Advanced Intelligent Network Switches (AIN), Service Control Point (SCP), data base, and radio interfaces for various elements of the system. Accordingly, the following enumerated Bellcore technical references pertaining to ISDN, Advanced Intelligent Network Switches (AIN), Service Control Point (SCP), are needed, but not limited to, the operation of the personal communications system of the present invention and are hereby incorporated by reference, namely: (i) "Advanced Intelligent Network 0.1 Switching Systems Generic Requirements" (TR-NWT-001284); (ii) "Advanced Intelligent Network 0.2 Switching Systems Generic Requirements" (TA-NWT-001298); (iii) "Advanced Intelligent Network 0.1 Switch Service Control Point Application Protocol Interface Generic Requirements" (TR-NWT-001285); (iv) "Advanced Intelligent Network 0.2 Switch Service Point Adjunct Interface Requirements" (TA-NWT-001299); (v) "ISDN Electronic Key Telephone Service" (TR-TSY-000205); (vi) "ISDN Access Call Control Switching And Signaling Requirements" (TR-TSY-000268); (vii) "Generic Guidelines For ISDN Terminal Equipment On Basic Access Interfaces" (SR-NWT-001953); (viii) "ISDN Layer 3 Protocol Details For The Support Of Supplementary Services" (TR-TSY-000861); (ix) "ISDN Hold Capability For Managing Multiple Independent Calls" (TR-TSY-000856); (x) "Additional Call Offering For Managing Multiple Independent Calls" (TR-TSY-000857); (xi) "Flexible Calling For Managing Multiple Independent Calls" (TR-TSY-000858); (xii) "Public Packet Switch Network Generic Requirements" (TR-TSY-000301); (xiii) "ISDN X.25 Supplementary Services" (TR-TSY-000846); and (xiv) "ISDN D-Channel Exchange Access Signaling and Switching Requirements (Layer 2)" (TR-TSY-000793). Furthermore, the Digital European Cordless Technology (DECT) European Telecom Standards Institute (DE/DES 300 175), has been referenced with respect to the radio interface and is hereby incorporated by reference.

Figure 1A:
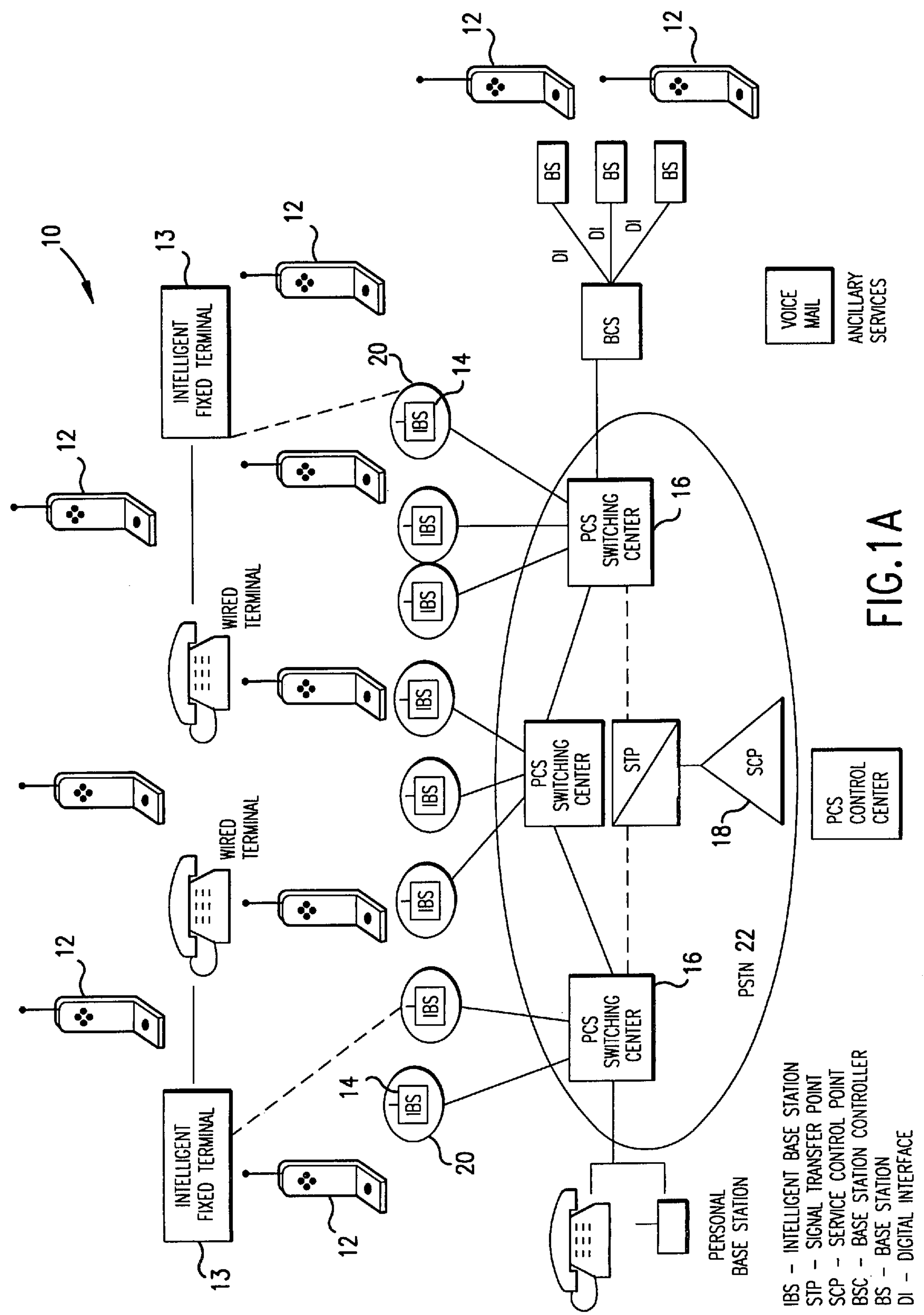
FIG. 1A is a partial diagrammatic view illustrating the operation of the wireless digital personal communications system in accordance with the present invention.
Figure 1B:
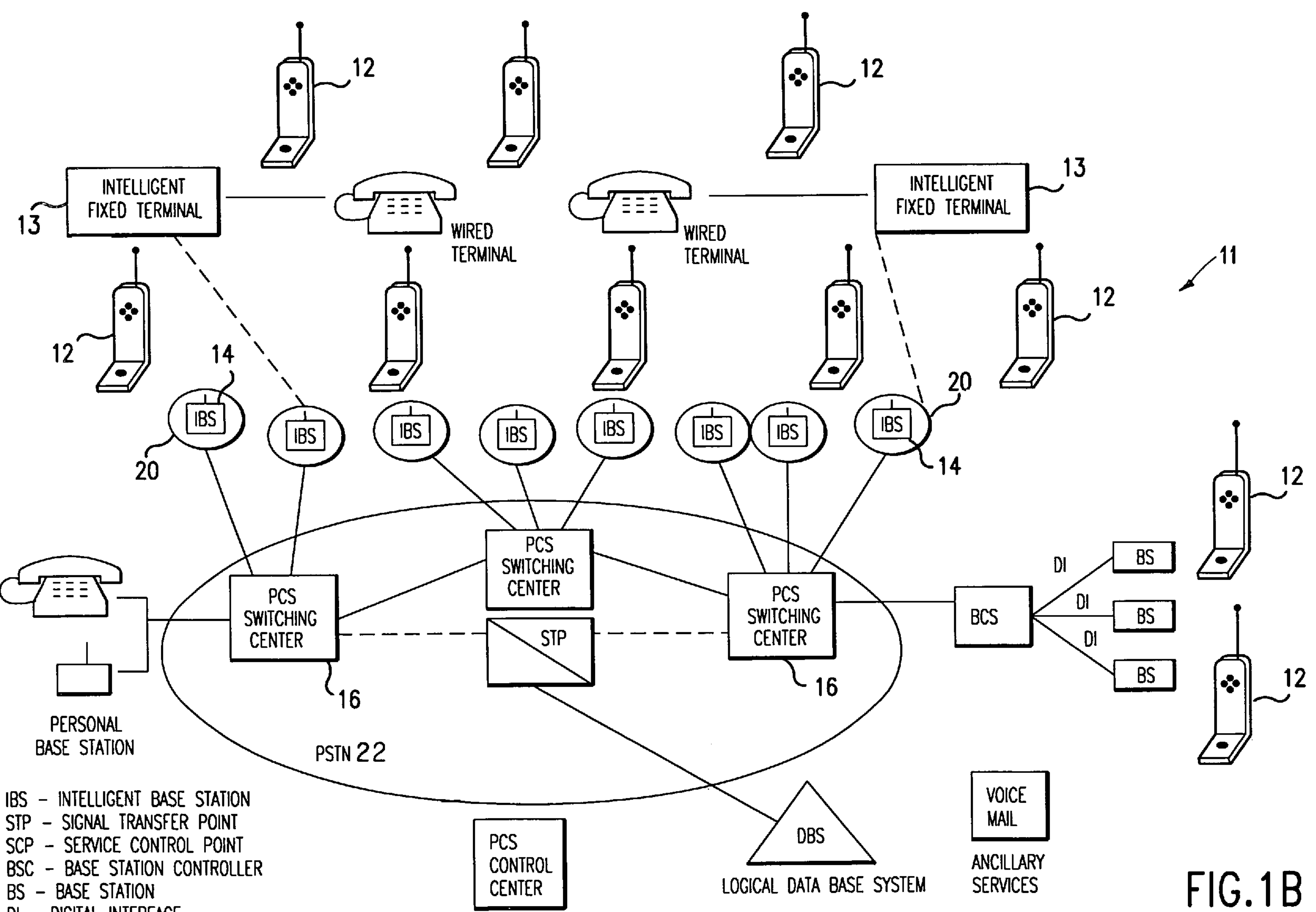
FIG. 1B is a partial diagrammatic view illustrating the operation of an alternative embodiment for the wireless digital personal communications system in accordance with the present invention.

FIG. 1A is a partial diagrammatic view illustrating the operation of the wireless digital personal communications system 10 in accordance with the present invention. FIG. 1B is a partial diagrammatic view illustrating the operation of an alternative embodiment for the wireless digital personal communications system 11 in accordance with the present invention. Referring to FIGS. 1A and 1B, the wireless digital PCS 10 (or 11) of the present invention utilizes the novel combination of a plurality of intelligent portable handset terminal(s) 12, or similar device(s), (also referred to as either portable handset terminals, or handset terminals), a plurality of intelligent fixed terminals 13, or similar device(s), (also referred to as fixed terminals), a plurality of radio cell base station(s) 14 (also referred to as either intelligent base stations, or base stations, or IBS), PCS Switching Center 16 (including advanced intelligent network switch(es) and associated system(s)), and Service Control Point 18 to allow the PCS the capability of voice/data/image two-way calling, using radio cells 20, each radio cell have a predetermined area of coverage (i.e., to those skilled in the art the size of a radio cell includes, but is not limited to, a radio cell that has a radius up to approximately one mile), and intercell hand-off provided through distributed logic resident in the intelligent portable handset terminals, in the intelligent fixed terminals, as well as in the intelligent base stations and in the public switched telephone network (PSTN) 22 (or any switched network).

Referring to FIGS. 1A and 1B, note that the dashed lines depicts a suitable wireless radio frequency (RF) transport. The portable handset terminal 12 is a transmit and receive device that communicates with a local intelligent base station. The fixed terminal 13 is a transmit and receive device that communicates with the intelligent base station. The fixed terminal 13 may be in either public accessible or private locations, (or any combination thereof). With respect to the public accessible locations (i.e., prepay terminals for the public access or customized via the utilization of personal card or codes held by the user), the fixed terminal 13 will interface with either wireless (i.e., RF transport, or the equivalent, etc.) or wireline terminal handsets (i.e., conventional wireline transport including, but not limited to, metallic wire including coaxial cable, fiber optic, or the equivalent, etc.). The wireline interface would be the interface between the fixed intelligent terminal and the intelligent base station, in which case the intelligent base station would connect ISDN to the PCS system and to a wireline transport to communicate with the fixed intelligent terminal. The wireline transport would carry the messaging for registration, authentication, encryption, control messages, and call messages between the intelligent fixed terminals and the intelligent base stations.

The PCS architecture, is both straightforward and simplified, and utilizes standard ISDN network interfaces, a centralized database, and distributed logic or intelligence resident in the PCS radio portable handset terminals, the intelligent fixed terminals, the intelligent base stations, and the PCS Switching Center to provide a flexible overall system. Direct connections between the PCS Switching Center and the intelligent base stations facilitates PCS intelligent base stations to be easily positioned in almost any location without sacrificing functionality. Generally speaking, the primary physical components of the PCS system architecture include: (i) a plurality of radio cell portable handset terminals, and fixed terminals, essentially representing a phone, with associated logic to allow the portable handset terminal or the fixed terminal to register with an intelligent base station when entering a predetermined coverage zone (i.e., the intelligent base station which has a better, higher quality signal, and available channels), and initiates a hand-off whenever required; (ii) a plurality of intelligent base stations (e.g., indoor/outdoor base stations), which provide the radio access along with the corresponding ISDN interface to the Public Switched Telephone Network (PSTN), with distributed logic between the intelligent base stations and the PSTN such that no centralized real-time controller is required; (iii) a PCS Switching Center (PSC), essentially, a central office equipped with National ISDN and AIN hardware and software, with the hand-off between two adjacent radio cells being accomplished at the PSC as a result of the simplified architecture for the personal communications system; (iv) a Signaling Transfer Point (STP), essentially, a signaling node for a Signaling System 7 (SS7) network signaling software and hardware; (v) a plurality of Service Control Points, which are essentially a PSTN database equipped with SS7 and AIN and additional software which maintains the PCS user's service feature capabilities and up-to-date current user location by intelligent base station for routing incoming calls; and (vi) a PCS Control Center (PCC), a center with computer and control systems performing administrative, provisioning, network management, and customer service functions.

Throughout the overall system, the PCS system utilizes the Integrated Services Digital Network (ISDN) access lines and the Intelligent Network to provide the required hand-offs between adjacent radio cells, to deliver incoming calls to a specific radio cell, to provide registration of a portable handset terminal or the fixed terminal, and provide the portable handset terminal number for the portable handset terminal, as well as provide the fixed terminal number for the fixed terminal, on call origination.

The radio cell portable handset terminal for the personal communications system provides high-quality digital voice communications, automatic location registration and intercell hand-off control. The radio cell fixed terminal for the personal communications system provides high-quality digital voice communications, automatic location registration and intercell hand-off control, if necessary.

At various locations throughout the personal communications system, the intelligent base stations provide the wireless transport by a RF link to the PCS portable handset terminals, or the fixed terminals, for accessing the PSTN. Additionally, the intelligent base stations are ISDN compatible and further provide radio channel management for incoming and outgoing calling, automatic channel selection, and incoming call alerting, and will collect operating and usage statistics. To allow the portable handset terminal to be used either at home or in the office, the intelligent base stations link the portable handset terminal to the PSTN. The intelligent base stations also link the fixed terminal to the PSTN.

The intelligent base stations are located either indoors or outdoors on buildings, street lights or utility poles throughout the coverage area. Each intelligent base station supports simultaneous conversations and provides handset access security, auto channel selection, billing data and built-in diagnostics. ISDN lines link the intelligent base stations to the telephone switched network.

The personal communications system control center (PCC), through comprehensive computer and dedicated control systems, is capable of performing portable handset terminal, fixed terminal, and intelligent base station provisioning, network management, specified customer service functions, and operate to control and administer the intelligent base stations, fixed terminals, and portable handset terminals throughout the personal communications system.

The PSTN has three main components, namely, (i) the PSC (a PCS Switching Center) with ISDN, where telephone central office switches equipped with National ISDN-1 and intelligent Network hardware and software; (ii) the Signaling Transfer Point (STP), which provides communications between the STP and the Service Control Point though suitable SS7 links, and (iii) the Service Control Point, where an intelligent network database exists maintaining user features records and user location. ISDN lines provide PSTN access for the PCS. The PSC performs traditional switching, routing and control functions. In addition, the telephone switch completes the hand-off between radio cells, when directed to do so by the portable terminal handset, or fixed terminal, and the intelligent base station. Standard ISDN signaling messages are converted to TCAP messages and directed to the Service Control Point by the STP for the PCS.

The PCS of the present invention is also sufficiently flexible to evolve into different classes of PCS service for the user (rather than remaining solely a single universal service). For example, a standardized PCS Switching Center standard network interface allows operators to pick and choose the level of functionality required to support a particular PCS service offering. Maximizing the use of intelligent network functionality and existing signaling standards will minimize the new infrastructure that needs to be deployed and the new standards that need to be developed. A central office capable of providing radio cell hand-off eliminates the need for an intermediate switch or controller, as well as for costly private lines. Accordingly, this simplified architecture for the PCS of the present invention, lowers the barriers of entry with respect to the deployment of PCS by the service providers in the marketplace.

The PCS of the present invention creates certain system wide variables, namely, Registration, Authentication, Call Origination, Incoming Call, Hand-Off, Call Features, and Roaming.

Registration. Generally, each portable handset terminal must be registered to allow the PSTN to locate either the portable handset terminal or the fixed terminal for incoming calls. Registrations will take place when the portable handset terminal, or fixed terminal, powers "ON" in a radio cell, or receives a better or higher quality signal from a different zone. A zone may have multiple intelligent base stations. Registration will be performed according to class of service. If the portable handset terminal, or fixed terminal, does not have two-way services, registration will not take place. When the portable handset terminal, or fixed terminal, requests a registration it sends a location request message along with the portable handset terminal's, or fixed terminal's, identity. The intelligent base station formats a non-call message with the location request and portable handset terminal telephone number and PCS provider ID to be sent to the PCS Switching Center. The PCS Switching Center receives the message and performs a look-up on the access line and correlates that access line to its related zone number. The zone number is globally unique. The PCS Switching Center has a table within its data base that has all the intelligent base stations access line numbers and associated zone numbers. This affords the ability to broadcast to all intelligent base stations in a zone to locate a particular portable handset terminal or fixed terminal, rather than track portable handset terminals to a particular intelligent base station. In some cases, however, a zone may be a single base station. The portable handset terminal can roam from one intelligent base station to another intelligent base station within a zone and not require registration. The PCS Switching Center formats a registration message with the portable handset terminal's identity. The message is now sent to the Service Control Point for registration. The Service Control Point temporarily stores the portable handset terminal, or fixed terminal, information in its data base. The Service Control Point will now request an authentication of the portable handset terminal or fixed terminal. This function is performed to verify that the portable handset terminal, or fixed terminal, is allowed to use this PCS provider's network.

Authentication. Generally, the Service Control Point will request authentication of the portable handset terminal, or fixed terminal, upon request for registration, call origination, and incoming call. The Service Control Point determines the user authentication key (UAK) from the providers data base. The UAK is a secret key or password which is known only to the portable handset terminal, or fixed terminal, and the Service Control Point. Various algorithms can be used for purposes of authentication.

Call Origination. Generally, the portable handset terminal, or fixed terminal, requests call origination. When this occurs, the portable handset terminal, or fixed terminal, transmits a service request with the portable handset terminal identity, or fixed terminal identity, to the intelligent base station. The intelligent base station receives the message with the portable handset terminal's identity, or fixed terminal identity. The intelligent base station formats the service request message to be forwarded to the PCS Switching Center. The PCS Switching Center receives the message and updates the activity block associated with the selected access line to indicate that the portable handset terminal, or fixed terminal, is on an active call. The PCS Switching Center sends the service request with the portable handset terminal identity, or fixed terminal identity, to the Service Control Point. The Service Control Point receives the request and initiates the authentication process for the portable handset terminal, or fixed terminal. The same authentication procedure is performed as described elsewhere herein.

After the Service Control Point compares RES1 and XRES1 and a match is found, a service acknowledgement message with the portable handset terminal, or fixed terminal, identity and DCK is prepared and sent to the PCS Switching Center. The PCS Switching Center, upon receipt of the message, stores the DCK in the appropriate activity block holding the received portable handset terminal identity, or fixed terminal identity. The PCS Switching Center assembles a reply message with the portable handset terminal identity, or fixed terminal identity, and DCK, provides dial-tone on the intelligent base station access line's "B" channel and sends the message to the intelligent base station. The intelligent base station receives the service reply from the PCS Switching Center and stores the DCK against the portable handset terminal's identity, or fixed terminal identity, to cipher information between the portable handset terminal, and the fixed terminal, and the intelligent base station for this call. The intelligent base station sends the reply to the portable handset terminal, or fixed terminal, along with dial-tone. Once the portable handset terminal, or fixed terminal, receives dial-tone the portable handset terminal, or fixed terminal, proceeds with the call. The call proceeds through the PCS Switching Center like any other call. At the end of the call, the connection is dropped and the portable handset terminal, or fixed terminal, is back in a stand-by mode. All messages between intelligent base station and portable handset terminals, or fixed terminal, are ciphered (as an option).

Incoming Call. Generally, the interaction of each component comprises the system for PCS. The intelligent base stations can be grouped in zones as to improve the ability to receive calls from the PSTN, although in some cases one base station may define a zone. In the case of incoming calling, the Service Control Point will maintain the location of the portable handset terminal, or fixed terminal, by using the registration information received at the last time of registration. Once the routing number is found for the PCS user, the Service Control Point will send an SS7 message to the PCS Switching Center. This message will prompt the PCS Switching Center to look up the intelligent base station zone routing number. The PCS Switching Center will then send the message to all the intelligent base stations in that zone. When the portable handset terminal, or fixed terminal, is found the portable handset terminal or fixed terminal responds back through the intelligent base station and PCS Switching Center to the Service Control Point. The Service Control Point will then request authentication of the portable handset terminal or fixed terminal. In the authentication process, the Service Control Point will route the request to the PCS Switching Center and the intelligent base station to the portable handset terminal or fixed terminal. When the portable handset terminal, or fixed terminal, calculates the result of the authentication algorithm, the portable handset terminal, or fixed terminal, transmits the result back to the Service Control Point. If the authentication process is accepted, the Service Control Point will send a cipher key to the intelligent base station. The cipher key will be used for ciphering messages between the portable handset terminal, or fixed terminal, and the intelligent base station. The messages (e.g., conversations) will not be ciphered over the PSTN network. At the same time the incoming call will be routed to the portable handset terminal, or fixed terminal, through an alerting process and a connect process.

Hand-Off. Generally, during a stable call when the PCS user walks toward the end of the radio cell coverage area, the portable handset terminal may detect a better, higher quality signal from another intelligent base station. Also, the fixed terminal may detect a better, higher quality signal from another intelligent base station. When this occurs, the portable handset terminal, or the fixed terminal, initiates a hand-off. Between the portable handset terminal, or fixed terminal, and the new intelligent base station (IBS2), hand-off begins. IBS2 sends a message to the PCS Switching Center to request hand-off. The PCS Switching Center allocates a three port bridge for the hand-off between IBS1 and IBS2 access lines. The PCS Switching Center sends the acknowledgement to IBS2 along with DCK. DCK is sent to the new intelligent base station so it can send and receive messages from the portable handset terminal, or fixed terminal, in a ciphered mode. The PCS Switching Center attaches the call to IBS2 access line, then sends the hand-off request to the old intelligent base station IBS1. IBS1 receives the message and accepts the hand-off. Once the three way connection is established, the portable handset terminal, or fixed terminal, issues a disconnect command to IBS1. The call is now stable on IBS2.

Call Features. Generally, during the process of receiving a call, the PCS subscriber has options which may determine the call routing on a "no-answer", "busy", or "PCS user not found". Voice Mail allows a PCS user to forward unanswered incoming calls to a commercial voice mail system. Callers can automatically leave messages in response to a personal announcement from a PCS user. The calling party can receive "busy" tone if the PSC user is currently using the portable handset terminal. If the user cannot be found, the call can be transferred to an announcement indicating the status of the PCS user. The intelligent base station will send the PCS Switching Center a message indicating the status of what the intelligent base station found pertaining to the call.

Roaming. Generally, roaming service will be available to PCS subscribers; this will allow the user to roam out of the service area and still be capable of making and receiving calls from another service provider. For authentication, information from the PCS users regular Service Control Point will be required. The functions are the same as for calls made in their own service area. The PSTN will route messages and verify validity of the calls before the PCS user can receive a call or originate a call.

Radio Interface. The PCS of the present invention is fully compatible with any and all radio interfaces that have a signaling control channel and a message content channel. PCS facilitates call handling and radio cell-to-radio cell hand-off.

PCS Network Facilities. The messaging and conversations are transmitted over standard National ISDN facilities. Basic Rate ISDN Interfaces are comprised of two "B" channels and one "D" channel for signaling the ISDN interface between the intelligent base station and the PCS Switching Centers; Primary Rate ISDN Interfaces are comprised of twenty three "B" channels and one "D" channel for signaling the ISDN interface between the intelligent base station and the PCS Switching Centers. Messages sent between PCS Switching Center and the Service Control Point will utilize SS7 facilities.

Generally speaking with respect to synchronization of the PCS, some radio technologies may require synchronization to prevent adjacent base station radio frequency interference, and provide smooth hand-off. These conditions may require multiple synchronization techniques namely, (i) superframe frequency synchronization, and (ii) adjacent base station zero reference phase synchronization. With respect to (i) supra., the superframe frequency synchronization is accomplished by the radio cell alignment of the air interface superframe frequency synchronization with the ISDN Digital Subscriber Line (DSL) superframe frequency synchronization (4096 KHz). The DSL superframe frequency synchronization is aligned with the PSTN superframe frequency synchronization. The DSL superframe frequency synchronization is consistent with the requirements in American National Standards Institute (ANSI) T1.601. The PSTN superframe frequency synchronization is consistent with the requirements in Synchronization Interface Standards for Digital Networks (ANSI T1.101-1987). This superframe frequency synchronization alignment of the air interface for all radio cells connected to the PSTN provides superframe frequency synchronization back to a common source. With respect to (ii) supra., the adjacent radio cell zero reference phase synchronization can be accomplished using time base capabilities associated with several technologies (individually or in combination with other technologies). A brief listing of various zero reference synchronization techniques utilizing these technologies include: (i) radio frequency overlapping of cell radii; (ii) commercial television broadcast signal; (iii) global position satellites and time base receivers; and (iv) PSTN wired connectivity.

Figure 2:
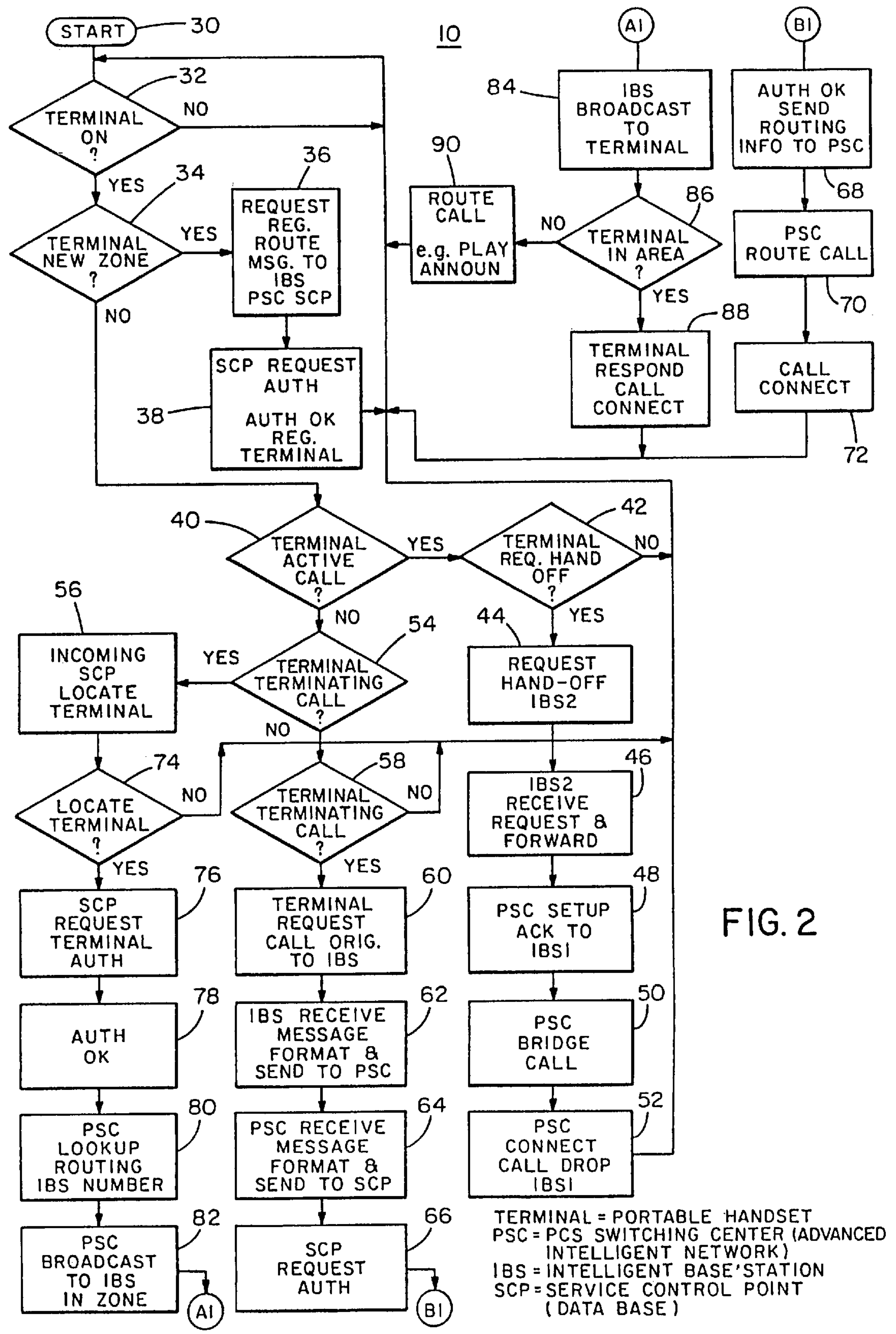
FIG. 2 is a system flowchart illustrating the total system functionality of the wireless digital personal communications system which utilizes intelligent fixed terminals and intelligent portable handset terminals in accordance with the present invention.

FIG. 2 is a system flowchart illustrating the total system functionality of the wireless digital personal communications system which utilizes intelligent terminals (i.e., either fixed terminals or portable handset terminals) in accordance with the present invention. Referring to FIG. 2, beginning with Start block 30, the terminal is tested to determine if the terminal is "ON", or not, by the test in the Terminal On block 32. If the terminal is determined to be "ON", the terminal is then tested to determine if the terminal is in a new zone, or not, by the test in the Terminal New Zone block 34. If the terminal is "OFF", the PCS will continue testing through the Terminal On block 32 until the terminal is eventually found to be "ON" in accordance with block 32.

Once the terminal is determined to be "ON", the terminal is tested to determine if the terminal is in a new zone by the test in the Terminal New Zone block 34. If the answer is affirmative, indicating that the terminal is in a new zone, then the Request Registration/Route Message To IBS/PSC/SCP routine in block 36 is initialized to request registration. After the Request Registration/Route Message To IBS/PSC/SCP routine in block 36 is completed, the routine SCP Request Authentication/Authentication OK/Registration Terminal in block 38 is initialized to authenticate the terminal. After the SCP Request Authentication/Authentication OK/Registration Terminal routine in block 38 is completed, the PCS will continue testing through the Terminal On block 32 until the terminal is eventually found to be "ON" in accordance with block 32.

If the terminal is determined not to be in a new zone, then the terminal is tested for the presence of an active call by the Terminal Active Call test in block 40. If the answer to the Terminal Active Call test in block 40 is negative, indicating that the terminal does not have an active call, then the terminal is tested to determine if the terminal is terminating a call by the Terminal Terminating Call test in block 54.

If the answer to the Terminal Active Call test in block is affirmative, indicating that the terminal has an active call, then the terminal is immediately tested to determine if the terminal is requesting a radio cell hand-off by the Terminal Requesting Hand-Off test in block 42. If the answer to the Terminal Requesting Hand-Off test in block 42 is negative, indicating that the terminal is not requesting a radio cell hand-off, the PCS will continue testing through the Terminal On block 32 until the terminal is eventually found to be "ON" in accordance with block 32. If the answer to the Terminal Requesting Hand-Off test in block 42 is affirmative, indicating that the terminal is requesting a radio cell hand-off, then the Request Hand-Off IBS2 routine in block 44 is initialized to begin hand-off. After the Request Hand-Off IBS2 routine in block 44 is completed, the IBS2 Receive Request/Forward routine in block 46 is initialized to forward request to PCS Switching Center. After the IBS2 Receive Request/Forward routine in block 46 is completed, the PSC Setup Acknowledgement To IBS1 routine in block 48 is initialized to inform IBS1 of hand-off. After the PSC Setup Acknowledgement To IBS1 routine in block 48 is completed, the PSC Bridge Call routine in block 50 is initialized to bridge the call. After the PSC Bridge Call routine in block 50 is completed, the PSC Connect Call/Drop IBS1 routine in block 52 is initialized to drop bridge to IBS1. Thereafter, the PCS will continue testing through the Terminal On block 32 until the terminal is eventually found to be "ON" in accordance with block 32.

If the answer to the Terminal Active Call test in block 40 is negative, indicating that the terminal does not have an active call, then the terminal is tested to determine if the terminal terminating a call by the Terminal Terminating Call test in block 54. If the answer to the Terminal Terminating Call test in block 54 is affirmative, indicating that the terminal is receiving a call, then the Incoming SCP Locate Terminal routine in block 56 is initialized to locate the terminal.

If the answer to the Terminal Terminating Call test in block 54 is negative, indicating that the terminal is not terminating a call, then the terminal is tested to determine if the terminal is originating a call by the Terminal Originating Call test in block 58. If the answer to the Terminal Originating Call test in block 58 is negative, indicating that the terminal is not originating a call, then the PCS will continue testing through the Terminal On block 32 until the terminal is eventually found to be "ON" in accordance with block 32. If the answer to the Terminal Originating Call test in block 58 is positive, indicating that the terminal is originating a call, the Terminal Request Call Origination To IBS routine in block 60 is initialized to request call origination. After the Terminal Request Call Origination To IBS routine in block 60 is completed, the IBS Receive Message Format/Send To PSC routine in block 62 is initialized to format and send message to PSC. After the IBS Receive Message Format/Send To PSC routine in block 62 is completed, the PSC Receive Message Format/Send To SCP routine in block 64 is initialized to format and send request to the Service Control Point. After the PSC Receive Message Format/Send To SCP routine in block 64 is completed, the SCP Request Authentication routine in block 66 is initialized to authenticate the terminal. After the SCP Request Authentication routine in block 66 is completed, the Authentication OK Send Routing Information To PSC routine in block 68 is initialized to send routing information to PSC. After the Authentication OK Send Routing Information To PSC routine in block 68 is completed, the PSC Route Call routine in block 70 is initialized to route the call. After the PSC Route Call routine in block 70 is completed, the Call Connect routine in block 72 is initialized to connect the called and calling parties. After the Call Connect routine in block 72 is completed, the PCS will continue testing through the Terminal On block 32 until the terminal is eventually found to be "ON" in accordance with block 32.

After the Incoming SCP Locate Terminal routine in block 56 is completed, the location of the terminal is tested for by the Locate Terminal test in block 74. If the answer is negative, the PCS will continue testing through the Terminal On block 32 until the terminal is eventually found to be "ON" in accordance with block 32. If the answer is affirmative, the SCP Request Terminal Authentication routine in block 76 is initialized to request terminal authentication. After the SCP Request Terminal Authentication routine in block 76 is completed, the Authentication OK routine in block 78 is initialized to compare results of the terminal with the expected result from the Service Control Point. After the Authentication OK routine in block 78 is completed, the PSC Look-up Routing IBS Number routine in block 80 is initialized to determine route number for incoming call. After the PSC Look-up Routing IBS Number routine in block 80 is completed, the PSC Broadcast To IBS In-Zone routine in block 82 is initialized to broadcast a signal to all intelligent base stations in zone. After the PSC Broadcast To IBS In Zone routine in block 82 is completed, the IBS Broadcast To Terminal routine in block 84 is initialized to locate the terminal.

After the IBS Broadcast To Terminal routine in block 84 is competed, the area is tested to determine if a terminal is present within the area by the Terminal In Area test in block 86. If the answer to the Terminal In Area test of block 86 is positive, indicating that a terminal is present in the particular area, the Terminal Respond Call Connect routine in block 88 is initialized to indicate the terminal location and connect call. After the Terminal Respond Call Connect routine in block 88 is completed, the PCS will continue testing through the Terminal On block 32 until the terminal is eventually found to be "ON" in accordance with block 32. If the answer to the Terminal In Area test of block 86 is negative, indicating that no terminal is in the particular area, the Route Call/Play Announcement routine in block 90 is initialized to indicate no terminal is found. After the Route Call/Play Announcement routine in block 90 is completed, the PCS will continue testing through the Terminal On block 32 until the terminal is eventually found to be "ON" in accordance with block 32.

Figure 3:
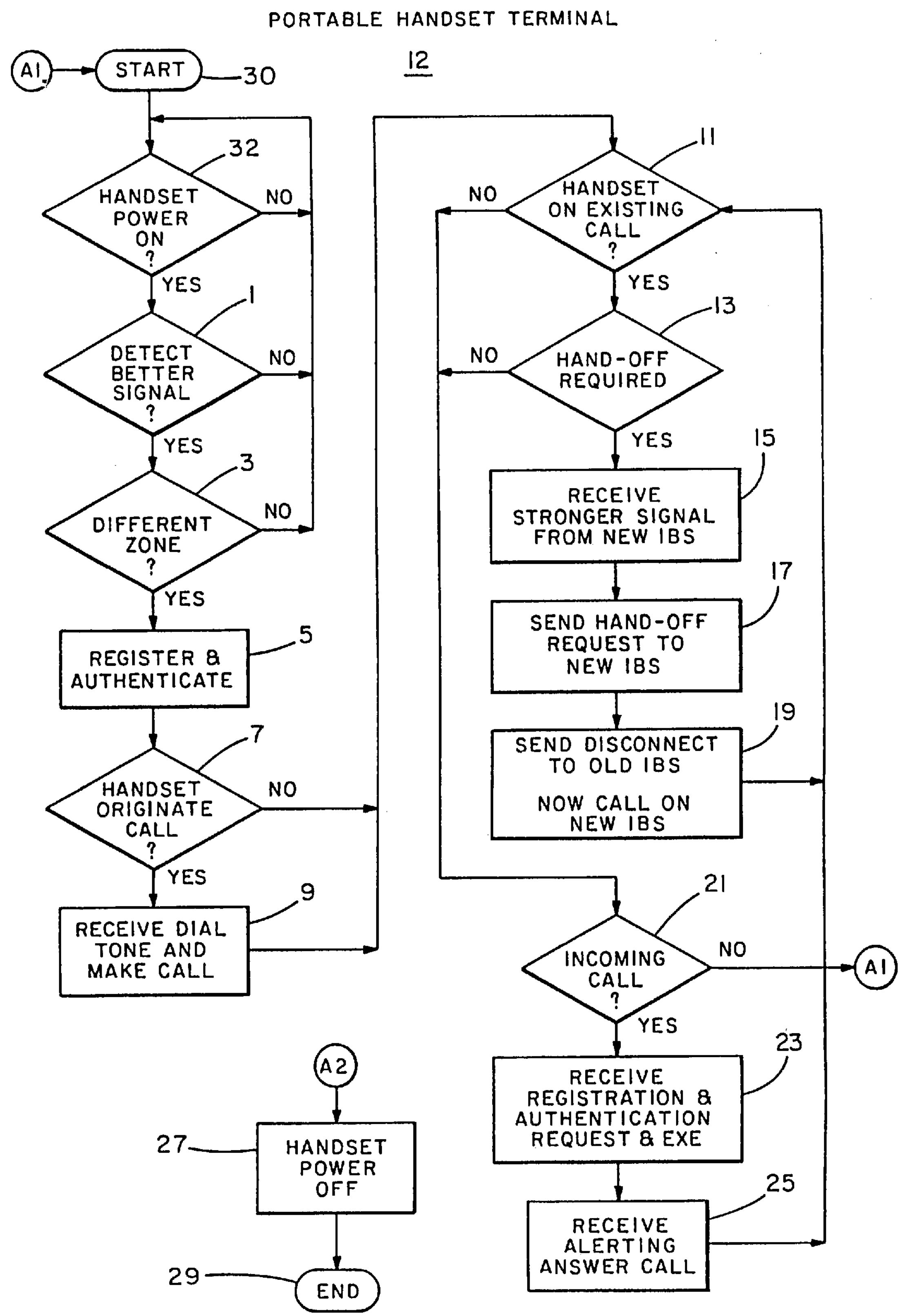
FIG. 3 is a system flowchart illustrating the particular functionality of the distributed logic that is resident in the handheld intelligent portable handset terminals associated with the wireless digital personal communications system in accordance with the present invention.

FIG. 3 is a system flowchart illustrating the particular functionality of the distributed logic that is resident in the handheld portable handset terminals associated with the wireless digital personal communications system in accordance with the present invention. Referring to FIG. 3, beginning with Start block 30, the portable handset terminal is tested to determine if the portable handset terminal is "ON", or not, by the test in the Terminal On block 32. If the portable handset terminal is "OFF", the PCS will continue testing through the Terminal On block 32 until the portable handset terminal is eventually found to be "ON" in accordance with block 32. If the portable handset terminal is determined to be "ON", the portable handset terminal is then tested to determine if the portable handset terminal detects a better, higher quality signal with an intelligent base station having available channels (or not), by the test in the Detect Stronger Signal block 1. If the portable handset terminal does not detect a better, higher quality signal, the PCS will continue testing through the Terminal On block 32 until the portable handset terminal eventually detects a better, higher quality signal in accordance with block 1.

When the portable handset terminal detects a better, higher quality signal at block 1, the portable handset terminal tests to determine if a new zone is involved at that point by the test in the Different Zone block 3. If the portable handset terminal does not determine that a different zone is involved, the PCS will continue testing through the Terminal On block 32 until the portable handset terminal eventually determines that a different zone is involved in accordance with block 3. If the answer to block 3 is affirmative, indicating that the portable handset terminal has determined that a different zone is involved, then the Register and Authenticate routine in block 5 is initialized to begin requesting that the portable handset terminal be registered and authenticated. After the Register and Authenticate routine in block 5 is completed, the portable handset terminal tests to determine if the portable handset terminal is originating a call by the test in the Handset Originate Call block 7. If the answer to block 7 is negative, indicating that the portable handset terminal is not originating a call, then the portable handset terminal is tested to determine if portable handset terminal is presently on an existing call by the test in the Handset On Existing Call block 11. If the answer to block 7 is affirmative, indicating that the portable handset terminal is originating a call, then the Receive Dial Tone and Make Call routine in block 9 is initialized to begin requesting a dial-tone and allow the portable handset terminal to make a call.

After the Receive Dial Tone and Make Call routine in block 9 is completed, the portable handset terminal is tested to determine if the portable handset terminal is presently on an existing call by the test in the Handset On Existing Call block 11. If the answer to the Handset On Existing Call test in block 11 is negative, indicating that the portable handset terminal does not have an existing call, the portable handset terminal is tested to determine if there is an incoming call for the portable handset terminal by the test in the Incoming Call block 21. If the answer to the Handset On Existing Call test in block 11 is affirmative, indicating that the portable handset terminal does have an existing call, the portable handset terminal is tested to determine if there is a hand-off required for the portable handset terminal by the test in the Hand-Off Required block 13. If the answer to the Hand-Off Required test in block 13 is affirmative, indicating that the portable handset terminal requires a hand-off, then the Receive Stronger Signal From New IBS routine in block 15 is initialized to begin receiving a better, higher quality signal from new intelligent base station. After the Receive Stronger Signal From New IBS routine in block 15 is completed, the portable handset terminal then initializes the Send Hand-Off Request To New IBS routine in block 17 to begin sending a hand-off to new intelligent base station. After the Send Hand-Off Request To New IBS routine in block 17 is completed, the portable handset terminal then initializes the Send Disconnect To Old IBS Now Call On New IBS routine in block 19 to begin disconnecting from the old intelligent base station and call on the new intelligent base station. After the Send Disconnect To Old IBS Now Call On New IBS routine is completed, the portable handset terminal then again tests to determine if the portable handset terminal is on an existing call by the Handset On Existing Call test in block 11.

If the answer to the Incoming Call test in block 21 is negative, indicating that the portable handset terminal does not have an incoming call, the PCS will continue testing through the Handset Power On block 32. If the answer to the Incoming Call test in block 21 is affirmative, indicating that the portable handset terminal does have an incoming call, then the Receive Registration and Authentication Request and Execute routine in block 23 is initialized to begin requesting that the portable handset terminal receive registration and authentication. After the Receive Registration and Authentication Request and Execute routine in block 23 is completed, the portable handset terminal then initializes the Receive Alerting Answer Call routine in block 25 to begin receiving any alerting to answer incoming call. After the Receive Alerting Answer routine in block 25 is completed, the portable handset terminal will again test to determine if the portable handset terminal is on an existing call by the Handset On Existing Call test in block 11.

After the portable handset terminal has its power turned "OFF" by the user, block 27, the portable handset terminal will end its interaction with the PCS until powered "ON" again.

Figure 4:
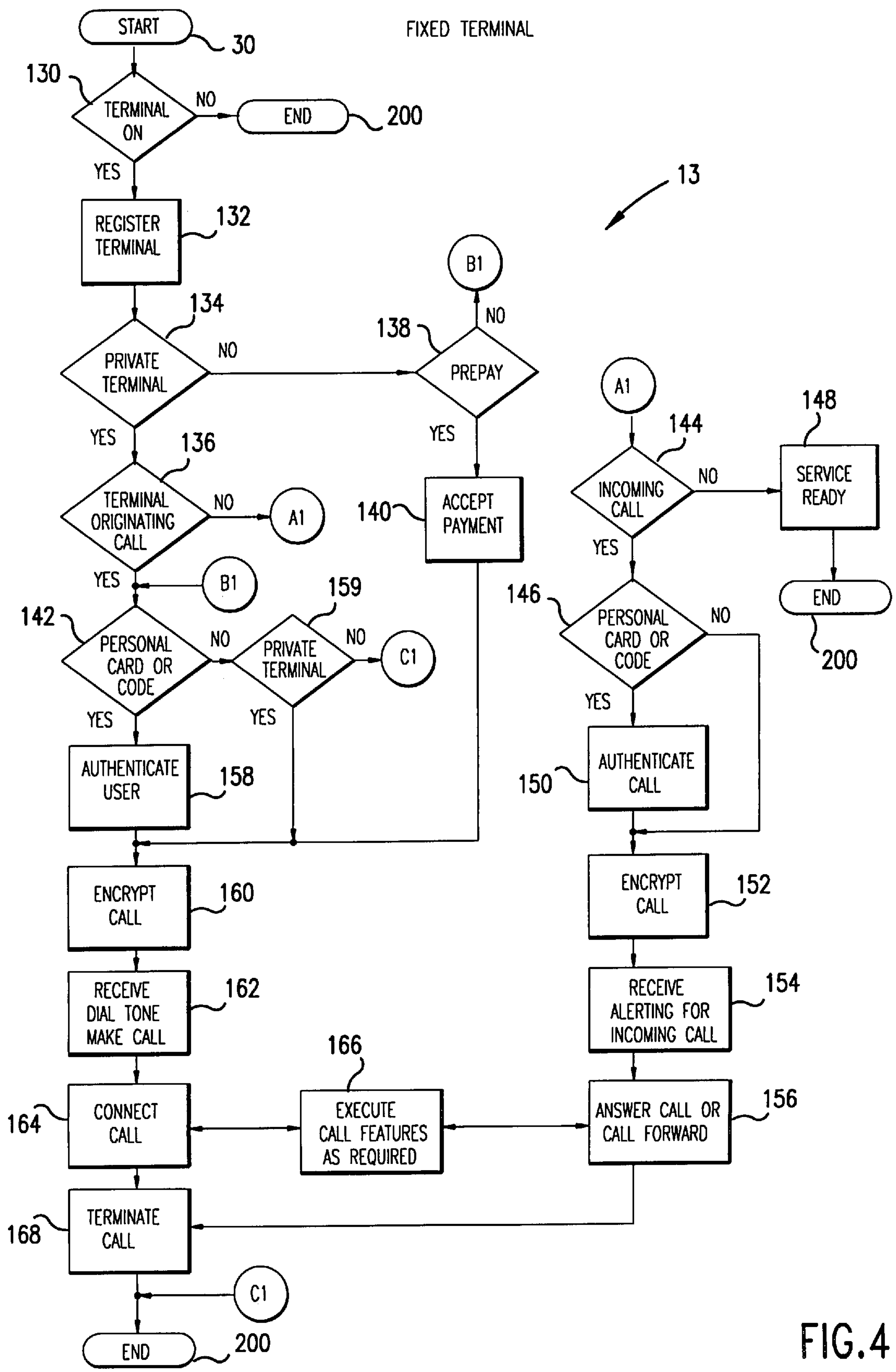
FIG. 4 is a system flowchart illustrating the particular functionality of the distributed logic that is resident in the intelligent fixed terminals associated with the wireless digital personal communications system in accordance with the present invention.

FIG. 4 is a system flowchart illustrating the particular functionality of the distributed logic that is resident in the intelligent fixed terminals 13 associated with the wireless digital personal communications system in accordance with the present invention. Referring to FIG. 4, beginning with Start block 30, the fixed terminal is tested to determine if the fixed terminal is "ON", or not, by the test in the Terminal On block 130. If the fixed terminal is "OFF", the PCS will continue testing through the Terminal On block 130 until the fixed terminal is eventually found to be "ON" in accordance with block 130. If the fixed terminal is determined to be "ON", the fixed terminal is registered in accordance with the Register Terminal routine in block 132. If the fixed terminal is determined not to be "ON", the fixed terminal will execute an end routine in accordance with End routine in block 200. Following registration of the fixed terminal, the fixed terminal is tested to determine if the fixed terminal is a private terminal, or not, by the test in the Private Terminal block 134. In the event the fixed terminal is determined not to be a private terminal, the fixed terminal is tested to determine if the user has prepaid for the call in accordance with block 138, or whether the user will now make a prepaid (or reverse charges) toll call in accordance with Accept Payment block 140, with the fixed terminal accepting prepayment from the user.

After it is determined whether the fixed terminal is a private terminal, or not, in accordance with block 134, and in the event the determination is that the fixed terminal is a private terminal, then the fixed terminal is tested to determine if the fixed terminal is originating a call by the test in the Terminal Originating Call block 136. If the answer to block 136 is affirmative, indicating that the fixed terminal is attempting to originate a call, then the fixed terminal is tested to determine if the user will use his or her personal access card or access code, by the test in the Personal Card or Code block 142.

If the answer to block 142 is affirmative, indicating that the user will use his or her personal access card or access code, then the user is authenticated by the Authenticate User routine in block 158. If the answer to block 142 is negative, indicating that the user will not be using his or her personal access card or access code, the fixed terminal is again tested to determine if it is a private terminal or not in accordance with Private Terminal block 159. If it determined that the fixed terminal is not a private terminal in accordance with Private Terminal block 159, then service with be terminated since payment has not be tendered by the user, and the fixed terminal will execute an end routine in accordance with End routine in block 200.

If the answer to block 136 is negative, indicating that the fixed terminal is not originating a call, then the fixed terminal is tested to determine if the fixed terminal is receiving an incoming call in accordance with the Incoming Call block 144. If the answer to this test in block 144 is affirmative, indicating that the fixed terminal is receiving an incoming call, then the fixed terminal is tested to determine if the user will use his or her personal access card or access code, by the test in the Personal Card or Code block 146. If the answer to this test in block 144 is negative, indicating that the fixed terminal is not receiving an incoming call, then the fixed terminal is ready for service by a user in accordance with the Service Ready routine in block 148. After which time the fixed terminal will execute an end routine in accordance with End routine in block 200.

If the answer to this test in block 146 is positive, indicating that the fixed terminal is going to be accessed by a user who has a personal card or access code, the call is then authenticated by the Authenticate Call routine in block 150. If the answer to this test in block 146 is negative, indicating that the fixed terminal is going to be accessed by a user who does not have a personal access card or an access code, the fixed terminal then has the call encrypted by the Encrypt Call routine in block 152. Following execution of the Encrypt Call routine in block 152, the fixed terminal will receive alerting for an incoming call by the Receive Alerting For Incoming Call routine in block 154. Following execution of the Receive Alerting For Incoming Call Routine in block 154, the fixed terminal will either answer the incoming call or call forward the incoming call by the Answer Call Or Call Forward routine in block 156. Following execution of the Answer Call Or Call Forward routine in block 156, the fixed terminal will then terminal the incoming call by execution of the Terminate Call routine in block 168. Following execution of the Terminate Call routine in block 168, the fixed terminal will execute an end routine in accordance with End routine in block 200.

After the Authenticate User routine in block 158 is completed, the fixed terminal will encrypt the call by execution of the Encrypt Call routine in block 160. After the Encrypt Call routine in block 160 is completed, the fixed terminal which is originating a call will then request a dial-tone by execution of the Receive Dial Tone Make Call routine in block 162 is initialized to begin requesting a dial-tone and allow the fixed terminal to make a call. After the Receive Dial Tone Make Call routine in block 162 is completed, the fixed terminal will then connect the call by execution of the Connect Call routine in block 164 is initialized. After the Connect Call routine in block 164 is completed, the fixed terminal will then terminal the call by execution of the Terminate Call routine in block 168 is initialized. After the Terminate Call routine in block 168 is completed, the fixed terminal will have its power turned "OFF" by the user, block 200, the fixed terminal will end its interaction with the PCS until powered "ON" again.

Generally, the private intelligent fixed terminals can interface with either wireline or wireless terminal handsets. With respect to call origination for the private intelligent fixed terminals, when placing a call a request for encryption would be requested for the duration of the call. If a particular user card (or user codes) were utilized by the user, the authentication and encryption process would be requested by the fixed terminal. Authentication would be executed to verify the particular user card (or user codes) entered by the user. If authentication fails, the call request would terminate. Following the encryption, and authentication (if required) were completed, the fixed terminal would receive dial tone from the public switched telephone network through the means of an intelligent base station and the call would be routed through the public switched telephone network. Upon call completion, the fixed terminal would be connected to the called party. If call features were allocated to the particular fixed terminal, and requested by the fixed terminal, the call features would be activated as requested by the user. When the call is ended (or otherwise terminated), the fixed terminal would then reflect the ready state awaiting another call, and a de-registration message would be requested.

With respect to an incoming call that is directed to the private intelligent fixed terminals, and the call is registered and authenticated (if required) by a particular user card (or user code), an alerting message is sent to the fixed terminal from the public switched telephone network through the intelligent base station. Encryption and authentication (if required) would be requested, and all traffic over the air would be encrypted. Authentication would be to verify the particular user card (or user codes) entered. If the incoming call is not answered, or the incoming call is call forwarded to another number or service (i.e., for example, voice mail service) the incoming call would be forwarded. When the incoming call is answered, the call will be connected through the PSTN by means of an intelligent base station. If call features were allocated to the particular fixed terminal, the call features would be activated. When the incoming call is ended (or otherwise terminated), the fixed terminal would then reflect the ready state awaiting another call, and a de-registration message would be requested.

The public intelligent fixed terminals would be accessible to the public and is used to either initiate calls, or calls are directed to the fixed terminal. The public intelligent fixed terminals can interface with either wireline or wireless terminal handsets. The public fixed terminal is used as either a prepay fixed terminal or a customized fixed terminal by the utilization of a particular user card (or user codes). Since the fixed terminal is located at a particular location, no hand-off to an adjacent cells is required during normal operation (unless the specific cell goes down). Regarding call origination for the public intelligent fixed terminals, with a prepay call is initiated by the user (by whatever payment method is selected by the user), generally no authentication would be required before the call is made. Once payment is accepted, the call would proceed. However, should the user utilize a particular user card (or user code) to provide the identity of the user to the system, an authentication process is performed. Once the authentication is accepted, the call process progresses; if the authentication is not accepted, the call process is terminated. When placing a call a request for encryption would be requested by the fixed terminal for the duration of the call. Following the encryption, the fixed terminal would receive dial tone from the public switched telephone network through the means of an intelligent base station and the call would be routed through the public switched telephone network. Upon call completion, the fixed terminal would be connected to the called party. If call features were allocated to the particular fixed terminal, and requested by the fixed terminal, the call features would be activated as requested by the user. In the event the call is terminated, the fixed terminal would reflect the ready state awaiting another call. When the call is ended, the fixed terminal would then reflect the ready state awaiting another call, and a de-registration message would be requested.

With respect to an incoming call that is directed to the public intelligent fixed terminals, the fixed terminal interfaces with wireline or wireless portable terminals and all traffic over the air is encrypted. If a particular user card (or user code) is utilized, incoming calls are routed to the directory number as indicated on the particular user card (or user code). If the incoming call is not answered, or the incoming call is call forwarded to another number or service (i.e., for example, voice mail service) the incoming call would be forwarded. When the incoming call is answered, the call will be connected through the PSTN by means of an intelligent base station. If call features were allocated to the particular fixed terminal, the call features would be activated. When the incoming call is ended (or otherwise terminated), the fixed terminal would then reflect the ready state awaiting another call, and a de-registration message would be requested.

Figure 5:
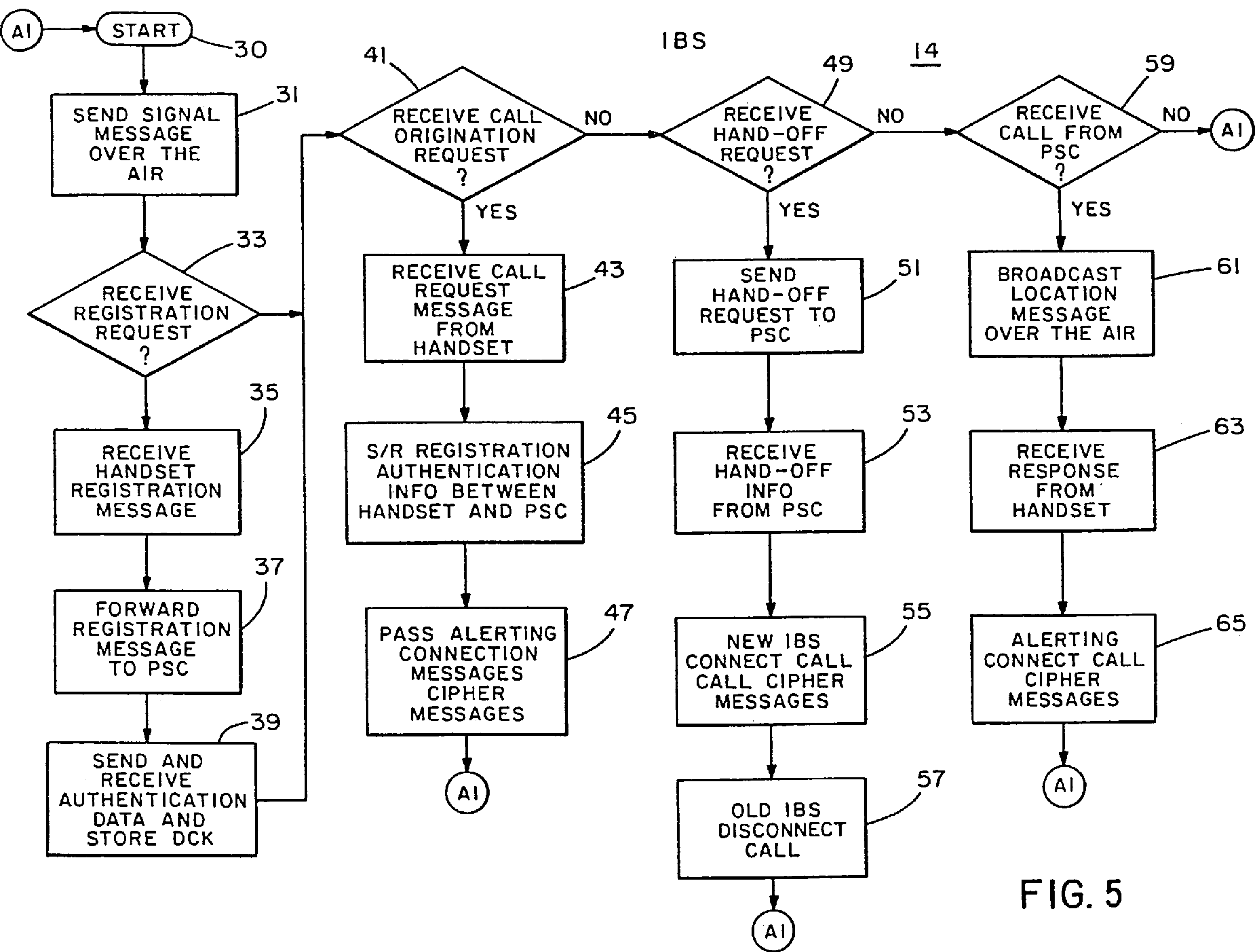
FIG. 5 is a system flowchart illustrating the particular functionality of the distributed logic that is resident in the intelligent base stations associated with the wireless digital personal communications system in accordance with the present invention.

FIG. 5 is a system flowchart illustrating the particular functionality of the distributed logic that is resident in the intelligent base stations associated with the wireless digital personal communications system in accordance with the present invention. Referring to FIG. 5, beginning with Start block 30, the intelligent base station begins by initializing the Send Signal Message Over The Air routine in block 31 to begin communicating with the portable handset terminals. After the Send Signal Message Over The Air routine in block 31 is completed, the intelligent base station is tested to determine if the intelligent base station has received a registration request from any of the portable handset terminals by the test in the Receive Registration Request block 33. If the answer to the Receive Registration Request test in block 33 is negative, indicating that the intelligent base station does not have a request for registration from a portable handset terminal, the intelligent base station will be tested to determine if the intelligent base station has received a call origination request from any of the portable handset terminals by the test in the Receive Call Origination Request block 41.

If the answer to the Receive Registration Request test in block 33 is affirmative, indicating that the intelligent base station does have a request for registration from a portable handset terminal, then the Receive Handset Registration Message routine in block 35 is initialized to begin receiving portable handset terminal registration message. After the Receive Handset Registration Message routine in block 35 is completed, the intelligent base station will then initialize the Forward Registration Message To PSC routine in block 37 to begin forwarding registration message to the PSC. After the Forward Registration Message To PSC routine in block 37 is completed, the intelligent base station will then initialize the Send And Receive Authentication Data And Store DCK routine in block 39 to begin sending and receiving the portable handset terminal authentication data and store the specific DCK number.

After the Send And Receive Authentication Data And Store DCK routine is completed, the intelligent base station is tested to determine if the intelligent base station has received a call origination request from any of the portable handset terminals by the test in the Receive Call Origination Request block 41. If the answer to the Receive Call Origination Request test in block 41 is affirmative, indicating that the intelligent base station does have a request for call origination from a portable handset terminal, then the Receive Call Request Message From Handset routine in block 43 is initialized to begin receiving call request message from a portable handset terminal. After the Receive Call Request Message From Handset routine in block 43 is completed, the intelligent base station will then initialize the S/R Registration Authentication Info Between Handset And PSC routine in block 45 to begin sending and receiving the specific registration and authentication information between the portable handset terminal and PSC. After the S/R Registration Authentication Info Between Handset And PSC routine in block 45 is completed, the intelligent base station will then initialize the Pass Alerting Connection Messages Cipher Messages routine in block 47 to begin passing the specific alerting connection messages and the cipher messages. After the Pass Alerting Connection Messages Cipher Messages routine in block 47 is completed, the intelligent base station again return to start block 30.

If the answer to the Receive Call Origination Request test in block 41 is negative, indicating that the intelligent base station does not have a request for call origination from a portable handset terminal, the intelligent base station will be tested to determine if the intelligent base station has received a hand-off request from any of the portable handset terminals by the test in the Receive Hand-Off Request block 49.

If the answer to the Receive Hand-Off Request test in block 49 is negative, indicating that the intelligent base station does not have a request for hand-off from a portable handset terminal, the intelligent base station will be tested to determine if the intelligent base station has received a call from the PSC by the test in the Receive Call From PSC block 59. If the answer to the Receive Hand-Off Request test in block 49 is affirmative, indicating that the intelligent base station has received a request for a hand-off from a portable handset terminal, the intelligent base station will then initialize the Send Hand-Off Request To PSC routine in block 51 to begin sending hand-off request to PSC. After the Send Hand-Off Request To PSC routine in block 51 is completed, the intelligent base station will then initialize the Receive Hand-Off Info From PSC routine in block 53 to begin receiving the specific hand-off information. After the Receive Hand-Off Info from PSC routine in block 53 is completed, the intelligent base station will then initialize the New IBS Connect Call-Call Cipher Messages routine in block 55 to begin connection with a new intelligent base station and to obtain pertinent cipher messages particulars. After the New IBS Connect Call-Call Cipher Messages routine in block 55 is completed, the intelligent base station will then initialize the Old IBS Disconnect Call routine in block 57 to begin disconnecting from an old intelligent base station. After the Old IBS Disconnect Call routine in block 57 is completed, the intelligent base station again return to start block 30.

If the answer to the Receive Hand-Off Request test in block 49 is negative, the intelligent base station will be tested to determine if the intelligent base station has received a call from the PSC by the test in the Receive Call From PSC block 59. If the answer to the Receive Call From PSC test in block 59 is affirmative, indicating that the intelligent base station has received a call from PSC, the intelligent base station will then initialize the Broadcast Location Message Over The Air routine in block 61 to begin broadcast location message over the air. After the Broadcast Location Message Over The Air routine in block 61 is completed, the intelligent base station will then initialize the Receive Response From Handset routine in block 63 to begin receiving a response from the portable handset terminals regarding the location message previously sent by the intelligent base station to the portable handset terminals. After the Receive Response From Handset routine in block 63 is completed, the intelligent base station will then initialize the Alerting Connect Call Cipher Messages routine in block 65 to begin alerting, connecting a call and cipher messages. After the Alerting Connect Call Cipher Messages routine in block 65 is completed, the intelligent base station again return to start block 30. If block 59 is negative, return to start block.

Figure 6:
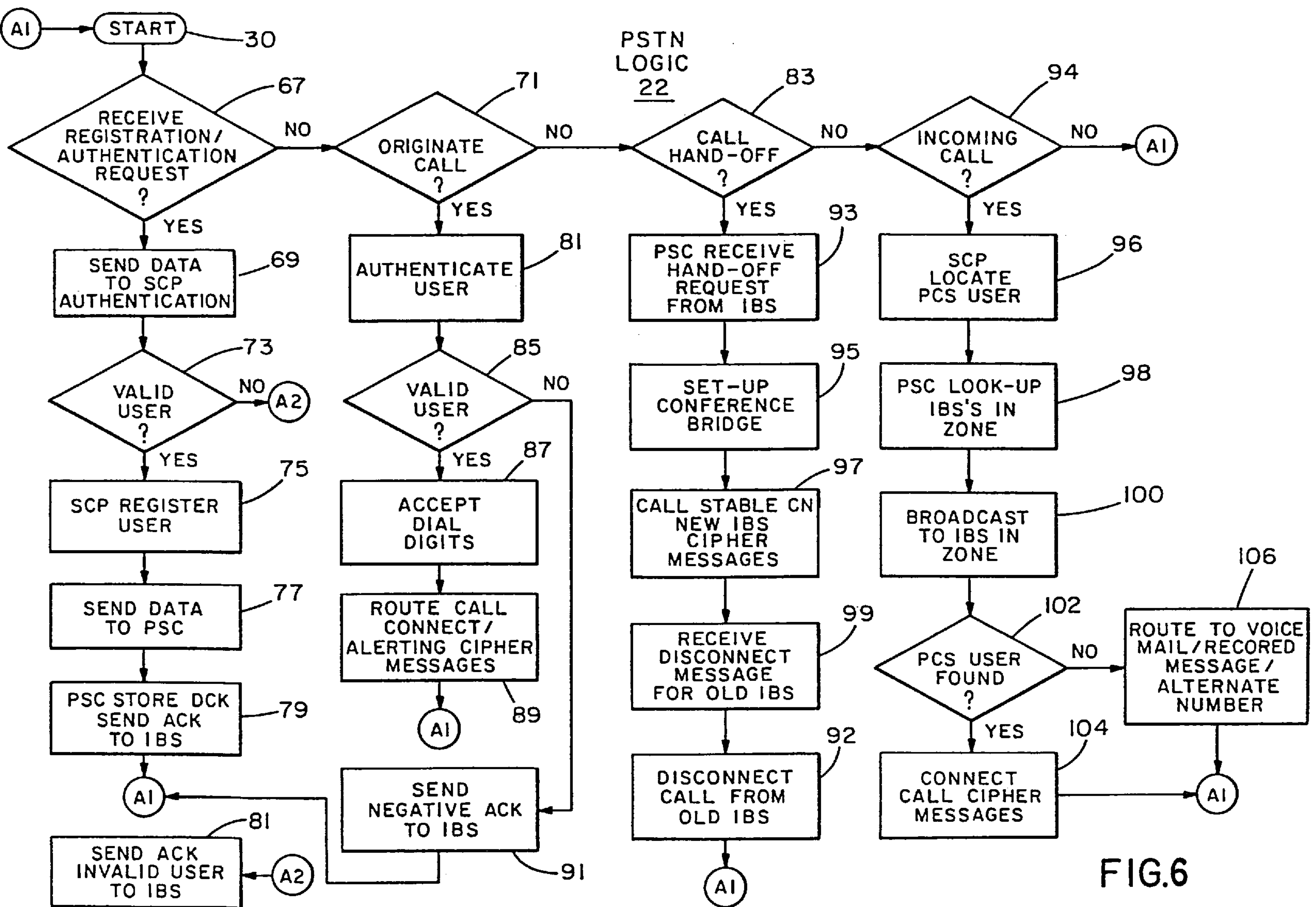
FIG. 6 is a system flowchart illustrating the particular functionality of the distributed logic that is resident in the public switched telephone network associated with the wireless digital personal communications system in accordance with the present invention.

FIG. 6 is a system flowchart illustrating the particular functionality of the distributed logic that is resident in the public switched telephone network, or any switched network, associated with the wireless digital personal communications system in accordance with the present invention. Referring to FIG. 6, beginning with Start block 30, the public switched telephone network begins by being tested to determine if the public switched telephone network has received a registration or authentication request from an intelligent base station by the test in the Receive Registration/Authentication Request block 67.

If the answer to the Receive Registration/Authentication Request test in block 67 is negative, indicating that the public switched telephone network has not received a request for registration/authentication from a intelligent base station, the public switched telephone network will be tested to determine if the public switched telephone network has received a call origination request from any of the intelligent base stations by the test in the Originate Call block 71. If the answer to the Receive Registration/Authentication Request test in block 67 is affirmative, indicating that the public switched telephone network has received a request for registration/authentication from an intelligent base station, then the Send Data To SCP Authenticate routine in block 69 is initialized to begin sending data to Service Control Point. After the Send Data To SCP Authenticate routine in block 69 is completed, the public switched telephone network will then be tested to determine if the PCS user is a valid PCS user by the test in the Valid User block 73.

If the answer to the Valid User test in block 73 is affirmative, indicating that the public switched telephone network does have a valid PCS user, then the SCP Register User routine in block 75 is initialized to have the public switched telephone network begin registering and authenticating user with the Service Control Point. After the SCP Register User routine in block 75 is completed, the public switched telephone network will then start the Send Data To PSC routine in block 77 to begin sending data to PSC. After the Send Data To PSC routine in block 77 is completed, the public switched telephone network will then initialize the PSC Store DCK Send Ack To IBS routine in block 79 to begin storing the DCK number and with an acknowledgment being sent by the public switched telephone network to the intelligent base station when finished. After the PSC Store DCK Send Ack To IBS routine in block 79 is completed, go to start block. If answer to valid user test in block 73 was "no", the PSTN will Send Ack Invalid User To IBS in block 81 to begin the acknowledgement of an invalid user being sent by the public switched telephone network to the intelligent base station.

If the answer to the Receive Registration/Authentication Request test in block 67 is negative, indicating that the public switched telephone network has not received a request for registration/authentication from a intelligent base station, the public switched telephone network will be tested to determine if the public switched telephone network has received a call origination request from any of the intelligent base stations by the test in the Originate Call block 71.

If the answer to the Originate Call test in block 71 is negative, indicating that the public switched telephone network does not a request for call origination from a intelligent base station, the public switched telephone network will be tested to determine if the public switched telephone network has received a call hand-off request from any of the intelligent base stations by the test in the Call Hand-Off block 83.

If the answer to the Originate Call test in block 71 is affirmative, indicating that the public switched telephone network does have a call origination request from an intelligent base station, then the Authenticate User routine in block 81 is initialized to begin authenticating the user for purposes of originating a call. After the Authenticate User routine in block 81 is completed, the public switched telephone network will then be tested to determine if the PCS user is a valid PCS user by the test in the Valid User block 85.

If the answer to the Valid User test in block 85 is affirmative, indicating that the public switched telephone network does have a valid PCS user, then the Accept Dial Digits routine in block 87 is initialized to have the public switched telephone network begin accepting the dialed digits of the user's call. After the Accept Dial Digits routine in block 87 is completed, the public switched telephone network will then initialize the Route Call Connect/Alerting Cipher Messages routine in block 89 to begin routing and connect the call, and alerting the intelligent base stations with respect to the cipher messages. After the Route Call Connect/Alerting Cipher Messages routine in block 89 is completed, the public switched telephone network will again return to start block 30.

If the answer to the Valid User Test in block 85 is negative, indicating that the public switched telephone network does not have a valid PCS user, then the Send Negative Ack To IBS routine in block 91 is initialized to have the public switched telephone network begin sending a negative acknowledgement to the intelligent base station with respect to the invalid status of the PCS user. After the Send Negative Ack To IBS routine in block 91 is completed, the public switched telephone network will again return to start block 30.

If the answer to the Call Hand-Off test in block 83 is negative, indicating that the public switched telephone network does not a request for call hand-off from a intelligent base station, the public switched telephone network will be tested to determine if the public switched telephone network has received a call hand-off request from any of the intelligent base stations by the test in the Incoming Call block 94.

If the answer to the Call Hand-Off test in block 83 is affirmative, indicating that the public switched telephone network does have a call hand-off request from an intelligent base station, then the PSC Receive Hand-Off Request From IBS routine in block 93 is initialized to begin having the PSC receive the hand-off request for purposes of handing-off a call. After the PSC Receive Hand-Off Request From IBS routine in block 93 is completed, the public switched telephone network will then initialize the Set-Up Conference Bridge routine in block 95 to bridge the call during actual hand-off from one intelligent base station to another intelligent base station. After the Set-Up Conference Bridge routine in block 95 is completed, the public switched telephone network will then initialize the Call Stable On New IBS Cipher Messages routine in block 97 to begin to stabilize the call on the new intelligent base station and to begin to cipher messages. After the Call Stable On New IBS Cipher Messages routine in block 97 is completed, the public switched telephone network will then initialize the Receive Disconnect Message For Old IBS routine in block 99 to begin to receiving the disconnect message from the old intelligent base station involved in the hand-off. After the Receive Disconnect Message For Old IBS routine in block 99 is completed, the public switched telephone network will then initialize the Disconnect Call From Old IBS routine in block 92 to begin disconnecting call from the old intelligent base station that is involved in the hand-off. After the Disconnect Call From Old IBS routine in block 92 is completed, the public switched telephone network will again return to start block 30.

If the answer to the Call Hand-Off test in block 83 is negative, indicating that the public switched telephone network has not received a request for call hand-off from a intelligent base station, the public switched telephone network will be tested to determine if the public switched telephone network has received an incoming call from any of the intelligent base stations by the test in the Incoming Call block 94. If the answer to the Incoming Call test in block 94 is negative, indicating that the public switched telephone network does not have an incoming call from an intelligent base station, the public switched telephone network will again return to start block 30. If the answer to the Incoming Call test in block 94 is affirmative, indicating that the public switched telephone network does have an incoming call from an intelligent base station, then the SCP Locate PCS User routine in block 96 is initialized to begin having the SCP locate the PCS user. After the SCP Locate PCS User routine in block 96 is completed, the public switched telephone network will then initialize the PSC Look-Up IBS's In Zone routine in block 98 to begin looking up which intelligent base stations are in the zone where the PCS user is located. After the PSC Look-Up IBS's Zone routine in block 98 is completed, the public switched telephone network will then initialize the Broadcast To IBS In Zone routine in block 100 to begin broadcasting to the intelligent base station in the particular zone where the PCS user is located. After the Broadcast To IBS In Zone routine in block 100 is completed, the public switched telephone network will then be tested to determine if the public switched telephone network has found the PCS user by the test in the PCS User Found block 102.

If the answer to the PCS User Found test in block 102 is negative, indicating that the public switched telephone network has not yet found the location of the PCS user, the public switched telephone network will initialize the Route To Voice Mail/Record Message/Alternate Number routine in block 106 to begin to route the call to voice mail, record message, and see if an alternate number is available for the PCS user. After the Route To Voice Mail/Record Message/Alternate Number routine in block 106 is completed, the public switched telephone network will again return to start block 30.

If the answer to the PCS User Found test in block 102 is affirmative, indicating that the public switched telephone network has found the location of the PCS user, then the Connect Call Cipher Messages routine in block 104 is initialized to begin connecting the call to the PCS user and ciphering the messages. After the Connect Call Cipher Messages routine in block 104 is completed, the public switched telephone network will again return to start block 30.

Figure 7:
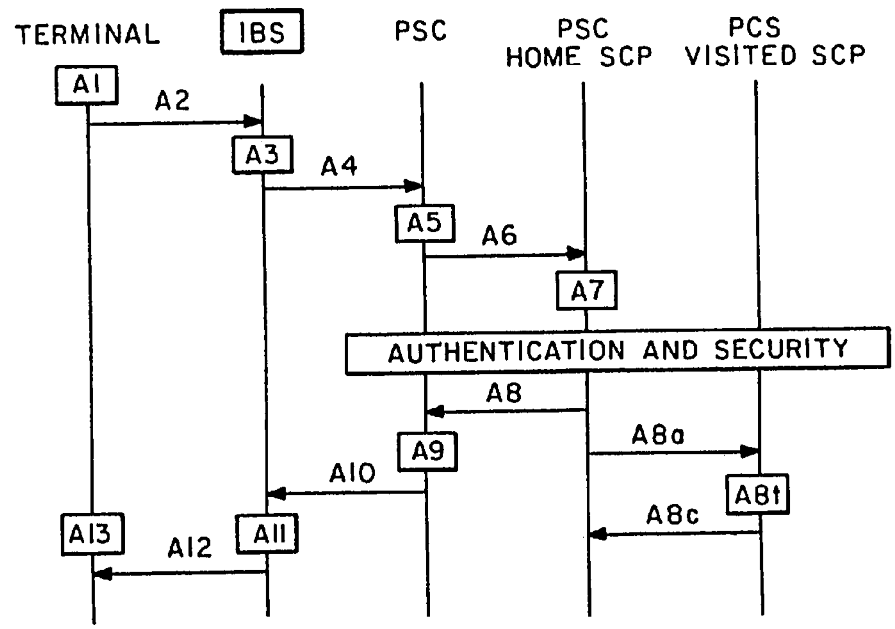
FIG. 7 is a time sequence diagrammatic flowchart illustrating registration of an intelligent portable handset terminal in the wireless digital personal communications system in accordance with the present invention.

FIG. 7 is a time sequence diagrammatic flowchart illustrating registration of an intelligent portable handset terminal in the wireless digital personal communications system in accordance with the present invention with respect to the specific call and signaling flows. FIG. 7 illustrates a portable handset terminal registering while in its home serving area. The home serving area is comprised of one or more zones (which in turn consist of one or more intelligent base stations). The portable handset terminal registers to a zone, thus it only needs to re-register if it detects a better, higher quality signal from an intelligent base station in a new zone. As part of the registration process, a private key-based authentication procedure is used to authenticate the portable handset terminal.

The registration process is initiated when the portable handset terminal sends a registration request with its identity to an intelligent base station. The intelligent base station in turn sends the request to the PSC. The intelligent base station identifies the appropriate Base Station Routing Number of the zone serving the portable handset terminal, and correspondingly sends a query, via the PSC, to the Service Control Point with this information and the portable handset terminal's identity. The Service Control Point retrieves the appropriate information for the portable handset terminal and initiates authentication as described in the next flow. If the authentication is successful the Service Control Point records the registration (i.e., the intelligent Base Station Routing Number serving the terminal). The Service Control Point then sends a positive response to the initial query which is forwarded to the portable handset terminal. If the portable handset terminal fails the challenge, the Service Control Point returns a failure indication along with the reason for failure.

Referring to FIG. 7, at time sequence event A1, the portable handset terminal detects a better, higher quality signal from a different zone, or is powered "ON" and requests a location update. The portable handset terminal prepares a location request message for the intelligent base station. Automatic terminal registration will not occur for portable handset terminals that have one-way outgoing class of service. At time sequence event A2, the portable handset terminal sends its identity to the intelligent base station as part of the location request message. The identity consists of PCSPID (PCS Provider ID), the terminal's number, and the universal personal telephone number (UPT), if available. At time sequence event A3, the intelligent base station receives the location request message from a portable handset terminal and determines that the handset terminal desires to register. This message contains the terminal's identity (Terminal Number, Personal Communications Service Provider Identification (PCSPID) and UPT). At time sequence event A4, the intelligent base station sends an ISDN non-call associated registration message to the PSC. This message contains the portable handset terminal's identity (Terminal Number, Personal Communications Service Provider Identification (PCSPID), Operation Code, Base Station Routing Number and, UPT, if available). At time sequence event A5, the PSC receives the registration message and, if the Base Station Routing Number is not received, determines the associated base station routing number. At time sequence event A6, the PSC sends an AIN registration message to the Service Control Point. This message includes the portable handset terminal's identity (Terminal Number, Personal Communications Service Provider Identification (PCSPID), Operation Code, and UPT) and the Base Station Routing Number. At time sequence event A7, the Service Control Point receives the message and determines that it is a registration request and performs the authentication and security process. At the conclusion of the process, the Service Control Point continues with the registration. At time sequence event A8, the Service Control Point sends an AIN registration reply message to the PSC. The message contains the Terminal Number and the Base Station Routing Number, the registration acknowledgment (or alternatively, an indication of failure and reason). At time sequence event A8*a*, if necessary, the Service Control Point sends an AIN de-registration message to the current Visited Service Control Point to deregister the portable handset terminal. This message contains the Terminal Number, PCSPID, and UPT, if available). At time sequence event A8*b*, the Visited Service Control Point receives the deregistration message and deregisters the portable handset terminal in its local database. At time sequence event A8*c*, the Visited Service Control Point sends an AIN deregistration acknowledgement message to the Service Control Point. At time sequence event A9, the PSC receives the message. At time sequence event A10, the PSC sends an ISDN non-call associated registration reply message to the intelligent base station. The message contains the Terminal Number, the Base Station Routing Number, and the registration acknowledgment. At time sequence event A11, the intelligent base station receives the message. At time sequence event A12, the intelligent base station sends the location response message to the portable handset terminal. At time sequence event A13, the portable handset terminal activates an "in service" indicator.

For the specific functional message requirements for portable handset terminal registration, see Appendix I, attached hereto and made a part hereof.

With respect to Appendix I, the message elements found therein pertaining to FIGS. 6-26, are included for the purposes of deriving the necessary PCS functionality. Other information elements that are pertaining to ISDN, ISUP, AIN, TCAP and air interface (i.e., radio interface) are not shown but continue to be mandatory to achieve PCS continuity.

Protocol discriminators, message type, and message length components are not accounted for in the size of the information, and may be variable in length.

Figure 8:
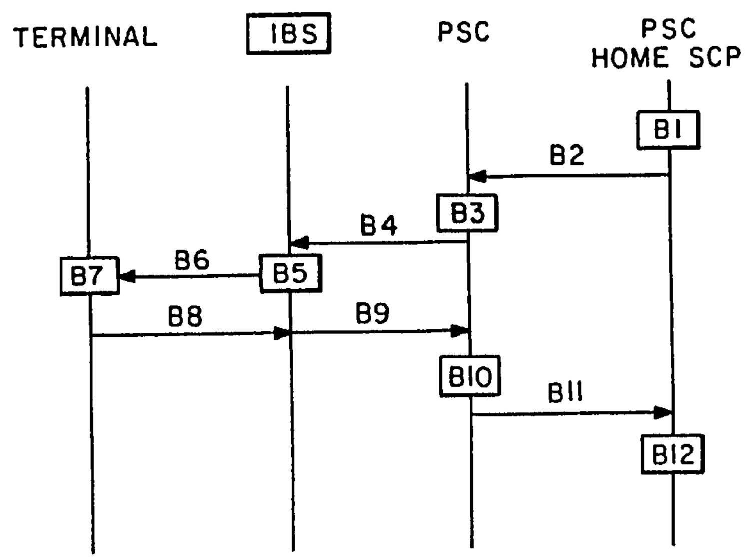
FIG. 8 is a time sequence diagrammatic flowchart illustrating authentication of an intelligent portable handset terminal, and security key derivation, in the wireless digital personal communications system in accordance with the present invention.

FIG. 8 is a time sequence diagrammatic flowchart illustrating authentication of an intelligent portable handset terminal, and security key derivation, in the wireless digital personal communications system in accordance with the present invention with respect to the specific call and signaling flows for authentication and security key derivation. FIG. 8 illustrates the private key authentication and security key derivation process used by the intelligent base station when the portable handset terminal is in the home serving area. It is actually a sub-flow which is used within the registration, call origination and incoming call flows. The authentication and security scheme uses a challenge-response mechanism which is initiated in the Service Control Point as part of another flow.

The process is based on the Service Control Point performing a series of calculations based on private information it maintains for the portable handset terminal. It then sends the portable handset terminal a challenge to perform a parallel calculation (based on Service Control Point provided information) and return its answer. If the two results match, the portable handset terminal is authenticated. In addition, this shared information allows the Service Control Point and portable handset terminal to perform parallel calculations to derive the cipher key for encrypting the radio interface (i.e., the air interface).

Referring to FIG. 8, at time sequence event B1, the Service Control Point determines the need to authenticate the portable handset terminal; this is a result of a registration request, etc. The Service Control Point then (i) determines the user authentication key (UAK) from the provider's database; (ii) derives K from UAK using algorithm B1, and K is used for authentication and to derive the cipher key; (iii) obtains RS from the provider's database; (iv) derives KS from K and RS using the algorithm A11; (v) generates RAND_F using a random number generator; and (vi) derives XRES1 and the derived cipher key (DCK) from KS and RAND_F using algorithm A12. At time sequence event B2, the Service Control Point then sends an AIN authentication request message to the PSC. This message contains the portable handset terminal's identity (Terminal Number, Personal Communications Service Provider Identification (PCSPID)), Base Station Routing Number, RS, RAND_F, and UPT, if available). At time sequence event B3, the PSC receives the message from Service Control Point. At time sequence event B4, the PSC sends an ISDN non-call associated Authentication request message to the intelligent base station. This message contains the portable handset terminal's identity (Terminal Number, Personal Communications Service Provider Identification (PCSPID)), Base Station Routing Number, RS, RAND_F, and UPT, if available). At time sequence event B5, the intelligent base station receives the message from the PSC. At time sequence event B6, the intelligent base station sends an authentication request message to the portable handset terminal. This message contains RS and RAND_F. At time sequence event B7, the portable handset terminal receives the message from the intelligent base station and then the portable handset terminal (i) derives K from its UAK using algorithm B1; (ii) derives KS from K and RS (received from the Service Control Point) using algorithm A11; and (iii) derives RES1 and the derived cipher key (DCK) from KS and RAND_F using algorithm A12. At time sequence event B8, the portable handset terminal sends an authentication reply message to the intelligent base station. This message contains the derived RES1. At time sequence event B9, the intelligent base station sends an ISDN non-call associated authentication reply to the PSC. This message contains the derived RES1, the Base Station Routing Number, the Terminal Number, and the Operation Code. At time sequence event B10, the PSC receives the message from the IBS. At time sequence event B11, the PSC sends an AIN authentication reply message to the Service Control Point. This message contains the derived RES1, the Base Station Routing Number, Terminal Number, and Operation Code. At time sequence event B12, the Service Control Point receives the message from the PSC. The Service Control Point compares the RES1 value it receives with the previously calculated value XRES1. If they agree the portable handset terminal is authenticated. At this point, the process that initiated this authentication resumes (e.g., Registration).

The B1 algorithm is explained in a certain DECT reference, which is hereby incorporated by reference (DECT document ETS 300 175-7: May 1992, Section 4.3, Page 17 et seq.). In similar manner, the A11 algorithm is explained in a certain DECT reference, which is hereby incorporated by reference (DECT Document ETS 300 175-7: May 1992, Section 4.3, Page 17 et seq.). In similar manner, the A12 algorithm is explained in a certain DECT reference, which is hereby incorporated by reference (DECT Document ETS 300 175-7: May 1992, Section 4.3, Page 17 et seq.).

For the specific functional message requirements for authentication and security key derivation, see Appendix I, attached hereto and made a part hereof.

Figure 9:
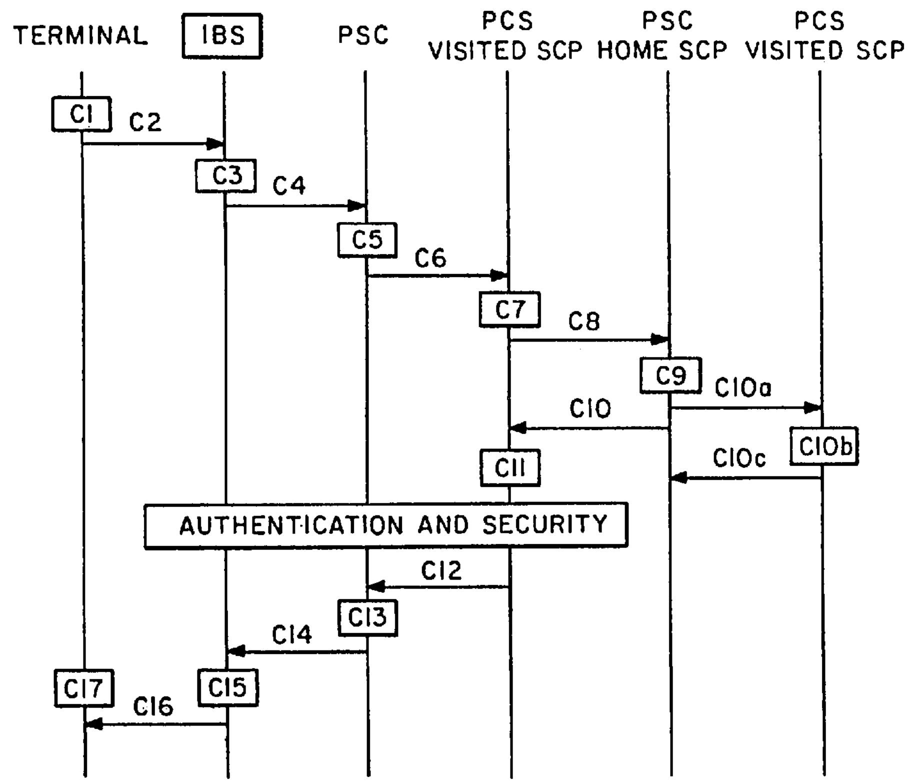
FIG. 9 is a time sequence diagrammatic flowchart illustrating registration of an intelligent portable handset terminal in the roaming mode of operation in the wireless digital personal communications system in accordance with the present invention.

FIG. 9 is a time sequence diagrammatic flowchart illustrating registration of an intelligent portable handset terminal in the roaming mode of operation (PCS Visited) in the wireless digital personal communications system in accordance with the present invention with respect to the specific call and signaling flows for the terminal registration for roaming (PCS Visited). In this particular scenario, the portable handset terminal is registering while outside the home serving area. This requires the Visited Service Control Point to query the Home Service Control Point for information while also providing the Home Service Control Point pertinent registration information (i.e., the Base Station Routing Number). Additionally, as described in the Authentication and Security process for roaming, the Home Service Control Point returns information to the Visited Service Control Point in the registration response to allow the authentication and security process to take place. The Visited Service Control Point in turn stores a record of information about the portable handset terminal for the duration of the registration. This is necessary for subsequent call originations or to deliver incoming calls to the portable handset terminal. Referring to FIG. 9, at time sequence event C1, the portable handset terminal detects a better, higher quality signal from a different zone, or is powered "ON" and requests a location update. The portable handset terminal prepares a location request message for the intelligent base station. Automatic terminal registration will not occur for portable handset terminals that have one-way outgoing class of service. At time sequence event C2, the portable handset terminal sends its identity to the intelligent base station as part of the location request message. The identity consists of PCSPID (PCS Provider ID), Terminal Number, and UPT, if available). At time sequence event C3, the intelligent base station receives the message from a portable handset terminal and determines that the portable handset terminal desires to register and that the terminal is allowed to use the Network. This message contains the portable handset terminal's identity (Terminal Number, Personal Communications Service Provider Identification (PCSPID), and UPT). At time sequence event C4, the intelligent base station sends an ISDN non-call associated registration message to the PSC. This message contains the portable handset terminal's identity (Terminal Number, Personal Communications Service Provider Identification (PCSPID), Operation Code, Base Station Routing Number and UPT, if available). At time sequence event C5, the PSC receives the registration message sent by the intelligent base station. If the intelligent base station did not send the Base Station Routing Number, the PSC determines the associated Base Station Routing Number. At time sequence event C6, the PSC sends an AIN registration message to the Visited Service Control Point. This message includes the portable handset terminal's identity (Terminal Number, Personal Communications Service Provider Identification (PCSPID) and UPT, if available), the Base Station Routing Number and the Operation Code. At time sequence event C7, the Visited Service Control Point receives the message sent by the PSC and the Visited Service Control Point determines from the service provider ID (PCSPID) that it does not maintain the home database for the portable handset terminal. At time sequence event C8, the Visited Service Control Point sends an IS41 session key request message to the Home Service Control Point. This message contains the portable handset terminal's identity (Terminal Number, Personal Communications Service Provider Identification (PCSPID), UPT, and Base Station Routing Number (the routing number implicitly identifies the serving PCS provider). At time sequence event C9, the Home Service Control Point receives the message sent by the Visited Service Control Point. The Home Service Control Point develops the KS and RS values for the portable handset terminal, and the Home Service Control Point also updates the user's location to that of the Base Station Routing Number. At time sequence event C10, the Home Service Control Point sends an IS41 session key reply message to the Visited Service Control Point. This message contains RS and KS, along with terminal/user profile information. At time sequence event C10*a*, if necessary, the Home Service Control Point sends an IS41 deregistration message to any previously Visited Service Control Point to deregister the portable handset terminal. This message contains the PCSPID, the Terminal Number, and UPT, if available). At time sequence event C10*b*, the Visited Service Control Point receives the deregistration message from the Home Service Control Point. The Visited Service Control Point deregisters the portable handset terminal in its local database. At time sequence event C10, the previously Visited Service Control Point sends an IS41 deregistration acknowledgement message to the Home Service Control Point. At time sequence event C11, the Visited Service Control Point receives the reply message and updates its database with the portable handset terminal/user's information (e.g., RS, KS, and Profile Information). The Visited Service Control Point then initiates and performs the authentication and security process, at the conclusion of which the Service Control Point continues with the registration. At time sequence event C12, the Service Control Point sends an AIN registration reply message to the PSC. The message contains the Terminal Number, Base Station Routing Number, and registration acknowledgment (or alternatively, an indication of failure and reason). At time sequence event C13, the PSC receives the message sent by the Service Control Point. At time sequence event C14, the PSC sends an ISDN non-call associated registration reply message to the intelligent base station. The message contains the registration acknowledgment, the Terminal Number and the Base Station Routing Number. At time sequence event C15, the intelligent base station receives the message sent by the PSC. This message contains the status of the registration request. At time sequence event C16, the intelligent base station sends a location response message to the portable handset terminal. At time sequence event C17, the portable handset terminal activates an "in service" indicator.

For the specific functional message requirements for intelligent portable handset terminal registration—roaming mode of operation (PCS Visited), see Appendix I, attached hereto and made a part hereof.

Figure 10:
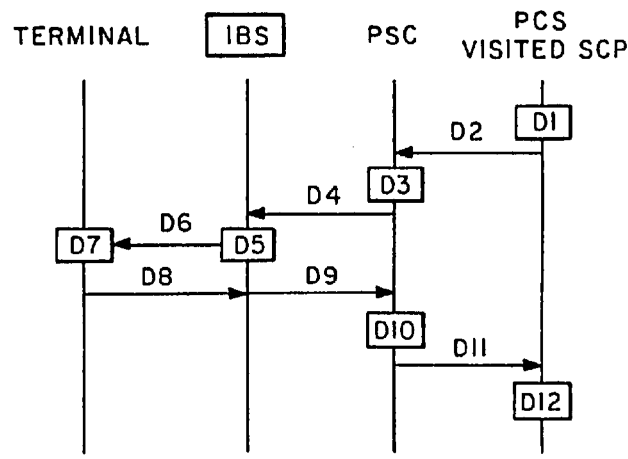
FIG. 10 is a time sequence diagrammatic flowchart illustrating authentication of an intelligent portable handset terminal, and security key derivation, in the roaming mode of operation in the wireless digital personal communications system in accordance with the present invention.

FIG. 10 is a time sequence diagrammatic flowchart illustrating authentication, of an intelligent portable handset terminal, and security key derivation, in the roaming mode of operation in the wireless digital personal communications system in accordance with the present invention with respect to the specific call and signaling flows for authentication and security key derivation in the roaming mode of operation. The authentication and security process for roaming is a variation of the process used for portable handset terminals in their home serving area. This is driven by the registration of a roaming handset terminal and results in sufficient information being sent to the Visited Service Control Point for subsequent authentication and security processes to be run locally. Note that this does not preclude returning to the Home Service Control Point on occasion. For example, the information stored at the Visited Service Control Point may expire after a set period of time and require a query to the Home Service Control Point for new information. This allows the portable handset terminal to be authenticated locally (at the Visited Service Control Point) on call originations, call deliveries and subsequent registrations. The actual process for roaming authentication and security is initiated at the Home Service Control Point in response to a registration attempt by a Visited Service Control Point. The Home Service Control Point performs the same calculations as with the home serving area scenario and then sends the results and other limited information to the Visited Service Control Point to allow authentication of the portable handset terminal to be completed there. This limited information is specifically designed for this purpose and does not divulge any of the portable handset terminal's private information which remains known only to the portable handset terminal and Home Service Control Point.

Referring to FIG. 10, at time sequence event D1, the Visited Service Control Point determines the need to authenticate the portable handset terminal. This is as a result of a registration request, etc. Utilizing the values for RS and KS sent from the Home Service Control Point, the Visited Service Control Point then: (i) generates RAND_F using a random number generator; and then (ii) derives XRES1 and the derived cipher key (DCK) from KS and RAND_F using algorithm A12. At time sequence event D2, the Visited Service Control Point sends an AIN authentication request message to the PSC. This message contains the portable handset terminal's identity (Terminal Number, Personal Communications Service Provider Identification (PCSPID) and UPT), RS, RAND_F and the Base Station Routing Number. At time sequence event D3, the PSC receives the message sent by the Visited Service Control Point. At time sequence event D4, the PSC sends an ISDN non-call associated authentication request message to the intelligent base station. This message contains the portable handset terminal's identity (Terminal Number, Personal Communications Service Provider Identification (PCSPID) and UPT), RS, RAND_F and the Base Station Routing Number. At time sequence event D5, the intelligent base station receives the message sent by the PSC. At time sequence event D6, the intelligent base station sends an authentication request message to the portable handset terminal. This message contains RS and RAND_F. At time sequence event D7, the portable handset terminal receives the message sent by the IBS and then (i) derives K from its UAK using algorithm B1;

(ii) derives KS from K and RS (received from the Service Control Point) using algorithm A11; and (iii) derives RES1 and the derived cipher key (DCK) from KS and RAND_F using algorithm A12. At time sequence event D8, the portable handset terminal sends an authentication reply message to the intelligent base station. This message contains the derived RES1. At time sequence event D9, the intelligent base station sends an ISDN non-call associated authentication reply message to the PSC. This message contains the derived RES1, the Base Station Routing Number, Terminal Number, and Operation Code. At time sequence event D10, the PSC receives the message sent by the intelligent base station. At time sequence event D11, the PSC sends an AIN authentication reply message to the Visited Service Control Point. This message contains the derived RES1, Base Station Routing Number, Terminal Number and Operation Code. At time sequence event D12, the Visited Service Control Point receives the message sent by the PSC. The Visited Service Control Point compares the RES1 value it receives with the previously calculated value XRES1; if they agree, the portable handset terminal is authenticated. At this point, the process that initiated this authentication resumes.

For the specific functional message requirements for authentication and security key derivation in the roaming mode of operation, see Appendix I, attached hereto and made a part hereof.

Figure 11:
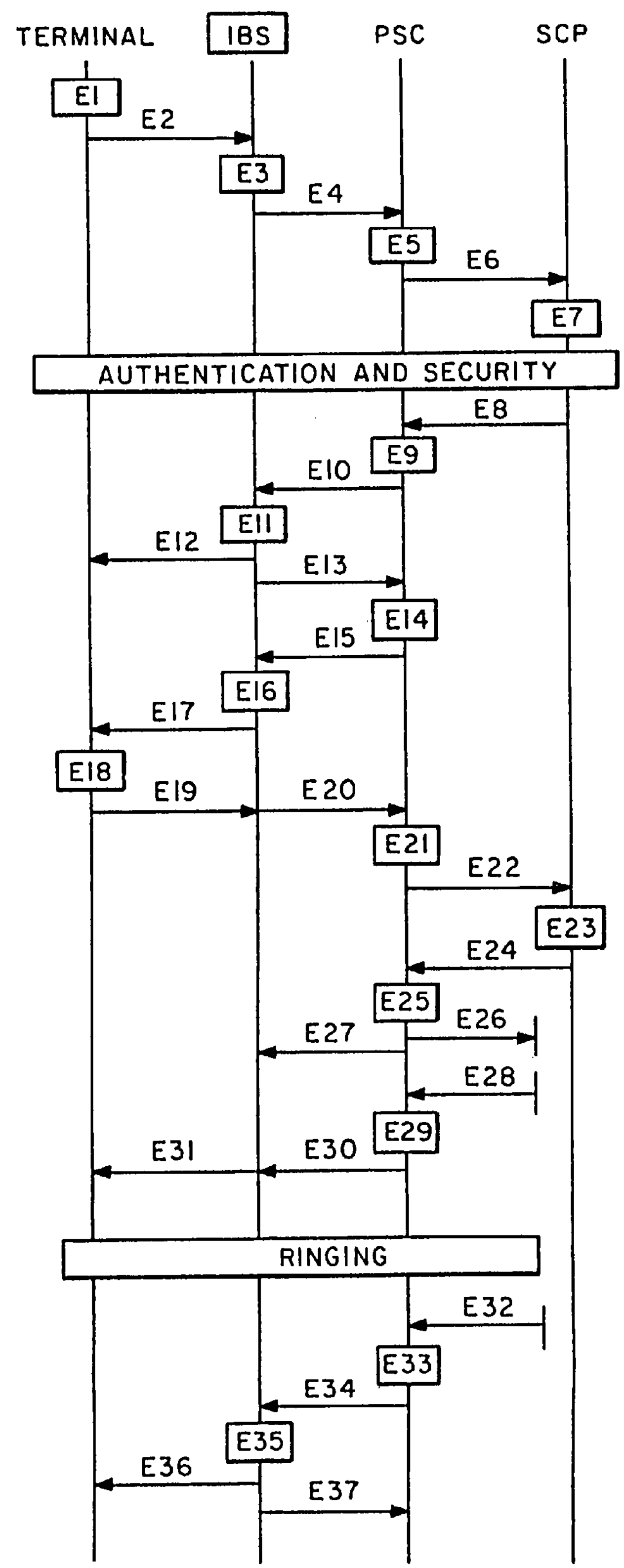
FIG. 11 is a time sequence diagrammatic flowchart illustrating call origination with respect to an intelligent portable handset terminal in the wireless digital personal communications system in accordance with the present invention.

FIG. 11 is a time sequence diagrammatic flowchart illustrating call origination with respect to an intelligent portable handset terminal in the wireless digital personal communications system in accordance with the present invention with respect to the specific call and signaling flows for call origination. This particular scenario illustrates an outgoing call from a portable handset terminal. The portable handset terminal initiates the call by sending a service request to an intelligent base station indicating the desire to originate a call. The intelligent base station sends a corresponding service request to the PSC, which in turn sends a service request query to the Service Control Point. The Service Control Point authenticates the portable handset terminal and validates the request. A positive response is passed back to the intelligent base station. The intelligent base station then establishes a "B" channel with the network (before responding to the terminal); this allows for dial-tone to be supplied by the network and correspondingly provides for overlap dialing by the user. Note, that this does not indicate that in-band tones are sent across the radio interface (i.e., the air interface). The intelligent base station performs a preliminary analysis on the dialed digits using a digit analysis table and then sends them to the PSC. The PSC triggers on the call origination and queries the Service Control Point. This trigger occurs on all calls originated from PCS interfaces (with exceptions for calls to emergency services, etc.). The Service Control Point validates the request and responds to the PSC.

Referring to FIG. 11, at time sequence event E1, the portable handset terminal requests call origination. At time sequence event E2, the portable handset terminal transmits a Setup Request message with its identity to the intelligent base station. The identity consists of its PCSPID, Terminal Number, and UPT (if available). At time sequence event E3, the intelligent base station receives the setup request message from the portable handset terminal and determines that the terminal desires to originate a call. This message contains the portable handset terminal's identity (Terminal Number, Personal Communications Service Provider Identification (PCSPID) and UPT, if available). At time sequence event E4, the intelligent base station sends an ISDN non-call associated service request message to the PSC. This message contains the portable handset terminal's identity (Terminal Number, Personal Communications Service Provider Identification (PCSPID), channel identification, Base Station Routing Number, Operation Code, and UPT). At time sequence event E5, the PSC receives the request message sent by the intelligent base station. Alternatively, the PSC creates a record indicating the portable handset terminal is now active. This record is maintained until the user returns to the "idle" mode, and allows the PSC to treat subsequent incoming calls to active users appropriately. At time sequence event E6, the PSC sends an AIN Service Request message to the Service Control Point. This message includes the portable handset terminal's identity (Terminal Number, Personal Communications Service Provider Identification (PCSPID) and UPT), Base Station Routing Number and Operation Code. At time sequence event E7, the Service Control Point receives the message sent by the PSC and determines that it is a service request and performs the authentication and security process, at the conclusion of which, the Service Control Point continues with the service request processing. At time sequence event E8, the Service Control Point sends an AIN service reply message to the PSC. The message contains the Terminal Number, derived cipher key (DCK), User Profile, a service request acknowledgment, Base Station Routing Number and Operation Code. At time sequence event E9, the PSC receives the message sent by the Service Control Point. Alternatively, if the PSC maintains a record of active calls, it may record the DCK at this point for future use (e.g., in support of Hand-Off). At time sequence event E10, the PSC sends an ISDN non-call associated Service Reply message to the intelligent base station. The message contains the handset Terminal Number, derived cipher key (DCK), Base Station Routing Number, Operation Code, and a service request acknowledgment. At time sequence event E11, the intelligent base station receives the message sent by the PSC and stores the DCK. At time sequence event E12, the intelligent base station sends a Cipher Enable message to the portable handset terminal. At time sequence event E13, the intelligent base station sends an ISDN Setup message to the PSC. This message contains the "B" channel for the call, PCSPID, calling party number (DN of the interface to the intelligent base station), and the Calling Party Subaddress ID (UPT number or Terminal Number). At time sequence event E14, the PSC receives the ISDN Setup message and allocates the "B" channel. Alternatively, if the PSC maintains a record of active calls, it may record the "B" channel allocation. This information would be maintained for future use (e.g., in support of Hand-Off). At time sequence event E15, the PSC sends an ISDN Setup Acknowledgement to the intelligent base station. At time sequence event E16, the intelligent base station receives the acknowledgment to indicate that the network is ready. It also cuts through the dial-tone to the portable handset terminal. At time sequence event E17, the intelligent base station sends a Setup Acknowledgement message to the portable handset terminal. This signals that dial-tone is "ON". At time sequence event E18, the portable handset terminal receives the message and dial-tone is heard by the user. The user either dials the number or, if the user already entered the digits, the portable handset terminal transmits the dialed digits in INFOrmation messages to the intelligent base station. At time sequence event E19, the portable handset terminal sends one or more Information messages to the intelligent base station containing the dialed digits. At time sequence event E20, the intelligent base station receives the dialed digits and analyzes them via its digit analysis table and sends one or more ISDN information messages to the PSC containing the dialed digits. At time sequence event E21, the PSC receives the message(s) and turns "OFF" the dial-tone after receiving the first message. The PSC triggers at the Off-Hook Delay Trigger. The trigger criteria is all calls received at this interface (with an exceptions list). At time sequence event E22, the PSC sends an AIN Information Collected message to the Service Control Point. This message contains the Called Party ID, DN of the interface to the intelligent base station, the UPT number or Terminal Number. At time sequence event E23, the Service Control Point receives the message and validates the call origination attempt. At time sequence event E24, the Service Control Point sends an AIN Route Analyzed message to the PSC. The message contains the Called Party ID, Calling Party ID (Terminal Number or UPT number), charge number and station type, and primary carrier (ICN). If the user is not allowed to make the call, the Service Control Point sends an AIN Send_To_Resource message to direct the appropriate treatment. At time sequence event E25, the PSC receives the message sent by the Service Control Point. At time sequence event E26, the PSC sends an ISUP Initial Address Message to the called office. At time sequence event E27, the PSC also sends an ISDN Call Proceeding message to the intelligent base station. At time sequence event E28, an ISUP Address Complete message is sent from the far end to the PSC. At time sequence event E29, the PSC receives the message. At time sequence event E30, the PSC sends an ISDN Alerting message to the intelligent base station. The message indicates the ringing is supplied from the terminating switch. At time sequence event E31, the intelligent base station passes the ringing tone over the "B" channel to the portable handset terminal and sends an Alerting message. At time sequence event E32, an ISUP Answer message is sent from the far end. At time sequence event E33, the PSC receives the message. At time sequence event E34, the PSC sends an ISDN Connect message to the intelligent base station. At time sequence event E35, the intelligent base station receives the message. At time sequence event E36, the intelligent base station sends a Connect message to the portable handset terminal. At time sequence event E37, the intelligent base station also sends an ISDN Connect Acknowledge message to the PSC.

For the specific functional message requirements for intelligent portable handset terminal call origination, see Appendix I, attached hereto and made a part hereof.

Figure 12:
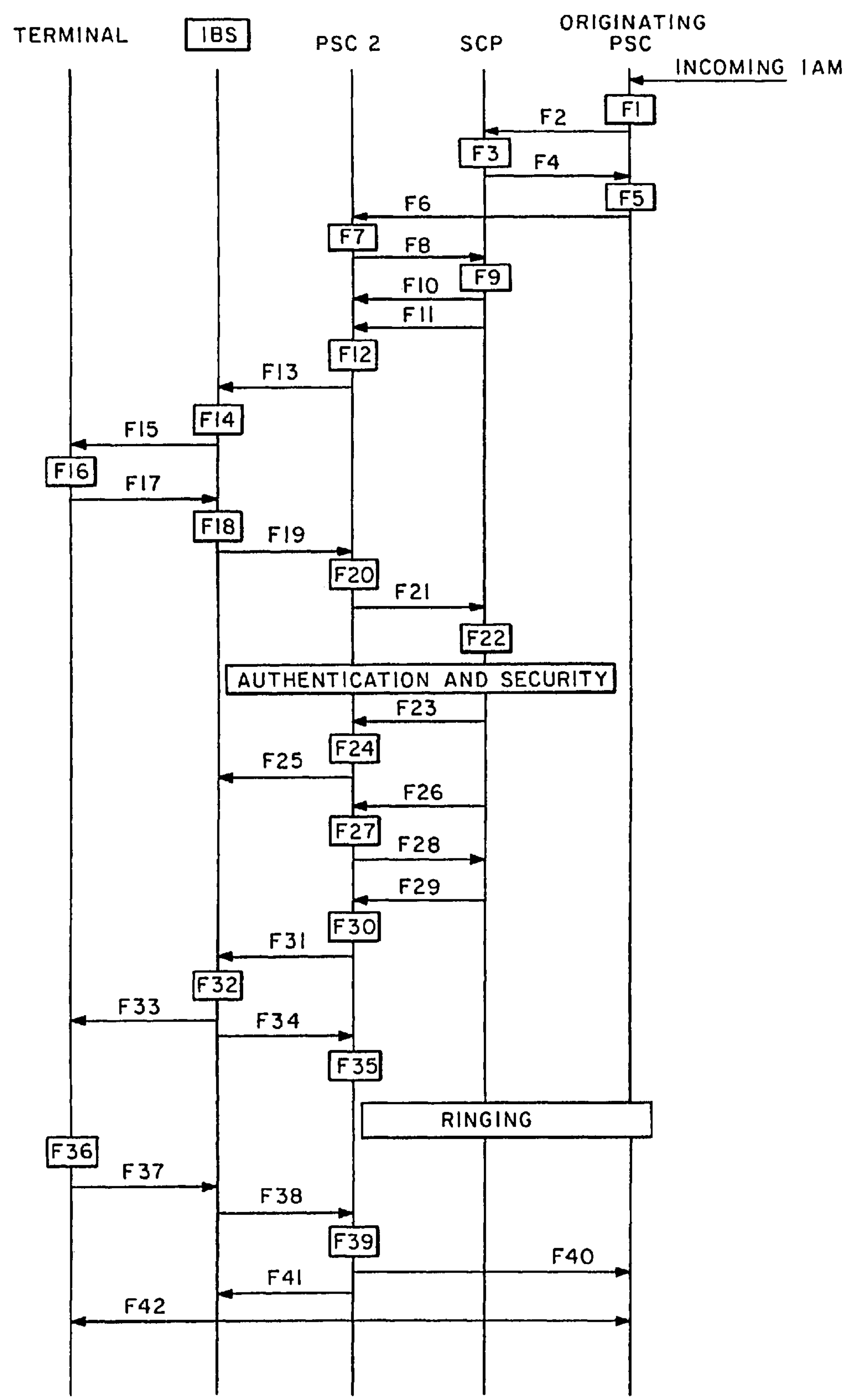
FIG. 12 is a time sequence diagrammatic flowchart illustrating an incoming call to an intelligent portable handset terminal in the wireless digital personal communications system in accordance with the present invention.

FIG. 12 is a time sequence diagrammatic flowchart illustrating an incoming call to an intelligent portable handset terminal in the wireless digital personal communications system in accordance with the present invention with respect to the specific call and signaling flows for an incoming call. Calls to a geographic or non-geographic number result in an initial trigger. This can be a 3, 6, or 10 digit trigger depending on the style of numbering that is used. The particular call and signaling flows begin with an InfoAnalyzed trigger. The initial trigger on the called number results in the dialed number being translated into the appropriate Base Station Routing Number, Terminal Number and Personal Communications Service Provider Identification (PCSPID) by the Home Service Control Point. This is passed back to the PSC which sent the query and results in the call being forwarded to the PSC serving the portable handset terminal. The PSC serving the particular portable handset terminal receives the call for the Base Station Routing Number and initiates the appropriate treatment. If desired, the Service Control Point sends an announcement back to the calling party. The PSC determines the zone serving the portable handset terminal from the Base Station Routing Number and then broadcasts a page request to all intelligent base stations in that particular zone. The intelligent base stations in turn page the portable handset terminal. If the portable handset terminal is present, it will respond to an intelligent base station (e.g., the intelligent base station with the better, higher quality signal and having available channels); this intelligent base station sends an affirmative response to the page request to the PSC. All other intelligent base station send back negative replies; however, once the positive reply is received the PSC can ignore the outstanding negative replies. Alternatively, the PSC sets a page timer while awaiting the responses from the intelligent base stations; if, prior to the expiration of the time period, a positive response is not yet received, the PSC signals the Service Control Point that the user is not in the area. Once the portable handset terminal is located, the PSC queries the Service Control Point with a service request. This request provides for portable handset terminal authentication and retrieves the derived cipher key (DCK) from the Service Control Point. The Service Control Point's response in turn drives the setup of the call to the serving intelligent base station along with the delivery of the DCK to that intelligent base station.

Referring to FIG. 12, at time sequence event F1, a telephone number is called which results in the Originating PSC receiving an Initial Address Message (IAM). The Originating PSC determines that it is a call that results in a trigger at the InfoAnalyzed trigger detection point. The trigger criteria is the Called Party Number. At time sequence event F2, the Originating PSC sends an AIN Information Analyzed message to the Service Control Point. This message contains the called number as the Called Party ID and the carrier ID (if available). At time sequence event F3, the Service Control Point receives the message sent by the Originating PSC and translates the called number into the appropriate Terminal Number, Personal Communications Service Provider Identification (PCSPID) and Base Station Routing Number that is currently serving the portable handset terminal. At time sequence event F4, the Service Control Point sends an AIN Route Analyzed message to the Originating PSC. This message contains the Called Party ID (Base Station Routing Number), the Called Party Subaddress ID (Terminal Number and Personal Communications Service Provider Identification (PCSPID)), the Redirecting Party ID (called number) and Primary Carrier (IC2) of the portable handset terminal. At time sequence event F5, the Originating PSC receives the routing message sent by the Service Control Point. At time sequence event F6, the Originating PSC generates an ISUP Initial Address Message (IAM). This message contains the Called Party Number (Base Station Routing Number), the Terminal Number and Personal Communications Service Provider Identification (PCSPID), redirecting number (called UPT), Calling Party Number and the primary carrier (IC). This message is sent, the appropriate trunk seized, etc. At time sequence event F7, PSC2 receives the IAM. The Base Station Routing Number is a termination attempt trigger. Alternatively, the PSC2 determines the appropriate zone based on the Base Station Routing Number, if PSC2 maintains a record of active portable handset terminals, PSC2 will determine the status of the portable handset terminal. If the portable handset terminal is "idle", PSC2 will continue. At time sequence event F8, the PSC sends a Terminating Attempt message to the Service Control Point. This message contains the Calling Party ID, the Base Station Routing Number, the Terminal Number, the PCSPID and the called UPT. At time sequence event F9, the Service Control Point receives the message. At time sequence event F10, the Service Control Point sends a Play Announcement message to the PSC. This message contains the Announcement ID. This can be any available announcement including ringing. At time sequence event F11, the Service Control Point sends a Paging Request message to the PSC. This message contains the Terminal Number, the zone routing number, an operations code, the PCSPID and the UPT (if provided). At time sequence event F12, the PSC receives the messages and determines the intelligent base station associated with the zone routing number. At time sequence event F13, PSC2 sends an ISDN non-call associated Page Request message to each intelligent base station in the zone. This message contains the called UPT, Terminal Number, and Personal Communications Service Provider Identification (PCSPID). At time sequence event F14, each intelligent base station receives the message. At time sequence event F15, the intelligent base station broadcasts a Page Request message to alert the portable handset terminal. At time sequence event F16, the portable handset terminal recognizes that it is being paged. At time sequence event F17, the portable handset terminal sends a Page Response message to the appropriate intelligent base station (i.e., one with the better, higher quality signal and having available channels). This message contains the terminal's identity (UPT, Terminal Number, and Personal Communications Service Provider Identification [PCSPID]). The intelligent base station receives the reply and associates an available "B" channel with the portable handset terminal for future use. At time sequence event F18, the intelligent base station receives the message. At time sequence event F19, the intelligent base station sends an ISDN non-call associated Page Response message to PSC2. This message contains the Terminal Number, the "B" channel to be used to deliver the call, and the portable handset terminal status of "idle", Base Station Routing Number and the UPT. At time sequence event F20, PSC2 receives the message sent by the intelligent base station. Alternatively, the PSC creates a record indicating the portable handset terminal is now active. This record is maintained until the user returns to the "idle" mode, and allows the PSC to treat subsequent incoming calls to active users appropriately. In addition, it records the "B" channel allocation. This information would be maintained for future use (e.g., in support of Hand-Off). At time sequence event F21, PSC2 then sends an AIN Service Request message to the Service Control Point. This message contains the portable handset terminal's identity (UPT, Terminal Number, Personal Communications Service Provider Identification (PCSPID)), and the status of the portable handset terminal. Alternatively, the base station telephone number may be sent to the Service Control Point. At time sequence event F22, the Service Control Point receives the message sent by the PSC2. This initiates the authentication and security process. At time sequence event F23, the Service Control Point sends an AIN Service Reply message to PSC2. This message contains the derived cipher key (DCK), Terminal Number, user profile and the authorization for service. Alternatively, if PSC2 maintains a record of Base Station Routing Number, active calls, it may record the DCK at this point for future use (e.g., in support of Hand-Off). At time sequence event F24, the PSC receives the messages. At time sequence event F25, the PSC sends a Cipher Information message to the intelligent base station. This message contains the Terminal Number, Base Station Routing Number, DCK, operations code and acknowledgement. At time sequence event F26, the Service Control Point sends a Cancel Announcement message to the PSC. At time sequence event F27, the PSC terminates the announcement. At time sequence event F28, the PSC sends a Clear message to the Service Control Point. At time sequence event F29, the Service Control Point sends A Forward Call message to the PSC to route to the proper intelligent base station. This message contains the calling party, base station telephone number, the Terminal Number, the UPT, charge number, charge party station type. At time sequence event F30, PSC2 receives the message sent by the Service Control Point. At time sequence event F31, PSC2 sends an ISDN Setup message to the intelligent base station. This message contains the "B" channel, DN associated with the "B" channel (or the intelligent base station) as the Called Party Number, the called number in the Called Party Subaddress field, and the Calling Party Number. At time sequence event F32, the intelligent base station receives the message sent by PSC2. At time sequence event F33, the intelligent base station sends a Setup message to the portable handset terminal. At time sequence event F34, the intelligent base station sends an ISDN Alerting message to PSC2. At time sequence event F35, PSC2 receives the alerting notification sent by intelligent base station. PSC2 provides ringing to the calling party. At time sequence event F36, the portable handset terminal detects a request for service from the user (user selects answer key) and enables its cipher from the authentication process (i.e., automatically activated in response to the call). At time sequence event F37, the portable handset terminal sends a Connect message to the intelligent base station. At time sequence event F38, the intelligent base station sends an ISDN Connect message to PSC2. At time sequence event F39, PSC2 receives the message. At time sequence event F40, PSC2 sends an ISUP Answer message to the far end. At time sequence event F41, PSC2 also sends an ISDN Connect Acknowledge message to the intelligent base station. At time sequence event F42, the call is connected.

For the specific functional message requirements for an incoming call, see Appendix I, attached hereto and made a part hereof.

Figure 13:
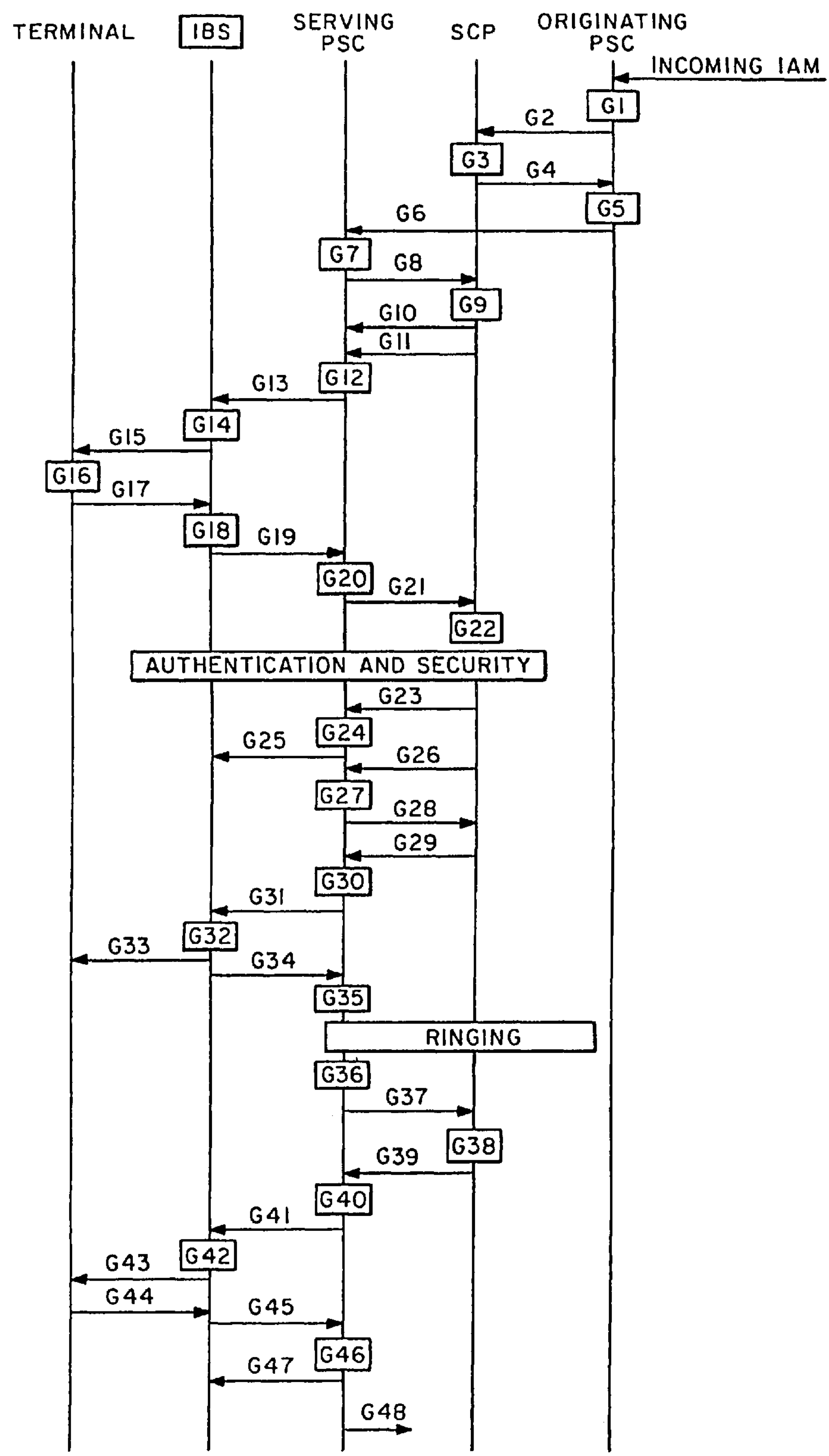
FIG. 13 is a time sequence diagrammatic flowchart illustrating an incoming call to an intelligent portable handset terminal and the situation is "no answer" in the wireless digital personal communications system in accordance with the present invention.

FIG. 13 is a time sequence diagrammatic flowchart illustrating an incoming call to an intelligent portable handset terminal and the situation is "no answer" in the wireless digital personal communications system in accordance with the present invention with respect to the specific call and signaling flows. The incoming call—no answer scenario demonstrates a potential call forwarding treatment of a call when the portable handset terminal responds to its page (i.e., it is present in the zone), but the user does not answer when the call is put through to the portable handset terminal. This is detected in the PSC when a ringing timeout timer expires. This timer is initiated using a value provided by the Service Control Point during the processing of the delivery of the call. The expiration of the timer causes a trigger and a query is sent to the Service Control Point for further instructions. The Service Control Point then determines the appropriate treatment based on the user's profile. The Service Control Point then responds to the PSC accordingly (i.e., it provides the PSC with a forwarding DN).

Referring to FIG. 13, at time sequence event G1, a telephone number is called which results in the Originating PSC receiving an Initial Address Message (IAM). The Originating PSC determines that it is a call that results in a trigger at the Info_Analyzed trigger detection point. The trigger criteria is the Called Party Number. At time sequence event G2, the Originating PSC sends an AIN Information Analyzed message to the Service Control Point. This message contains the called number as the Called Party ID and the Carrier ID (if available). At time sequence event G3, the Service Control Point receives the message sent by the Originating PSC, and the Service Control Point translates the called number into the appropriate Terminal Number, Personal Communications Service Provider Identification (PCSPID) and Base Station Routing Number that is currently serving the portable handset terminal. At time sequence event G4, the Service Control Point sends an AIN Route Analyzed message to the Originating PSC. This message contains the Called Party ID (Base Station Routing Number), the Called Party Subaddress ID (Terminal Number and Personal Communications Service Provider Identification (PCSPID)), the Redirecting Party ID (called number) and Primary Carrier (IC2) of the portable handset terminal. At time sequence event G5, the Originating PSC receives the routing message sent by the Service Control Point. At time sequence event G6, the Originating PSC generates an ISUP Initial Address Message (IAM). This message contains the Called Party Number (Base Station Routing Number), the Terminal Number and Personal Communications Service Provider Identification (PCSPID)), Redirecting Number (called UPT), Calling Party Number, and the IC. This message is sent, the appropriate trunk seized, etc. At time sequence event G7, PSC2 receives the IAM. The Base Station Routing Number is a termination attempt trigger. Alternatively, PSC2 determines the appropriate zone based on the Base Station Routing Number. If PSC2 maintains a record of active portable handset terminals, it determines the status of the terminal. If the terminal is "idle", it continues. At time sequence event G8, the PSC sends a Terminating Attempt message to the Service Control Point. The message contains the Calling Party ID, the Base Station Routing Number, the Terminal Number, the PCSPID and the called UPT. At time sequence event G9, the Service Control Point receives the message. At time sequence event G10, the Service Control Point sends a Play Announcement message to the PSC. This message contains the Announcement ID. This can be any available announcement including ringing. At time sequence event G11, the Service Control Point sends a Paging Request message to the PSC to start the paging process. This message contains the Terminal Number, the zone routing number, an operations code, the PCSPID and the UPT (if provided). At time sequence event G12, the PSC receives the messages and determines the intelligent base station associated with the zone routing. At time sequence event G13, PSC2 sends an ISDN non-call associated Page Request message to each intelligent base station in the zone. This message contains the called UPT, Terminal Number, and Personal Communications Service Provider Identification (PCSPID). At time sequence event G14, each intelligent base station receives the message. At time sequence event G15, the intelligent base station broadcasts a Page Request message to alert the portable handset terminal. At time sequence event G16, the portable handset terminal recognizes that it is being paged. At time sequence event G17, the portable handset terminal sends a Page Response to the appropriate intelligent base station (i.e., the intelligent base station with the better, higher quality signal and having available channels). This message contains the portable handset terminal's identity (UPT, Terminal Number and Personal Communications Service Provider Identification [PCSPID]).

The intelligent base station receives the reply and associates an available "B" channel with the portable handset terminal for future use. At time sequence event G18, the intelligent base station receives the message. At time sequence event G19, the intelligent base station sends an ISDN non-call associated Page Response message to PSC2. This message contains the Terminal Number, the "B" channel to be used to deliver the call, terminal status of "idle", Base Station Routing Number, the UPT. At time sequence event G20, PSC2 receives the message. Alternatively, the PSC creates a record indicating the portable handset terminal is now active. This record is maintained until the user returns to the "idle" mode, and allows the PSC to treat subsequent incoming calls to active users appropriately. In addition, it records the "B" channel allocation. This information would be maintained for future use (e.g., in support of Hand-Off). At time sequence event G21, PSC2 sends an AIN Service Request message to the Service Control Point. This message contains the portable handset terminal's identity (UPT, Terminal Number, Personal Communications Service Provider Identification [PCSPID]), and the status of the portable handset terminal. Alternatively, the Base Station Telephone Number may be sent to the Service Control Point). At time sequence event G22, the Service Control Point receives the message sent by PSC2. This initiates the authentication and security process. At time sequence event G23, the Service Control Point sends an AIN Service Reply message to PSC2. This message contains the derived cipher key (DCK), Terminal Number, user profile and the authorization for service. Alternatively, if PSC2 maintains a record of Base Station Routing Number, active calls, PSC2 may record the DCK at this point for future use (e.g., in support of Hand-Off). At time sequence event G24, the PSC receives the messages. At time sequence event G25, the PSC sends a Cipher Information message to the intelligent base station. This message contains the Terminal Number, Base Station Routing Number, DCK, operations code, and acknowledgement. At time sequence event G26, the Service Control Point sends a Cancel Announcement message to the PSC. At time sequence event G27, the PSC terminates the announcement. At time sequence event G28, the PSC sends a Clear message to the Service Control Point. At time sequence event G29, the Service Control Point sends a Forward Call message to the PSC to route to the proper intelligent base station. This message contains the calling party number, base station, telephone number, the Terminal Number, the UPT, charge number, charge party station type. At time sequence event G30, PSC2 receives the message sent by the Service Control Point. At time sequence event G31, PSC2 sends an ISDN Setup message to the intelligent base station. This message contains the "B" channel, DN associated with the "B" channel (or the intelligent base station) as the Called Party Number, the called number in the Called Party Subaddress field, and the Calling Party Number. At time sequence event G32, the intelligent base station receives the message sent by PSC2. At time sequence event G33, the intelligent base station sends a Setup message to the portable handset terminal. At time sequence event G34, the intelligent base station sends an ISDN Alerting message to PSC2. At time sequence event G35, PSC2 receives the alerting notification. PSC2 provides ringing to the calling party and starts the Ringing Timer. At time sequence event G36, the ringing timer expires when PSC2 has not received a response to its alerting. The PSC detects a Ringing Timeout trigger. PSC2 continues to provide ringing to the calling party and the user. At time sequence event G37, PSC2 sends an AIN Timeout message to the Service Control Point which includes the Calling Party Number, Called Party Number (DN of the intelligent base station that is serving the terminal), Called Party Subaddress, UPT or Terminal Number. At time sequence event G38, the Service Control Point receives the message sent by PSC2. The Service Control Point determines if the user subscribes to Call Forwarding on "No Answer" and if the service is active. At time sequence event G39, if the user subscribes to Call Forwarding on "No Answer", and the service is active, the Service Control Point sends a Forward Call message to PSC2 which contains the following parameters Calling Party ID (DN assigned to the call), and the Called Party ID (DN2) to which the PSC is instructed to forward the call), Terminal Number and UPT. The transaction with the PSC is then closed. If the call forwarding service is not active or subscribed to by the PCS user, the Service Control Point sends a continue message to PSC2 and closes the transaction with PSC2. At time sequence event G40, PSC2 receives the message. At time sequence event G41, PSC2 sends an ISDN Disconnect message to the intelligent base station. At time sequence event G42, the intelligent base station receives the message. At time sequence event G43, the intelligent base station sends a Release message to the portable handset terminal. At time sequence event G44, the portable handset terminal sends a Release Complete message to the intelligent base station. At time sequence event G45, the intelligent base station sends an ISDN Release message to PSC2. At time sequence event G46, PSC2 receives the message sent by the intelligent base station. At time sequence event G47, PSC2 sends an ISDN Release Complete to the intelligent base station. At time sequence event G48, PSC2 forwards the call to DN2.

For the specific functional message requirements for incoming call—no answer, see Appendix I, attached hereto and made a part hereof.

Figure 14:
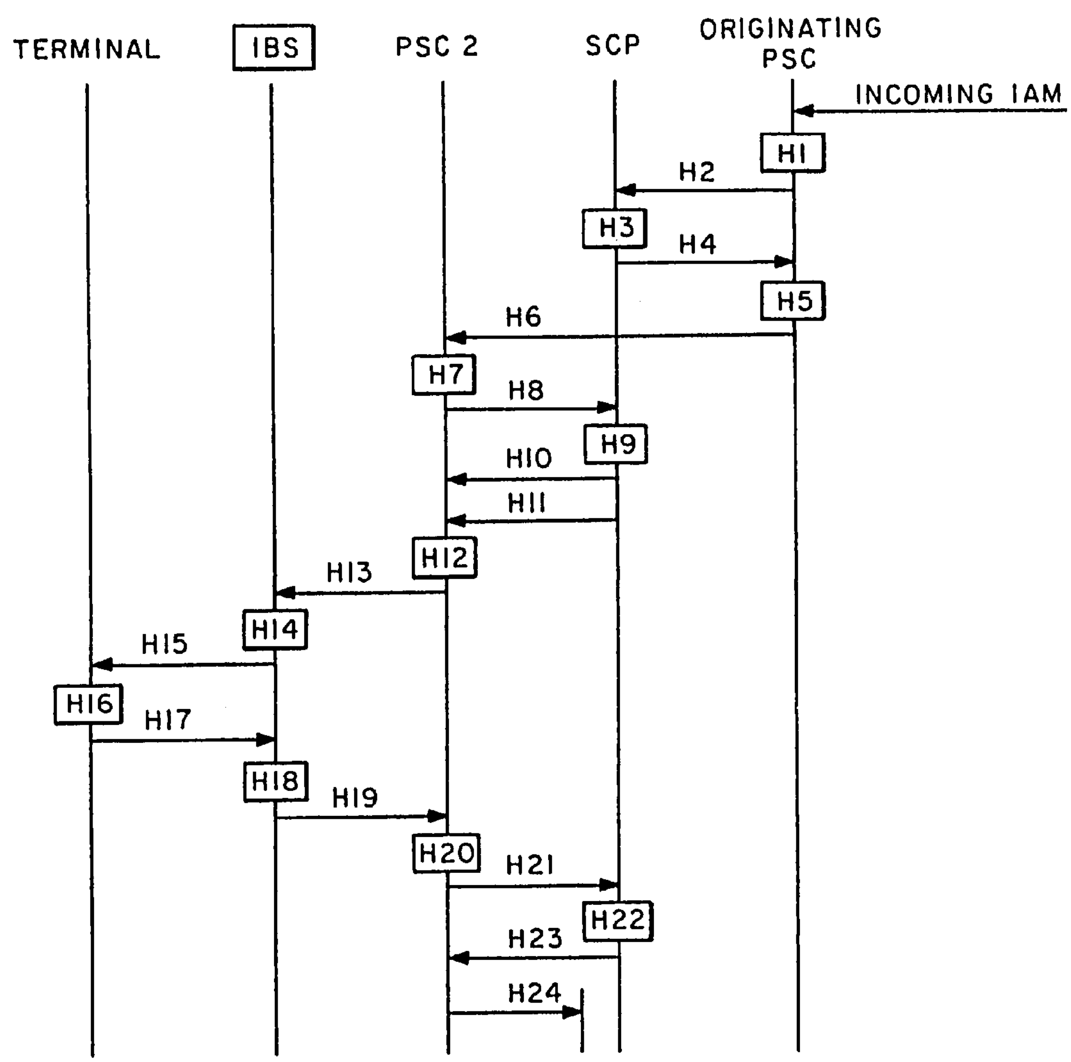
FIG. 14 is a time sequence diagrammatic flowchart illustrating an incoming call to an intelligent portable handset terminal and the situation is "user busy" in the wireless digital personal communications system in accordance with the present invention.

FIG. 14 is a time sequence diagrammatic flowchart illustrating an incoming call to an intelligent portable handset terminal and the situation is "user busy" in the wireless digital personal communications system in accordance with the present invention with respect to the specific call and signaling flows. The incoming call—"user busy" scenario illustrates how the intelligent base station and PSC interact to handle this particular scenario. The call and signaling flow follows the normal call delivery process until the intelligent base station in the zone are instructed to page the portable handset terminal. In this case, one intelligent base station is aware that the portable handset terminal is already active. It thus immediately sends a page response indicating the "user busy" situation. The PSC receives the message, and in turn sends a service request to the Service Control Point indicating a call was attempted to a "busy" portable handset terminal. The Service Control Point can then direct the appropriate treatment (e.g., Call Forwarding). Again, once the PSC has received an indication from the intelligent base station serving the portable handset terminal, it can ignore the responses from the other intelligent base station.

Referring to FIG. 14, at time sequence event H1, a telephone number is called which results in the Originating PSC receiving an Initial Address Message (IAM). The Originating PSC determines that it is a call that results in a trigger at the Info_Analyzed trigger detection point. The trigger criteria is the Called Party Number. At time sequence event H2, the Originating PSC sends an AIN Information Analyzed message to the Service Control Point. This message contains the called number as the Called Party ID and the Carrier ID (if available). At time sequence event H3, the Service Control Point receives the message sent by the Originating PSC and the Service Control Point translates the called number into the appropriate Terminal Number, Personal Communications Service Provider Identification (PCSPID) and Base Station Routing Number that is currently serving the portable handset terminal. At time sequence event H4, the Service Control Point sends an AIN Route Analyzed message to the Originating PSC. This message contains the Called Party ID (Base Station Routing Number), the Called Party Subaddress ID (Terminal Number and Personal Communications Service Provider Identification [PCSPID]), the Redirecting Party ID (called number) and Primary Carrier (IC2) of the portable handset terminal. At time sequence event H5, the Originating PSC receives the routing message from the Service Control Point. At time sequence event H6, the Originating PSC generates an ISUP Initial Address Message (IAM). This message contains the Called Party Number (Base Station Routing Number), the Terminal Number and Personal Communications Service Provider Identification [PCSPID]), Redirecting Number (called UPT), Calling Party Number, and the IC. This message is sent, the appropriate trunk seized, etc. At time sequence event H7, PSC2 receives the IAM. The Base Station Routing Number is a termination attempt trigger. Alternatively, PSC2 determines the appropriate zone based on the Base Station Routing Number. If PSC2 maintains a record of active terminals, PSC2 determines the status of the terminal. If the terminal is "idle", it continues. If terminal is "busy" goes to time sequence event H21. At time sequence event H8, the PSC sends a Terminating Attempt message to the Service Control Point. This message contains the Calling Party ID, the Base Station Routing Number, the Terminal Number, the PCSPID, and the called UPT. At time sequence event H9, the Service Control Point receives the message from the PSC2. At time sequence event H10, the Service Control Point sends a Play Announcement message to the PSC2. The message contains the Announcement ID. This can be any available announcement including ringing. At time sequence event H11, the Service Control Point sends a Paging Request message to the PSC2 to start the paging process. This message contains the Terminal Number, the zone routing number, an operations code, the PCSPID, and the UPT (if provided). At time sequence event H12, the PSC2 receives the messages and determines the intelligent base station associated with the zone routing. At time sequence event H13, PSC2 sends an ISDN non-call associated Page Request message to each intelligent base station in the zone. This message contains the called UPT, Terminal Number and personal communications service provider identification (PCSPID). At time sequence event H14, each intelligent base station receives the message sent by PSC2. At time sequence event H15, the intelligent base station broadcasts a Page Request to alert the portable handset terminals. At time sequence event H16, the portable handset terminal recognizes that it is being paged by the intelligent base station. At time sequence event H17, the handset terminal sends a Page Response message to the appropriate intelligent base station (i.e., the intelligent base station with the better, higher quality signal and having available channels). This message contains the terminal's identity (UPT, Terminal Number and Personal Communications Service Provider Identification [Service Control Point ID]). The intelligent base station receives the reply and associates an available "B" channel with the terminal for future use. At time sequence event H18, the intelligent base station receives the message. At time sequence event H19, the intelligent base station sends an ISDN non-call associated Page Response message to PSC2. This message contains the Terminal Number, the "B" channel to be used to deliver the call, terminal status of "busy", Base Station Routing Number and the UPT. At time sequence event H20, PSC2 receives the messages. Once PSC2 receives the message with status "user busy", PSC2 disregards all other messages of status "not here". At time sequence event H21, PSC2 sends an AIN Service Request message to the Service Control Point. This message contains the terminal's identity (UPT, Terminal Number, Personal Communications Service Provider Identification (PCSPID)) and the status "user busy". At time sequence event H22, the Service Control Point receives the message. The Service Control Point determines that a call has been attempted to a busy user, and initiates the appropriate treatment (e.g., Call Forwarding). At time sequence event H23, the Service Control Point sends a Forward Call message to PSC2. This message contains the Calling Party ID, the forward to telephone number, Terminal Number, and UPT. At time sequence event H24, PSC2 receives the message and forwards the call.

For the specific functional message requirements for incoming call—user busy, see Appendix I, attached hereto and made a part hereof.

Figure 15:
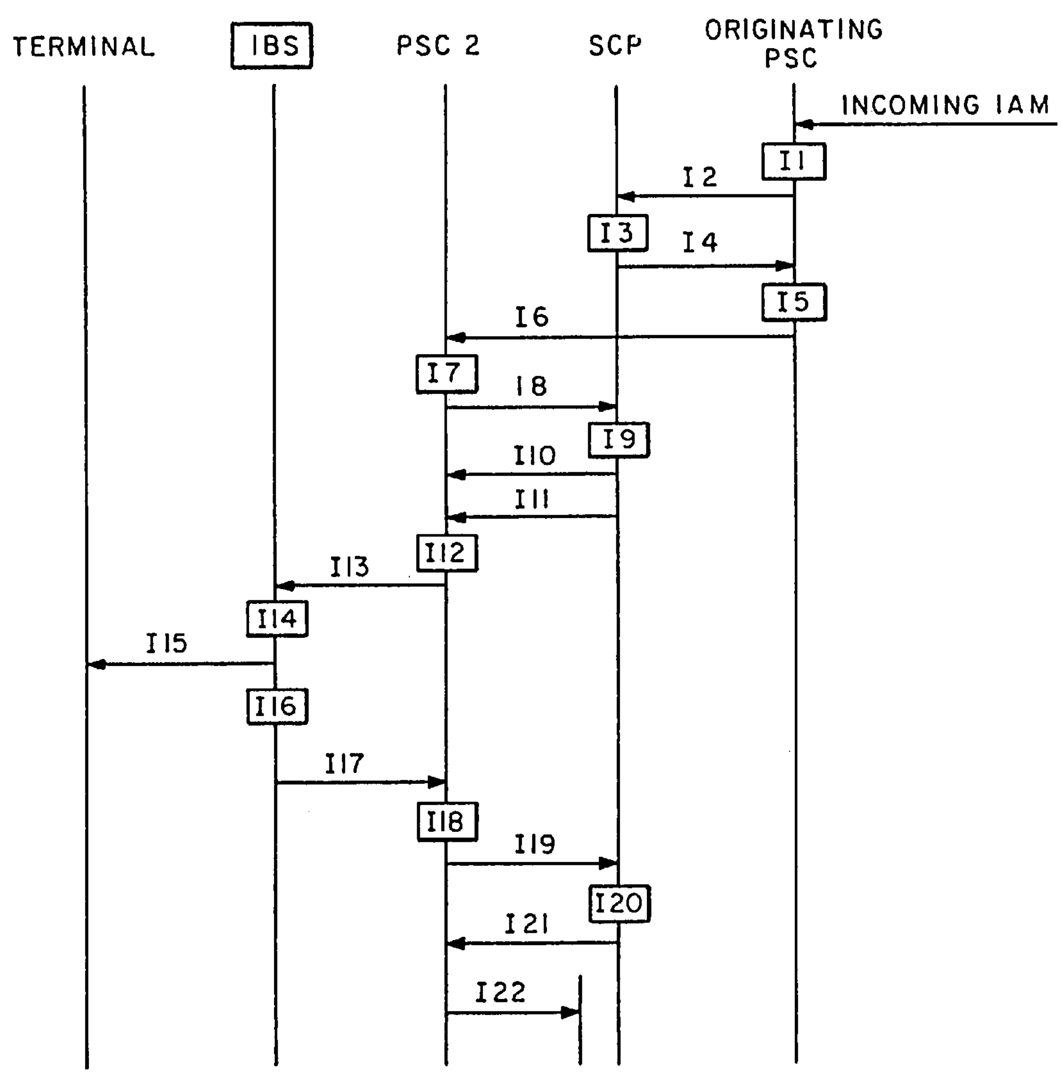
FIG. 15 is a time sequence diagrammatic flowchart illustrating an incoming call to an intelligent portable handset terminal and the situation is "user not here" in the wireless digital personal communications system in accordance with the present invention.

FIG. 15 is a time sequence diagrammatic flowchart illustrating an incoming call to an intelligent portable handset terminal that is not in range and the situation is "user not here" in the wireless digital personal communications system in accordance with the present invention with respect to the specific call and signaling flows for an incoming call—"not here". The incoming call—"not here" scenario illustrates how the PSC handles the particular scenario where the handset terminal does not respond to a page. This is a case where the portable handset terminal has either powered "OFF" or moved out of range which in turn allows for the condition where there is no de-registration. The call and signaling flows follows the normal call delivery process until all of the intelligent base station have responded to the PSC with the result of the page. In this case, all of the intelligent base station respond with the portable handset terminal "not here". As a result the PSC determines that the portable handset terminal is not responding to the page and thus sends a service request to the Service Control Point indicating a call was attempted to a portable handset terminal that is no longer present. The Service Control Point can then direct the appropriate treatment (e.g., Call Forwarding).

Referring to FIG. 15, at time sequence event I1, a telephone number is called which results in the Originating PSC receiving an Initial Address Message (IAM). The Originating PSC determines that it is a call that results in a trigger at the Info_Analyzed trigger detection point. The trigger criteria is the Called Party Number. At time sequence event I2, the Originating PSC sends an AIN Information Analyzed message to the Service Control Point. The message contains the called number as the Called Party ID, and the Carrier ID (if available). At time sequence event I3, the Service Control Point receives the message sent by the Originating PSC and the Service Control Point translates the called number into the appropriate Terminal Number, Personal Communications Service Provider Identification (PCSPID), and Base Station Routing Number that is currently serving the specific portable handset terminal. At time sequence event I4, the Service Control Point sends an AIN Route Analyzed message to the Originating PSC. This message contains the Called Party ID (Base Station Routing Number), the Called Party Subaddress ID (Terminal Number and Personal Communications Service Provider Identification (PCSPID)), the Redirecting Party ID (called number), and Primary Carrier (IC2) of the portable handset terminal. At time sequence event I5, the Originating PSC receives the routing message sent by the Service Control Point. At time sequence event I6, the Originating PSC generates an ISUP Initial Address Message (IAM). This message contains the Called Party Number (Base Station Routing Number), the Terminal Number and Personal Communications Service Provider Identification (PCSPID)), Redirecting Number (called UPT), Calling Party Number, and the IC. This message is sent, the appropriate trunk seized, etc. At time sequence event I7, PSC2 receives the IAM. The Base Station Routing Number is a termination attempt trigger. Alternatively, PSC2 determines the appropriate zone based on the Base Station Routing Number. If PSC2 maintains a record of active portable handset terminals, PSC2 determines the status of the portable handset terminal. If the portable handset terminal is "idle", it continues. At time sequence event I8, the PSC2 sends a Terminating Attempt message to the Service Control Point. This message contains the Calling Party ID, the Base Station Routing Number, the Terminal Number, the PCSPID and the called UPT. At time sequence event I9, the Service Control Point receives the message. At time sequence event I10, the Service Control Point sends a Play Announcement message to the PSC2. This message contains the Announcement ID. This can be any available announcement including ringing. At time sequence event I11, the Service Control Point sends a Paging Request message to the PSC2 to start the paging process. This message contains the Terminal Number, the Zone Routing Number, an Operations Code, the PCSPID and the UPT (if provided). At time sequence event I12, the PSC2 receives the messages and determines the intelligent base station associated with the Zone Routing. At time sequence event I13, PSC2 sends an ISDN non-call associated Page Request message to each intelligent base station in the zone. This message contains the called UPT, Terminal Number and Personal Communications Service Provider Identification (PCSPID). At time sequence event I14, each intelligent base station receives the message. At time sequence event I15, the intelligent base station broadcasts a Page Request to alert the portable handset terminal. At time sequence event I16, the response timer expires in the intelligent base station. At time sequence event I17, the intelligent base station sends an ISDN non-call associated Page Response message to PSC2. This message contains the Terminal Number, the "B" channel to be used to deliver the call, portable handset terminal status of "not here", Base Station Routing Number and the UPT. At time sequence event I18, PSC2 receives the messages. Once PSC2 receives a response from each intelligent base station in the zone, PSC2 determines that the portable handset terminal is not present. At time sequence event I19, PSC2 sends an AIN Service Request message to the Service Control Point. This message contains the portable handset terminal's identity (UPT, Terminal Number, Personal Communications Service Provider Identification (PCSPID), and the status of "not here". At time sequence event I20, the Service Control Point receives the message. The Service Control Point determines that a call has been attempted to a user that is not available, and initiates the appropriate treatment (e.g., Call Forwarding). At time sequence event I21, the Service Control Point sends a Forward Call message to PSC2. This message contains the Calling Routing ID, the Forward-To-Telephone Number, Terminal Number and UPT. At time sequence event I22, PSC2 receives the message and forwards the call.

For the specific functional message requirements for incoming call—not here, see Appendix I, attached hereto and made a part hereof.

Figure 16:
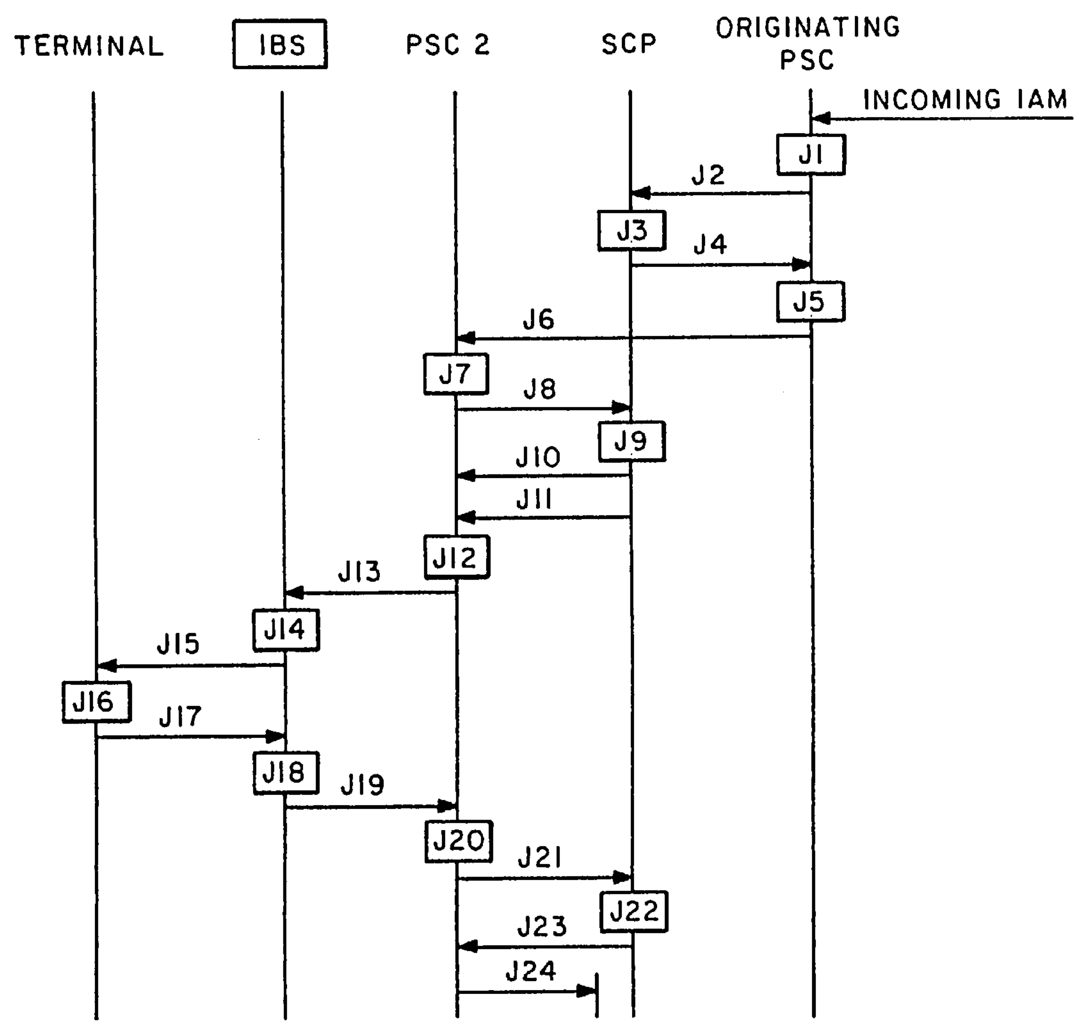
FIG. 16 is a time sequence diagrammatic flowchart illustrating an incoming call to an intelligent portable handset terminal and the situation is "interface busy" in the wireless digital personal communications system in accordance with the present invention.

FIG. 16 is a time sequence diagrammatic flowchart illustrating an incoming call to an intelligent portable handset terminal with all interfaces "busy" and the situation is "interface busy" in the wireless digital personal communications system in accordance with the present invention with respect to the specific call and signaling flows. The incoming call—"interface busy" scenario illustrates how the intelligent base station and PSC interact to handle this particular scenario. The call and signaling flows follow the normal call delivery process until an intelligent base station receives a response to the page. In this situation, an intelligent base station does not have an available "B" channel to the PSC. Accordingly, the intelligent base station thus sends a page response indicating the "interface busy" situation. The PSC receives the message, and in turn sends a service request to the Service Control Point indicating an intelligent base station responded to a page for an incoming call, however, the "interface busy" condition exists. The Service Control Point can then direct the appropriate treatment (e.g., Call Forwarding).

Referring to FIG. 16, at time sequence event J1, a telephone number is called which results in the Originating PSC receiving an Initial Address Message (IAM). The Originating PSC determines that it is a call that results in a trigger at the Info_Analyzed trigger detection point. The trigger criteria is the Called Party Number. At time sequence event J2, the Originating PSC sends an AIN Information Analyzed message to the Service Control Point. This message contains the called number as the Called Party ID and the Carrier ID (if available). At time sequence event J3, the Service Control Point receives the message sent by the Originating PSC and the Service Control Point translates the called number into the appropriate Terminal Number, Personal Communications Service Provider Identification (PCSPID), and Base Station Routing Number that is currently serving the specific portable handset terminal. At time sequence event J4, the Service Control Point sends an AIN Route Analyzed message to the Originating PSC. This message contains the Called Party ID (Base Station Routing Number), the Called Party Subaddress ID (Terminal Number and Personal Communications Service Provider Identification (PCSPID)), the Redirecting Party ID (called number) and Primary Carrier (IC2) of the portable handset terminal. At time sequence event J5, the Originating PSC receives the routing message sent by the Service Control Point. At time sequence event J6, the Originating PSC generates an ISUP Initial Address Message (IAM). This message contains the Called Party Number (Base Station Routing Number), the Terminal Number and Personal Communications Service Provider Identification (PCSPID)), Redirecting Number (called UPT), Calling Party Number, and the IC. This message is sent, the appropriate trunk seized, etc. At time sequence event J7, PSC2 receives the IAM. The Base Station Routing Number is a termination attempt trigger. Alternatively, PSC2 determines the appropriate zone based on the Base Station Routing Address. If PSC2 maintains a record of active portable handset terminals, PSC2 determines the status of the portable handset terminal. If the portable handset terminal is "idle", PSC2 continues. At time sequence event J8, the PSC2 sends a Terminating Attempt message to the Service Control Point. This message contains the Calling Party ID, the Base Station Routing Number, the Terminal Number, the PCSPID, and the called UPT. At time sequence event J9, the Service Control Point receives the message. At time sequence event J10, the Service Control Point sends a Play Announcement message to the PSC2. This message contains the Announcement ID. This can be any available announcement including ringing. At time sequence event J11, the Service Control Point sends a Paging Request message to the PSC2 to start the paging process. This message contains the Terminal Number, the Zone Routing Number, an Operations Code, the PCSPID, and the UPT (if provided). At time sequence event J12, the PSC2 receives the messages and determines the intelligent base station associated with the Zone Routing. At time sequence event J13, PSC2 sends an ISDN non-call associated Page Request message to each intelligent base station in the zone. This message contains the called UPT, Terminal Number, and Personal Communications Service Provider Identification (PCSPID). At time sequence event J14, each intelligent base station received the message. At time sequence event J15, the intelligent base station broadcasts a Page Request to alert the portable handset terminal. At time sequence event J16, the portable handset terminal recognizes that is being paged. At time sequence event J17, the portable handset terminal sends a Page Response to message the appropriate intelligent base station (i.e., the intelligent base station with the better, higher quality signal and having available channels). This message contains the portable handset terminal's identity (UPT, Terminal Number, and Personal Communications Service Provider Identification (PCSPID). At time sequence event J18, the intelligent base station receives the message, but has no "B" channels available. At time sequence event J19, the intelligent base station sends an ISDN non-call associated Page Response message to PSC2. This message contains the Terminal Number, portable handset terminal status of "interface busy", Base Station Routing Number, and the UPT. At time sequence event J20, PSC2 receives the messages. Once PSC2 receives the message with the status "interface busy" the PSC2 disregards all other messages of status "not here". Alternatively, the PSC2 receives all sent responses with status "not here" indicated; consequently, since the message was not sent to those intelligent base stations with no "B" channels available, the PSC2 sends a service request of "interface busy" to the Service Control Point. At time sequence event J21, PSC2 sends an AIN Service Request message to the Service Control Point. This message contains the portable handset terminal's identity (UPT, Terminal Number, Personal Communications Service Provider Identification (PCSPID), and the status "user busy". At time sequence event J22, the Service Control Point receives the message. The Service Control Point determines that a call has been attempted to a busy user, and initiates the appropriate treatment (e.g., Call Forwarding). At time sequence event J23, the Service Control Point sends a Forward Call message to PSC2. This message contains the Calling Routing ID, the Forward-To-Telephone Number, Terminal Number, and UPT. At time sequence event J24, PSC2 receives the message and forwards the call.

For the specific functional message requirements for incoming call—"interface busy", see Appendix I, attached hereto and made a part hereof.

Figure 17:
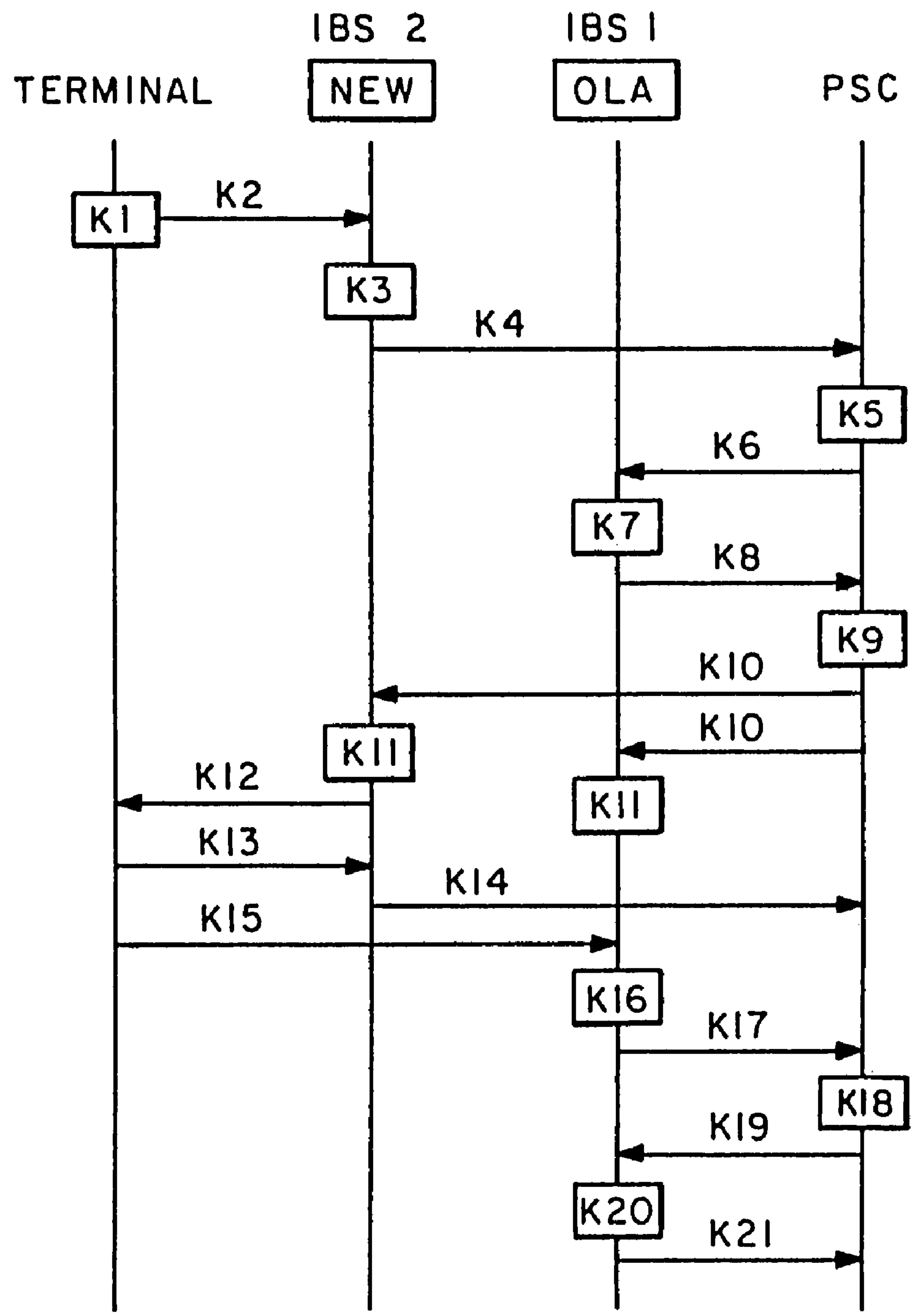
FIG. 17 is a time sequence diagrammatic flowchart illustrating the hand-off of an intelligent portable handset terminal in the wireless digital personal communications system in accordance with the present invention.

FIG. 17 is a time sequence diagrammatic flowchart illustrating the hand-off of an intelligent portable handset terminal in the wireless digital personal communications system in accordance with the present invention with respect to the specific call and signaling flows. The intelligent base station architecture utilizes the PSC for all hand-off(s). Thus, the particular scenario developed for hand-off targets maximum functionality in the PSC in support of a hand-off. The particular scenario illustrated assumes an intra-PSC hand-off; however, it is anticipated that it can be extended to an inter-switch hand-off with appropriate modifications to ISUP to carry the necessary information. In this situation, the hand-off process is driven by the portable handset terminal determining that its signal quality is poor and that a hand-off to a higher quality signal from another intelligent base station is necessary. The portable handset terminal initiates the hand-off by sending a request to a new intelligent base station with a higher quality signal (and having available channels). This request contains the Base Station Routing Number of the old intelligent base station, portable handset Terminal Number and Personal Communications Service Provider Identification (PCSPID). The new intelligent base station initiates a call to the PSC indicating a hand-off, and carrying the information conveyed from the portable handset terminal. When the PSC receives the request, it allocates a three port bridge for the hand-off, and sends a setup indicating hand-off to the old intelligent base station with the appropriate information. The old intelligent base station (IBS-old) validates the request, and responds with a connect message to the PSC containing the derived cipher key (DCK). The PSC connects the bridge and sends indications to the new and old intelligent base stations, along with the DCK to the new intelligent base station (IBS-new). The actual transfer then takes place and the old call is disconnected.

Referring to FIG. 17, at time sequence event K1, the portable handset terminal detects an intelligent base station that could provide a better link than its current intelligent base station. At time sequence event K2, the portable handset terminal sends a Setup with the external hand-off request indicator to the better intelligent base station. At time sequence event K3, the IBS-new receives the Setup message and determines that it is a Hand-Off request. This request contains the Base Station Routing Number of the IBS-old and the portable handset terminal's identity (UPT, Terminal Number and Personal Communications Service Provider Identification (PCSPID)). At time sequence event K4, the IBS-new sends an ISDN Setup message to the PSC. This message contains the Feature Activator=Hand-Off, Calling Party Number of the interface, Called Party Number (Base Station Routing Number), the Terminal Number and Personal Communications Service Provider Identification (PCSPID) in the Called Party Subaddress Number. At time sequence event K5, the PSC receives the message and determines that it is a Hand-Off request. The PSC allocates a 3-port bridge for the hand-off. Alternatively, if the PSC maintains a record of active portable handset terminals, it determines the "B" channel and DCK associated with the portable handset terminal. The PSC would send a Setup ACKnowledge message to the IBS-new containing the DCK. Additionally, the PSC would record the new "B" channel to provide for subsequent hand-offs. At time sequence event K6, the PSC sends an ISDN Setup message to the IBS-old. This message contains a Feature Activator=Hand-Off, the Called Party Number (DN of IBS interface), Calling Party Number (DN of IBS-new), and Called Party Subaddress Number (Terminal Number and Personal Communications Service Provider Identification (PCSPID)). At time sequence event K7, the IBS-old receives the request and validates it. At time sequence event K8, IBS-old returns an ISDN Connect message to the PSC. This message contains the "B" channel and the Derived Cipher Key (DCK). At time sequence event K9, the PSC receives the message and the PSC recognizes this as a positive response to the hand-off attempt and thus connects the parties. At time sequence event K10, the PSC then sends an ISDN Connect message to the IBS-new. This contains the DCK. The PSC also sends a Connect Acknowledge to the IBS-old. At time sequence event K11, the IBS-new receives the message and recognizes that the hand-off is ready. The IBS-old receives the message. At time sequence event K12, the IBS-new sends a Setup Acknowledge message to the portable handset terminal. At time sequence event K13, the portable handset terminal sends a Notification message to the IBS-new to indicate its readiness. At time sequence event K14, the IBS-new sends a Connect Acknowledge to the PSC when the portable handset terminal is ready. At time sequence event K15, the portable handset terminal sends a disconnect message to the IBS-old. At time sequence event K16, the IBS-old receives a disconnect indication from the portable handset terminal. At time sequence event K17, the IBS-old sends an ISDN Disconnect message to the PSC. At time sequence event K18, the PSC receives the message and the PSC in turn tears down the IBS-old "B" channel and releases the three port bridge. At time sequence event K19, the PSC sends an ISDN Release message to the IBS-old. At time sequence event K20, the IBS-old receives the release message. At time sequence event K21, the IBS-old sends an ISDN Release Complete to the PSC to conclude the hand-off.

For the specific functional message requirements for hand-off, see Appendix I, attached hereto and made a part hereof.

Figure 18:
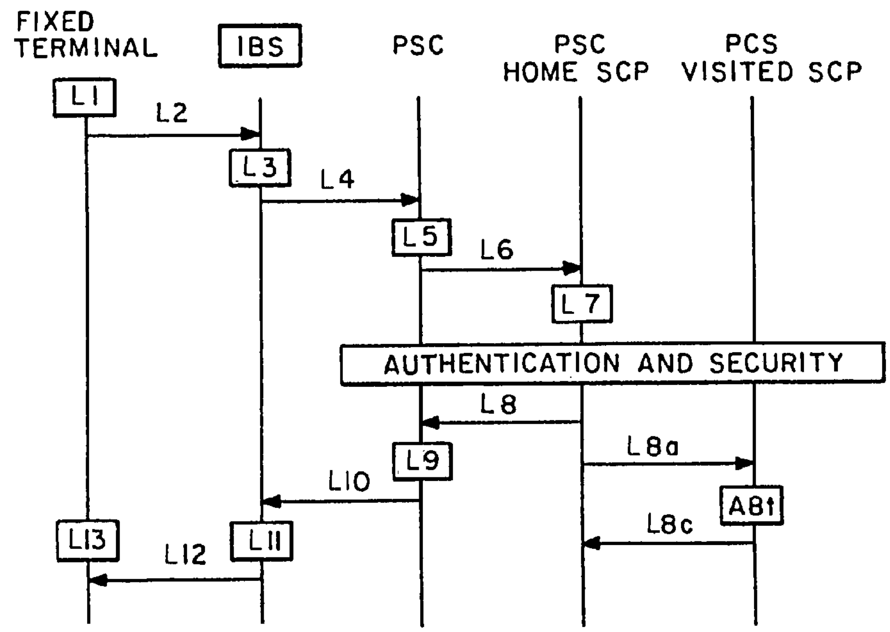
FIG. 18 is a time sequence diagrammatic flowchart illustrating registration of an intelligent fixed terminal in the wireless digital personal communications system in accordance with the present invention.

FIG. 18 is a time sequence diagrammatic flowchart illustrating registration of an intelligent fixed terminal in the wireless digital personal communications system in accordance with the present invention with respect to the specific call and signaling flows. FIG. 18 illustrates a fixed terminal registering while in its home serving area. The home serving area is comprised of one or more zones (which in turn consist of one or more intelligent base stations). The fixed terminal registers to a zone, thus it only needs to re-register if it detects a better, higher quality signal from an intelligent base station in a new zone. As part of the registration process, a private key-based authentication procedure is illustrated to authenticate the fixed terminal (but note that any authentication and encryption-decryption method or approach may be used with this PCS).

The registration process is initiated when the fixed terminal sends a registration request with its identity to an intelligent base station. The intelligent base station in turn sends the request to the PSC. The intelligent base station identifies the appropriate Base Station Routing Number of the zone serving the fixed terminal, and correspondingly sends a query, via the PSC, to the Service Control Point with this information and the fixed terminal's identity. The Service Control Point retrieves the appropriate information for the fixed terminal and initiates authentication as described in FIG. 18. If the authentication is successful, the Service Control Point records the registration (i.e., the intelligent Base Station Routing Number serving the fixed terminal). The Service Control Point then sends a positive response to the initial query which is forwarded to the fixed terminal. If the fixed terminal fails the challenge, the Service Control Point returns a failure indication along with the reason for failure.

Referring to FIG. 18, at time sequence event L1, the fixed terminal detects a better, higher quality signal from a different zone, or is powered "ON" and requests a location update. The fixed terminal prepares a location request message for the intelligent base station. Automatic terminal registration will not occur for fixed terminals that have one-way outgoing class of service. At time sequence event L2, the fixed terminal sends its identity to the intelligent base station as part of the location request message. The identity consists of PCSPID (PCS Provider ID), the fixed terminal's number, and the universal personal telephone number (UPT), if available. At time sequence event L3, the intelligent base station receives the location request message from a fixed terminal and determines that the fixed terminal desires to register. This message contains the fixed terminal's identity (Terminal Number, Personal Communications Service Provider Identification (PCSPID) and UPT, if available). At time sequence event L4, the intelligent base station sends an ISDN non-call associated registration message to the PSC. This message contains the fixed terminal's identity (Terminal Number, Personal Communications Service Provider Identification (PCSPID), Operation Code, Base Station Routing Number and, UPT, if available). At time sequence event L5, the PSC receives the registration message and, if the Base Station Routing Number is not received, determines the associated base station routing number. At time sequence event L6, the PSC sends an AIN registration message to the Service Control Point. This message includes the fixed terminal's identity (Terminal Number, Personal Communications Service Provider Identification (PCSPID), Operation Code, and UPT) and the Base Station Routing Number. At time sequence event L7, the Service Control Point receives the message and determines that it is a registration request and performs the authentication and security process. At the conclusion of the process, the Service Control Point continues with the registration. At time sequence event L8, the Service Control Point sends an AIN registration reply message to the PSC. The message contains the Terminal Number and the Base Station Routing Number, the registration acknowledgment (or alternatively, an indication of failure and reason). At time sequence event L9, the PSC receives the message. At time sequence event L10, the PSC sends an ISDN non-call associated registration reply message to the intelligent base station. The message contains the Terminal Number, the Base Station Routing Number, and the registration acknowledgment. At time sequence event L11, the intelligent base station receives the message. At time sequence event L12, the intelligent base station sends the location response message to the fixed terminal. At time sequence event L13, the fixed terminal activates an "in service" indicator.

For the specific functional message requirements for fixed terminal registration, see Appendix I, attached hereto and made a part hereof.

Figure 19:
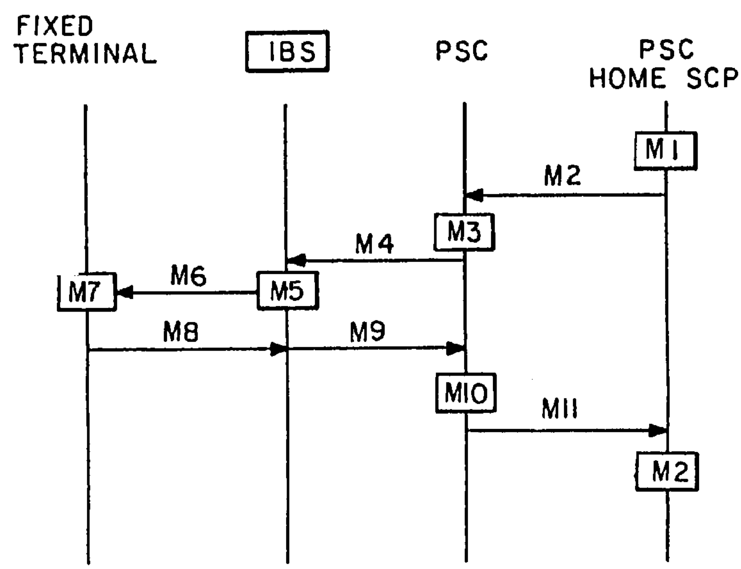
FIG. 19 is a time sequence diagrammatic flowchart illustrating authentication of an intelligent fixed terminal, and security key derivation, in the wireless digital personal communications system in accordance with the present invention.

FIG. 19 is a time sequence diagrammatic flowchart illustrating authentication of an intelligent fixed terminal, and security key derivation, in the wireless digital personal communications system in accordance with the present invention with respect to the specific call and signaling flows for authentication and security key derivation. FIG. 19 illustrates the private key authentication and security key derivation process used by the intelligent base station for the fixed terminal and it is actually a sub-flow which is used within the registration, call origination and incoming call flows. The authentication and security scheme uses a challenge-response mechanism which is initiated in the Service Control Point as part of another flow.

The process is based on the Service Control Point performing a series of calculations based on private information it maintains for the fixed terminal. It then sends the fixed terminal a challenge to perform a parallel calculation (based on Service Control Point provided information) and return its answer. If the two results match, the fixed terminal is authenticated. In addition, this shared information allows the Service Control Point and fixed terminal to perform parallel calculations to derive the cipher key for encrypting the radio interface (i.e., the air interface).

Referring to FIG. 19, at time sequence event M1, the Service Control Point determines the need to authenticate the fixed terminal; this is a result of a registration request, etc. The Service Control Point then (i) determines the user authentication key (UAK) from the provider's database; (ii) derives K from UAK using algorithm B1, and K is used for authentication and to derive the cipher key; (iii) obtains RS from the provider's database; (iv) derives KS from K and RS using the algorithm A11; (v) generates RAND_F using a random number generator; and (vi) derives XRES1 and the derived cipher key (DCK) from KS and RAND_F using algorithm A12. At time sequence event M2, the Service Control Point then sends an AIN authentication request message to the PSC. This message contains the fixed terminal's identity (Terminal Number, Personal Communications Service Provider Identification (PCSPID)), Base Station Routing Number, RS, RAND_F, and UPT, if available). At time sequence event M3, the PSC receives the message from Service Control Point. At time sequence event M4, the PSC sends an ISDN non-call associated Authentication request message to the intelligent base station. This message contains the fixed terminal's identity (Terminal Number, Personal Communications Service Provider Identification (PCSPID)), Base Station Routing Number, RS, RAND_F, and UPT, if available). At time sequence event M5, the intelligent base station receives the message from the PSC. At time sequence event M6, the intelligent base station sends an authentication request message to the fixed terminal. This message contains RS and RAND_F. At time sequence event M7, the fixed terminal receives the message from the intelligent base station and then the fixed terminal (i) derives K from its UAK using algorithm B1; (ii) derives KS from K and RS (received from the Service Control Point) using algorithm A11; and (iii) derives RES1 and the derived cipher key (DCK) from KS and RAND_F using algorithm A12. At time sequence event M8, the fixed terminal sends an authentication reply message to the intelligent base station. This message contains the derived RES1. At time sequence event M9, the intelligent base station sends an ISDN non-call associated authentication reply to the PSC. This message contains the derived RES1, the Base Station Routing Number, the Terminal Number, and the Operation Code. At time sequence event M10, the PSC receives the message from the IBS. At time sequence event M11, the PSC sends an AIN authentication reply message to the Service Control Point. This message contains the derived RES1, the Base Station Routing Number, Terminal Number, and Operation Code. At time sequence event M12, the Service Control Point receives the message from the PSC. The Service Control Point compares the RES1 value it receives with the previously calculated value XRES1. If they agree the fixed terminal is authenticated. At this point, the process that initiated this authentication resumes (e.g., Registration).

The B1 algorithm is explained in a certain DECT reference, which is hereby incorporated by reference (DECT document ETS 300 175-7: May 1992, Section 4.3, Page 17 et seq.). In similar manner, the A11 algorithm is explained in a certain DECT reference, which is hereby incorporated by reference (DECT Document ETS 300 175-7: May 1992, Section 4.3, Page 17 et seq.). In similar manner, the A12 algorithm is explained in a certain DECT reference, which is hereby incorporated by reference (DECT Document ETS 300 175-7: May 1992, Section 4.3, Page 17 et seq.).

For the specific functional message requirements for authentication and security key derivation, see Appendix I, attached hereto and made a part hereof.

Figure 20:
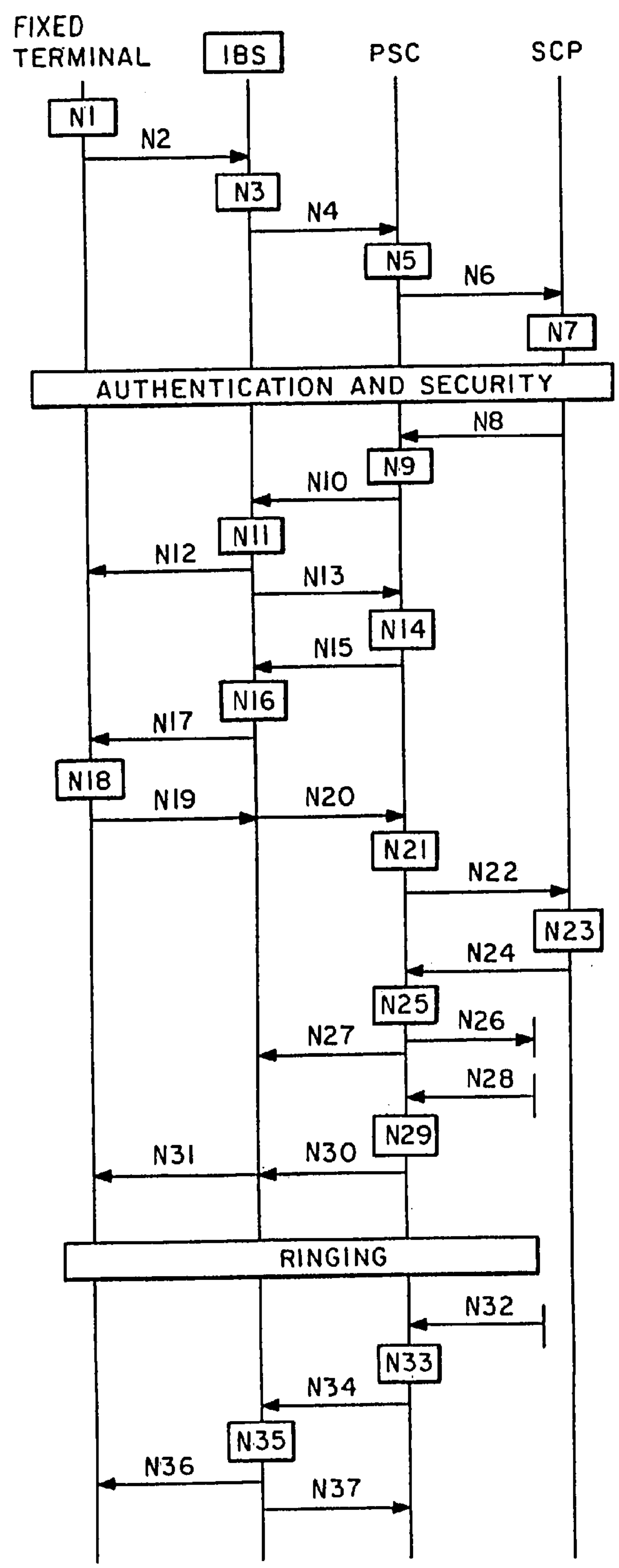
FIG. 20 is a time sequence diagrammatic flowchart illustrating call origination with respect to an intelligent fixed terminal in the wireless digital personal communications system in accordance with the present invention.

FIG. 20 is a time sequence diagrammatic flowchart illustrating call origination with respect to an intelligent fixed terminal in the wireless digital personal communications system in accordance with the present invention with respect to the specific call and signaling flows for call origination. This particular scenario illustrates an outgoing call from a fixed terminal. The fixed terminal initiates the call by sending a service request to an intelligent base station indicating the desire to originate a call. The intelligent base station sends a corresponding service request to the PSC, which in turn sends a service request query to the Service Control Point. The Service Control Point authenticates the fixed terminal and validates the request. A positive response is passed back to the intelligent base station. The intelligent base station then establishes a "B" channel with the network (before responding to the fixed terminal); this allows for dial-tone to be supplied by the network and correspondingly provides for overlap dialing by the user. Note, that this does not indicate that in-band tones are sent across the radio interface (i.e., the air interface). The intelligent base station performs a preliminary analysis on the dialed digits using a digit analysis table and then sends them to the PSC. The PSC triggers on the call origination and queries the Service Control Point. This trigger occurs on all calls originated from PCS interfaces (with exceptions for calls to emergency services, etc.). The Service Control Point validates the request and responds to the PSC.

Referring to FIG. 20, at time sequence event N1, the fixed terminal requests call origination. At time sequence event N2, the fixed terminal transmits a Setup Request message with its identity to the intelligent base station. The identity consists of its PCSPID, Terminal Number, and UPT (if available). At time sequence event N3, the intelligent base station receives the setup request message from the fixed terminal and determines that the terminal desires to originate a call. This message contains the fixed terminal's identity (Terminal Number, Personal Communications Service Provider Identification (PCSPID) and UPT). At time sequence event N4, the intelligent base station sends an ISDN non-call associated service request message to the PSC. This message contains the fixed terminal's identity (Terminal Number, Personal Communications Service Provider Identification (PCSPID), channel identification, Base Station Routing Number, Operation Code, and UPT). At time sequence event N5, the PSC receives the request message sent by the intelligent base station. Alternatively, the PSC creates a record indicating the fixed terminal is now active. This record is maintained until the user returns to the "idle" mode, and allows the PSC to treat subsequent incoming calls to active users appropriately. At time sequence event N6, the PSC sends an AIN Service Request message to the Service Control Point. This message includes the fixed terminal's identity (Terminal Number, Personal Communications Service Provider Identification (PCSPID) and UPT), Base Station Routing Number and Operation Code. At time sequence event N7, the Service Control Point receives the message sent by the PSC and determines that it is a service request and performs the authentication and security process, at the conclusion of which, the Service Control Point continues with the service request processing. At time sequence event N8, the Service Control Point sends an AIN service reply message to the PSC. The message contains the Terminal Number, derived cipher key (DCK), User Profile, a service request acknowledgment, Base Station Routing Number and Operation Code. At time sequence event N9, the PSC receives the message sent by the Service Control Point. Alternatively, if the PSC maintains a record of active calls, it may record the DCK at this point for future use (e.g., in support of Hand-Off). At time sequence event N10, the PSC sends an ISDN non-call associated Service Reply message to the intelligent base station. The message contains the Terminal Number, derived cipher key (DCK), Base Station Routing Number, Operation Code, and a service request acknowledgment. At time sequence event N11, the intelligent base station receives the message sent by the PSC and stores the DCK. At time sequence event N12, the intelligent base station sends a Cipher Enable message to the fixed terminal. At time sequence event N13, the intelligent base station sends an ISDN Setup message to the PSC. This message contains the "B" channel for the call, PCSPID, calling party number (DN of the interface to the intelligent base station), and the Calling Party Subaddress ID (UPT number or Terminal Number). At time sequence event N14, the PSC receives the ISDN Setup message and allocates the "B" channel. Alternatively, if the PSC maintains a record of active calls, it may record the "B" channel allocation. This information would be maintained for future use (e.g., in support of Hand-Off). At time sequence event N15, the PSC sends an ISDN Setup Acknowledgement to the intelligent base station. At time sequence event N16, the intelligent base station receives the acknowledgment to indicate that the network is ready and it also cuts through the dial-tone to the fixed terminal. At time sequence event N17, the intelligent base station sends a Setup Acknowledgement message to the fixed terminal. This signals that dial-tone is "ON". At time sequence event N18, the fixed terminal receives the message and dial-tone is heard by the user. The user either dials the number or, if the user already entered the digits, the fixed terminal transmits the dialed digits in INFOmation messages to the intelligent base station. At time sequence event N19, the fixed terminal sends one or more Information messages to the intelligent base station containing the dialed digits. At time sequence event N20, the intelligent base station receives the dialed digits and analyzes them via its digit analysis table and sends one or more ISDN information messages to the PSC containing the dialed digits. At time sequence event N21, the PSC receives the message(s) and turns "OFF" the dial-tone after receiving the first message. The PSC triggers at the Off-Hook Delay Trigger. The trigger criteria is all calls received at this interface (with an exceptions list). At time sequence event N22, the PSC sends an AIN Infomation Collected message to the Service Control Point. This message contains the Called Party ID, DN of the interface to the intelligent base station, the UPT number or Terminal Number. At time sequence event N23, the Service Control Point receives the message and validates the call origination attempt. At time sequence event N24, the Service Control Point sends an AIN Route Analyzed message to the PSC. The message contains the Called Party ID, Calling Party ID (Terminal Number or UPT number), charge number and station type, and primary carrier (ICN). If the user is not allowed to make the call, the Service Control Point sends an AIN Send_To_Resource message to direct the appropriate treatment. At time sequence event N25, the PSC receives the message sent by the Service Control Point. At time sequence event N26, the PSC sends an ISUP Initial Address Message to the called office. At time sequence event N27, the PSC also sends an ISDN Call Proceeding message to the intelligent base station. At time sequence event N28, an ISUP Address Complete message is sent from the far end to the PSC. At time sequence event N29, the PSC receives the message. At time sequence event N30, the PSC sends an ISDN Alerting message to the intelligent base station. The message indicates the ringing is supplied from the terminating switch. At time sequence event N31, the intelligent base station passes the ringing tone over the "B" channel to the fixed terminal and sends an Alerting message. At time sequence event N32, an ISUP Answer message is sent from the far end. At time sequence event N33, the PSC receives the message. At time sequence event N34, the PSC sends an ISDN Connect message to the intelligent base station. At time sequence event N35, the intelligent base station receives the message. At time sequence event N36, the intelligent base station sends a Connect message to the fixed terminal. At time sequence event N37, the intelligent base station also sends an ISDN Connect Acknowledge message to the PSC.

For the specific functional message requirements for intelligent fixed terminal call origination, see Appendix I, attached hereto and made a part hereof.

Figure 21:
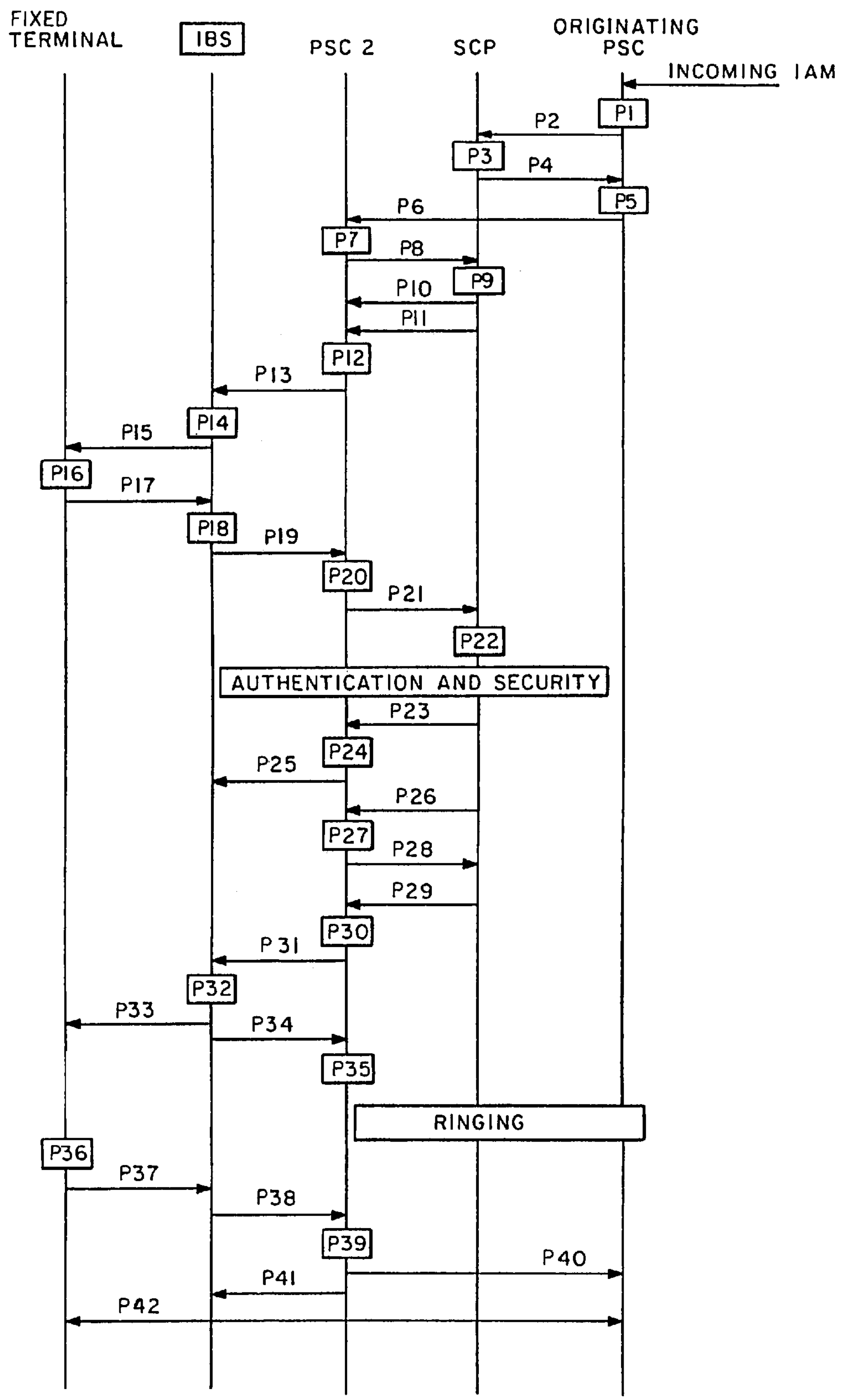
FIG. 21 is a time sequence diagrammatic flowchart illustrating an incoming call to an intelligent fixed terminal in the wireless digital personal communications system in accordance with the present invention.

FIG. 21 is a time sequence diagrammatic flowchart illustrating an incoming call to an intelligent fixed terminal in the wireless digital personal communications system in accordance with the present invention with respect to the specific call and signaling flows for an incoming call. Calls to a geographic or non-geographic number result in an initial trigger. This can be a 3, 6, or 10 digit trigger depending on the style of numbering that is used. The particular call and signaling flows begin with an InfoAnalyzed trigger. The initial trigger on the called number results in the dialed number being translated into the appropriate Base Station Routing Number, Terminal Number and Personal Communications Service Provider Identification (PCSPID) by the Home Service Control Point. This is passed back to the PSC which sent the query and results in the call being forwarded to the PSC serving the fixed terminal. The PSC serving the particular fixed terminal receives the call for the Base Station Routing Number and initiates the appropriate treatment. If desired, the Service Control Point sends an announcement back to the calling party. The PSC determines the zone serving the fixed terminal from the Base Station Routing Number and then broadcasts a page request to all intelligent base stations in that particular zone. The intelligent base stations in turn page the fixed terminal. The fixed terminal will respond to an intelligent base station (e.g., the intelligent base station with the better, higher quality signal and having available channels); this intelligent base station sends an affirmative response to the page request to the PSC. All other intelligent base station send back negative replies; however, once the positive reply is received the PSC can ignore the outstanding negative replies. Alternatively, the PSC sets a page timer while awaiting the responses from the intelligent base stations; if, prior to the expiration of the time period, a positive response is not yet received, the PSC signals the Service Control Point that the fixed terminal is not responding. Once the fixed terminal is located, the PSC queries the Service Control Point with a service request. This request provides for fixed terminal authentication and retrieves the derived cipher key (DCK) from the Service Control Point. The Service Control Point's response in turn drives the setup of the call to the serving intelligent base station along with the delivery of the DCK to that intelligent base station.

Referring to FIG. 21, at time sequence event P1, a telephone number is called which results in the Originating PSC receiving an Initial Address Message (IAM). The Originating PSC determines that it is a call that results in a trigger at the InfoAnalyzed trigger detection point. The trigger criteria is the Called Party Number. At time sequence event P2, the Originating PSC sends an AIN Information Analyzed message to the Service Control Point. This message contains the called number as the Called Party ID and the carrier ID (if available). At time sequence event P3, the Service Control Point receives the message sent by the Originating PSC and translates the called number into the appropriate Terminal Number, Personal Communications Service Provider Identification (PCSPID) and Base Station Routing Number that is currently serving the fixed terminal. At time sequence event P4, the Service Control Point sends an AIN Route Analyzed message to the Originating PSC. This message contains the Called Party ID (Base Station Routing Number), the Called Party Subaddress ID (Terminal Number and Personal Communications Service Provider Identification (PCSPID)), the Redirecting Party ID (called number) and Primary Carrier (IC2) of the fixed terminal. At time sequence event P5, the Originating PSC receives the routing message sent by the Service Control Point. At time sequence event P6, the Originating PSC generates an ISUP Initial Address Message (IAM). This message contains the Called Party Number (Base Station Routing Number), the Terminal Number and Personal Communications Service Provider Identification (PCSPID), redirecting number (called UPT), Calling Party Number and the primary carrier (IC). This message is sent, the appropriate trunk seized, etc. At time sequence event P7, PSC2 receives the IAM. The Base Station Routing Number is a termination attempt trigger. Alternatively, the PSC2 determines the appropriate zone based on the Base Station Routing Number, if PSC2 maintains a record of active fixed terminals, PSC2 will determine the status of the fixed terminal. If the fixed terminal is "idle", PSC2 will continue. At time sequence event P8, the PSC sends a Terminating Attempt message to the Service Control Point. This message contains the Calling Party ID, the Base Station Routing Number, the Terminal Number, the PCSPID and the called UPT. At time sequence event P9, the Service Control Point receives the message. At time sequence event P10, the Service Control Point sends a Play Announcement message to the PSC. This message contains the Announcement ID. This can be any available announcement including ringing. At time sequence event P11, the Service Control Point sends a Paging Request message to the PSC. This message contains the Terminal Number, the zone routing number, an operations code, the PCSPID and the UPT (if provided). At time sequence event P12, the PSC receives the messages and determines the intelligent base station associated with the zone routing number. At time sequence event P13, PSC2 sends an ISDN non-call associated Page Request message to each intelligent base station in the zone. This message contains the called UPT, Terminal Number, and Personal Communications Service Provider Identification (PCSPID). At time sequence event P14, each intelligent base station receives the message. At time sequence event P15, the intelligent base station broadcasts a Page Request message to alert the fixed terminal. At time sequence event P16, the fixed terminal recognizes that it is being paged. At time sequence event P17, the fixed terminal sends a Page Response message to the appropriate intelligent base station (i.e., one with the better, higher quality signal and having available channels). This message contains the fixed terminal's identity (UPT, Terminal Number, and Personal Communications Service Provider Identification [PCSPID]). The intelligent base station receives the reply and associates an available "B" channel with the fixed terminal for future use. At time sequence event P18, the intelligent base station receives the message. At time sequence event P19, the intelligent base station sends an ISDN non-call associated Page Response message to PSC2. This message contains the Terminal Number, the "B" channel to be used to deliver the call, and the fixed terminal status of "idle", Base Station Routing Number and the UPT. At time sequence event P20, PSC2 receives the message sent by the intelligent base station. Alternatively, the PSC creates a record indicating the fixed terminal is now active. This record is maintained until the fixed terminal returns to the "idle" mode, and allows the PSC to treat subsequent incoming calls appropriately. In addition, it records the "B" channel allocation. This information would be maintained for future use (e.g., in support of Hand-Off). At time sequence event P21, PSC2 then sends an AIN Service Request message to the Service Control Point. This message contains the fixed terminal's identity (UPT, Terminal Number, Personal Communications Service Provider Identification (PCSPID)), and the status of the fixed terminal. Alternatively, the base station telephone number may be sent to the Service Control Point. At time sequence event P22, the Service Control Point receives the message sent by the PSC2. This initiates the authentication and security process. At time sequence event P23, the Service Control Point sends an AIN Service Reply message to PSC2. This message contains the derived cipher key (DCK), Terminal Number, user profile and the authorization for service. Alternatively, if PSC2 maintains a record of Base Station Routing Number, active calls, it may record the DCK at this point for future use (e.g., in support of Hand-Off). At time sequence event P24, the PSC receives the messages. At time sequence event P25, the PSC sends a Cipher Information message to the intelligent base station. This message contains the Terminal Number, Base Station Routing Number, DCK, operations code and acknowledgement. At time sequence event P26, the Service Control Point sends a Cancel Announcement message to the PSC. At time sequence event P27, the PSC terminates the announcement. At time sequence event P28, the PSC sends a Clear message to the Service Control Point. At time sequence event P29, the Service Control Point sends A Forward Call message to the PSC to route to the proper intelligent base station. This message contains the calling party, base station telephone number, the Terminal Number, the UPT, charge number, charge party station type. At time sequence event P30, PSC2 receives the message sent by the Service Control Point. At time sequence event P31, PSC2 sends an ISDN Setup message to the intelligent base station. This message contains the "B" channel, DN associated with the "B" channel (or the intelligent base station) as the Called Party Number, the called number in the Called Party Subaddress field, and the Calling Party Number. At time sequence event P32, the intelligent base station receives the message sent by PSC2. At time sequence event P33, the intelligent base station sends a Setup message to the fixed terminal. At time sequence event P34, the intelligent base station sends an ISDN Alerting message to PSC2. At time sequence event P35, PSC2 receives the alerting notification sent by intelligent base station. PSC2 provides ringing to the calling party. At time sequence event P36, the fixed terminal detects a request for service from the user (user selects answer key) and enables its cipher from the authentication process (i.e., automatically activated in response to the call). At time sequence event P37, the fixed terminal sends a Connect message to the intelligent base station. At time sequence event P38, the intelligent base station sends an ISDN Connect message to PSC2. At time sequence event P39, PSC2 receives the message. At time sequence event P40, PSC2 sends an ISUP Answer message to the far end. At time sequence event P41, PSC2 also sends an ISDN Connect Acknowledge message to the intelligent base station. At time sequence event P42, the call is connected.

For the specific functional message requirements for an incoming call, see Appendix I, attached hereto and made a part hereof.

Figure 22:
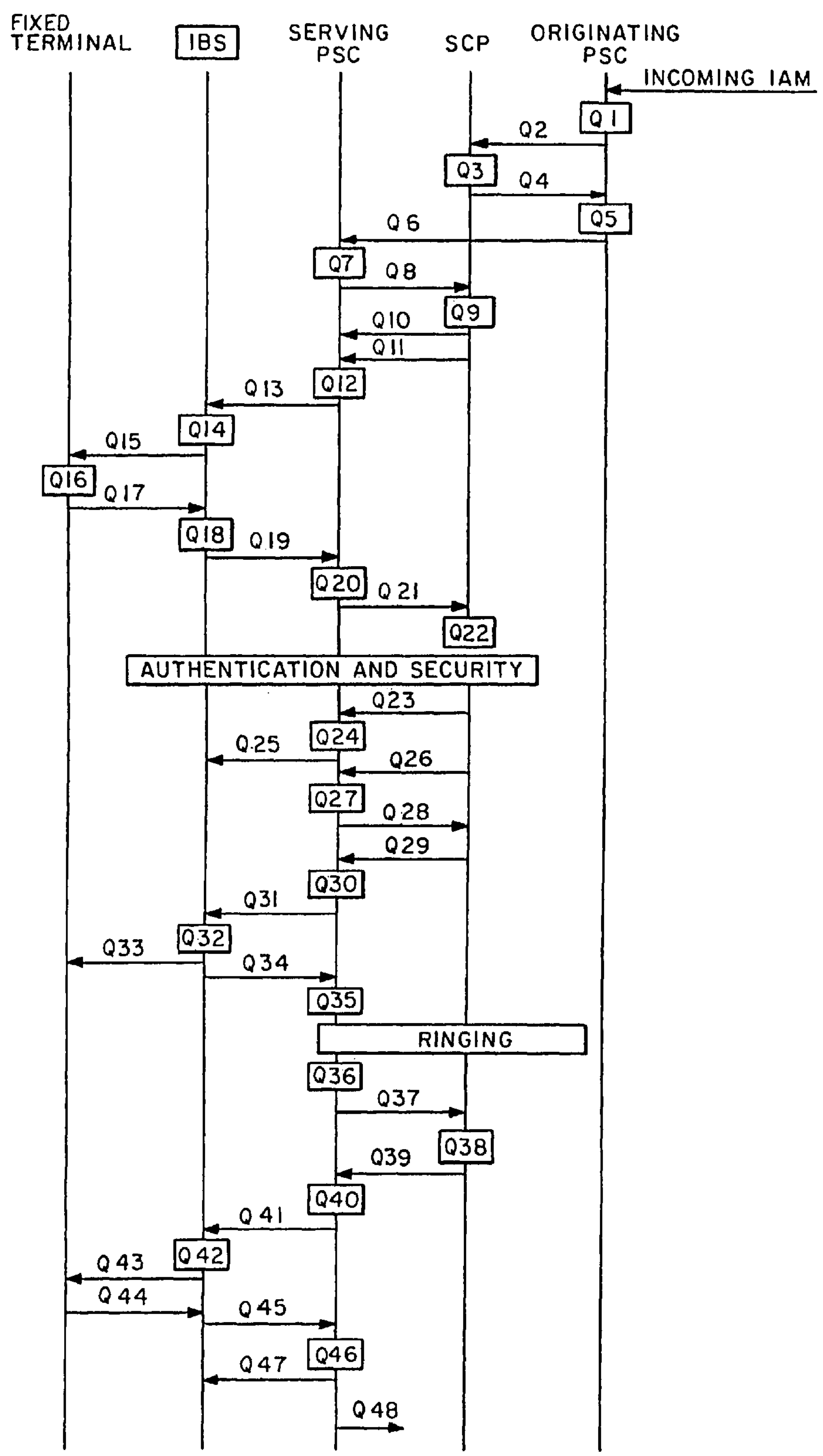
FIG. 22 is a time sequence diagrammatic flowchart illustrating an incoming call to an intelligent fixed terminal and the situation is "no answer" in the wireless digital personal communications system in accordance with the present invention.

FIG. 22 is a time sequence diagrammatic flowchart illustrating an unanswered incoming call to an intelligent fixed terminal and the situation is "no answer" in the wireless digital personal communications system in accordance with the present invention with respect to the specific call and signaling flows. The incoming call—no answer scenario demonstrates a potential call forwarding treatment of a call when the fixed terminal responds to its page (i.e., it is present in the zone), but the user does not answer when the call is put through to the fixed terminal. This is detected in the PSC when a ringing timeout timer expires. This timer is initiated using a value provided by the Service Control Point during the processing of the delivery of the call. The expiration of the timer causes a trigger and a query is sent to the Service Control Point for further instructions. The Service Control Point then determines the appropriate treatment based on the user's profile. The Service Control Point then responds to the PSC accordingly (i.e., it provides the PSC with a forwarding DN).

Referring to FIG. 22, at time sequence event Q1, a telephone number is called which results in the Originating PSC receiving an Initial Address Message (IAM). The Originating PSC determines that it is a call that results in a trigger at the Info_Analyzed trigger detection point. The trigger criteria is the Called Party Number. At time sequence event Q2, the Originating PSC sends an AIN Information Analyzed message to the Service Control Point. This message contains the called number as the Called Party ID and the Carrier ID (if available). At time sequence event Q3, the Service Control Point receives the message sent by the Originating PSC, and the Service Control Point translates the called number into the appropriate Terminal Number, Personal Communications Service Provider Identification (PCSPID) and Base Station Routing Number that is currently serving the fixed terminal. At time sequence event Q4, the Service Control Point sends an AIN Route Analyzed message to the Originating PSC. This message contains the Called Party ID (Base Station Routing Number), the Called Party Subaddress ID (Terminal Number and Personal Communications Service Provider Identification (PCSPID)), the Redirecting Party ID (called number) and Primary Carrier (IC2) of the fixed terminal. At time sequence event Q5, the Originating PSC receives the routing message sent by the Service Control Point. At time sequence event Q6, the Originating PSC generates an ISUP Initial Address Message (IAM). This message contains the Called Party Number (Base Station Routing Number), the Terminal Number and Personal Communications Service Provider Identification (PCSPID)), Redirecting Number (called UPT), Calling Party Number, and the IC. This message is sent, the appropriate trunk seized, etc. At time sequence event Q7, PSC2 receives the IAM. The Base Station Routing Number is a termination attempt trigger. Alternatively, PSC2 determines the appropriate zone based on the Base Station Routing Number. If PSC2 maintains a record of active fixed terminals, it determines the status of the fixed terminal. If the fixed terminal is "idle", it continues. At time sequence event Q8, the PSC sends a Terminating Attempt message to the Service Control Point. The message contains the Calling Party ID, the Base Station Routing Number, the Terminal Number, the PCSPID and the called UPT. At time sequence event Q9, the Service Control Point receives the message. At time sequence event Q10, the Service Control Point sends a Play Announcement message to the PSC. This message contains the Announcement ID. This can be any available announcement including ringing. At time sequence event Q11, the Service Control Point sends a Paging Request message to the PSC to start the paging process. This message contains the Terminal Number, the zone routing number, an operations code, the PCSPID and the UPT (if provided). At time sequence event Q12, the PSC receives the messages and determines the intelligent base station associated with the zone routing. At time sequence event Q13, PSC2 sends an ISDN non-call associated Page Request message to each intelligent base station in the zone. This message contains the called UPT, Terminal Number, and Personal Communications Service Provider Identification (PCSPID). At time sequence event Q14, each intelligent base station receives the message. At time sequence event Q15, the intelligent base station broadcasts a Page Request message to alert the fixed terminal. At time sequence event Q16, the fixed terminal recognizes that it is being paged. At time sequence event Q17, the fixed terminal sends a Page Response to the appropriate intelligent base station (i.e., the intelligent base station with the better, higher quality signal and having available channels). This message contains the fixed terminal's identity (UPT, Terminal Number and Personal Communications Service Provider Identification [PCSPID]).

The intelligent base station receives the reply and associates an available "B" channel with the fixed terminal for future use. At time sequence event Q18, the intelligent base station receives the message. At time sequence event Q19, the intelligent base station sends an ISDN non-call associated Page Response message to PSC2. This message contains the Terminal Number, the "B" channel to be used to deliver the call, terminal status of "idle", Base Station Routing Number, the UPT. At time sequence event Q20, PSC2 receives the message. Alternatively, the PSC creates a record indicating the fixed terminal is now active. This record is maintained until the fixed terminal returns to the "idle" mode, and allows the PSC to treat subsequent incoming calls to active users appropriately. In addition, it records the "B" channel allocation. This information would be maintained for future use (e.g., in support of Hand-Off). At time sequence event Q21, PSC2 sends an AIN Service Request message to the Service Control Point. This message contains the fixed terminal's identity (UPT, Terminal Number, Personal Communications Service Provider Identification [PCSPID]), and the status of the fixed terminal. Alternatively, the Base Station Telephone Number may be sent to the Service Control Point). At Q22, the Service Control Point receives the message sent by PSC2. This initiates the authentication and security process. At time Q23, the Service Control Point sends an AIN Service Reply message to PSC2. This message contains the derived cipher key (DCK), Terminal Number, user profile and the authorization for service. Alternatively, if PSC2 maintains a record of Base Station Routing Number, active calls, PSC2 may record the DCK at this point for future use (e.g., in support of Hand-Off). At time sequence event Q24, the PSC receives the messages. At time sequence event Q25, the PSC sends a Cipher Information message to the intelligent base station. This message contains the Terminal Number, Base Station Routing Number, DCK, operations code, and acknowledgement. At time sequence event Q26, the Service Control Point sends a Cancel Announcement message to the PSC. At time sequence event Q27, the PSC terminates the announcement. At time sequence event Q28, the PSC sends a Clear message to the Service Control Point. At time sequence event Q29, the Service Control Point sends a Forward Call message to the PSC to route to the proper intelligent base station. This message contains the calling party number, base station, telephone number, the Terminal Number, the UPT, charge number, charge party station type. At time sequence event Q30, PSC2 receives the message sent by the Service Control Point. At time sequence event Q31, PSC2 sends an ISDN Setup message to the intelligent base station. This message contains the "B" channel, DN associated with the "B" channel (or the intelligent base station) as the Called Party Number, the called number in the Called Party Subaddress field, and the Calling Party Number. At time sequence event Q32, the intelligent base station receives the message sent by PSC2. At time sequence event Q33, the intelligent base station sends a Setup message to the fixed terminal. At time sequence event Q34, the intelligent base station sends an ISDN Alerting message to PSC2. At time sequence event Q35, PSC2 receives the alerting notification. PSC2 provides ringing to the calling party and starts the Ringing Timer. At time sequence event Q36, the ringing timer expires when PSC2 has not received a response to its alerting. The PSC detects a Ringing Timeout trigger. PSC2 continues to provide ringing to the calling party and the user. At time sequence event Q37, PSC2 sends an AIN Timeout message to the Service Control Point which includes the Calling Party Number, Called Party Number (DN of the intelligent base station that is serving the terminal), Called Party Subaddress, UPT or Terminal Number. At time sequence event Q38, the Service Control Point receives the message sent by PSC2. The Service Control Point determines if the fixed terminal subscribes to Call Forwarding on "No Answer" and if the service is active. At time sequence event Q39, if the user subscribes to Call Forwarding on "No Answer", and the service is active, the Service Control Point sends a Forward Call message to PSC2 which contains the following parameters Calling Party ID (DN assigned to the call), and the Called Party ID (DN2) to which the PSC is instructed to forward the call), Terminal Number and UPT. The transaction with the PSC is then closed. If the call forwarding service is not active or subscribed to by the fixed terminal, the Service Control Point sends a continue message to PSC2 and closes the transaction with PSC2. At time sequence event Q40, PSC2 receives the message. At time sequence event Q41, PSC2 sends an ISDN Disconnect message to the intelligent base station. At time sequence event Q42, the intelligent base station receives the message. At time sequence event Q43, the intelligent base station sends a Release message to the fixed terminal. At time sequence event Q44, the fixed terminal sends a Release Complete message to the intelligent base station. At time sequence event Q45, the intelligent base station sends an ISDN Release message to PSC2. At time sequence event Q46, PSC2 receives the message sent by the intelligent base station. At time sequence event Q47, PSC2 sends an ISDN Release Complete to the intelligent base station. At time sequence event Q48, PSC2 forwards the call to DN2.

For the specific functional message requirements for incoming call—no answer, see Appendix I, attached hereto and made a part hereof.

Figure 23:
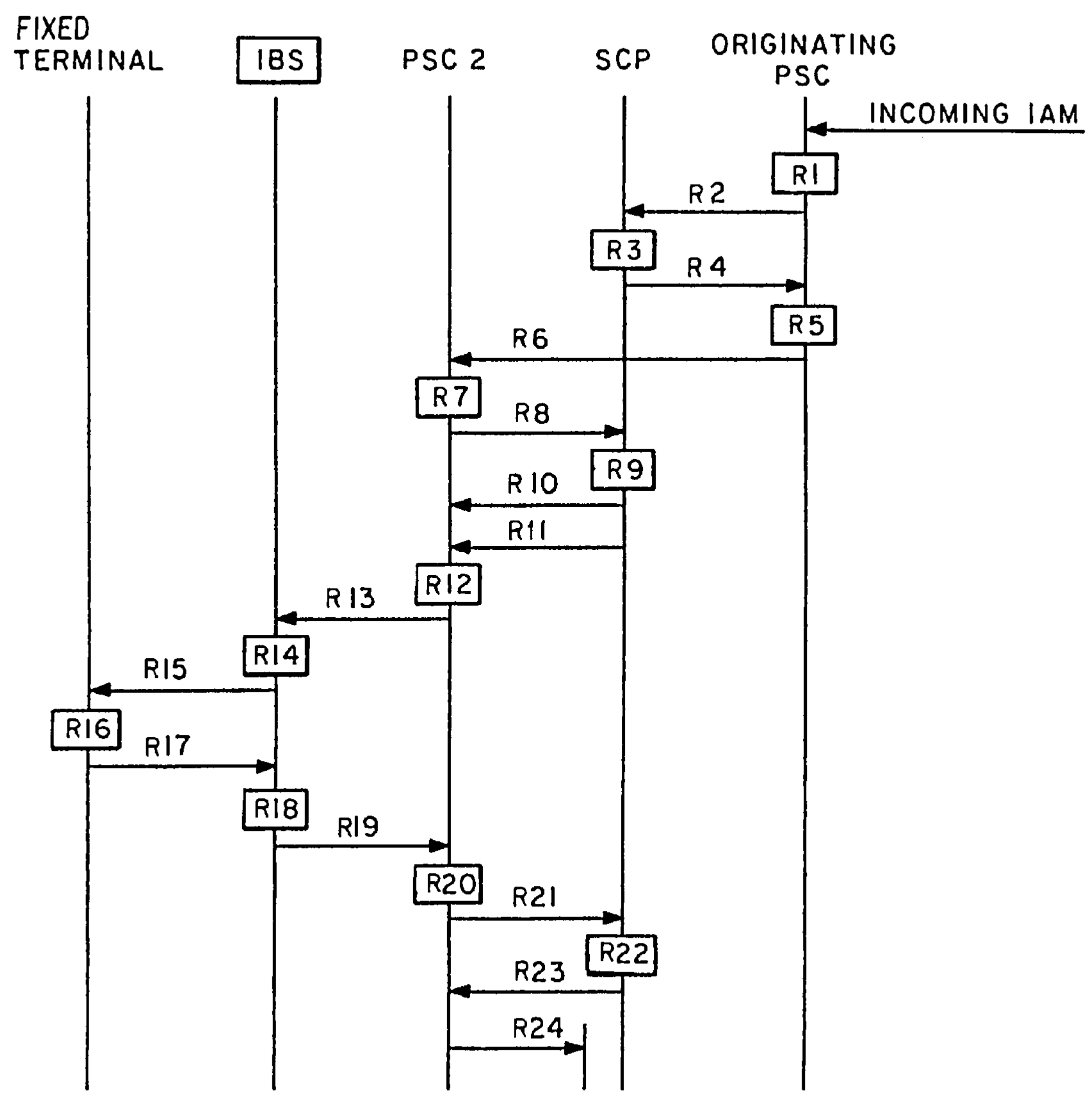
FIG. 23 is a time sequence diagrammatic flowchart illustrating an incoming call to an intelligent fixed terminal and the situation is "user busy" in the wireless digital personal communications system in accordance with the present invention.

FIG. 23 is a time sequence diagrammatic flowchart illustrating an incoming call to a busy intelligent fixed terminal and the situation is "user busy" in the wireless digital personal communications system in accordance with the present invention with respect to the specific call and signaling flows. The incoming call—"user busy" scenario illustrates how the intelligent base station and PSC interact to handle this particular scenario. The call and signaling flow follows the normal call delivery process until the intelligent base station in the zone are instructed to page the fixed terminal. In this case, one intelligent base station is aware that the fixed terminal is already active. It thus immediately sends a page response indicating the "user busy" situation. The PSC receives the message, and in turn sends a service request to the Service Control Point indicating a call was attempted to a "busy" fixed terminal. The Service Control Point can then direct the appropriate treatment (e.g., Call Forwarding). Again, once the PSC has received an indication from the intelligent base station serving the fixed terminal, it can ignore the responses from the other intelligent base station.

Referring to FIG. 23, at time sequence event R1, a telephone number is called which results in the Originating PSC receiving an Initial Address Message (IAM). The Originating PSC determines that it is a call that results in a trigger at the Info_Analyzed trigger detection point. The trigger criteria is the Called Party Number. At time sequence event R2, the Originating PSC sends an AIN Infomation Analyzed message to the Service Control Point. This message contains the called number as the Called Party ID and the Carrier ID (if available). At time sequence event R3, the Service Control Point receives the message sent by the Originating PSC and the Service Control Point translates the called number into the appropriate Terminal Number, Personal Communications Service Provider Identification (PCSPID) and Base Station Routing Number that is currently serving the fixed terminal. At time sequence event R4, the Service Control Point sends an AIN Route Analyzed message to the Originating PSC. This message contains the Called Party ID (Base Station Routing Number), the Called Party Subaddress ID (Terminal Number and Personal Communications Service Provider Identification [PCSPID]), the Redirecting Party ID (called number) and Primary Carrier (IC2) of the fixed terminal. At time sequence event R5, the Originating PSC receives the routing message from the Service Control Point. At time sequence event R6, the Originating PSC generates an ISUP Initial Address Message (IAM). This message contains the Called Party Number (Base Station Routing Number), the Terminal Number and Personal Communications Service Provider Identification [PCSPID]), Redirecting Number (called UPT), Calling Party Number, and the IC. This message is sent, the appropriate trunk seized, etc. At time sequence event R7, PSC2 receives the IAM. The Base Station Routing Number is a termination attempt trigger. Alternatively, PSC2 determines the appropriate zone based on the Base Station Routing Number. If PSC2 maintains a record of active terminals, PSC2 determines the status of the terminal. If the terminal is "idle", it continues. If terminal is "busy" goes to time sequence event R21. At time sequence event R8, the PSC sends a Terminating Attempt message to the Service Control Point. This message contains the Calling Party ID, the Base Station Routing Number, the Terminal Number, the PCSPID, and the called UPT. At time sequence event R9, the Service Control Point receives the message from the PSC2. At time sequence event R10, the Service Control Point sends a Play Announcement message to the PSC2. The message contains the Announcement ID. This can be any available announcement including ringing. At time sequence event R11, the Service Control Point sends a Paging Request message to the PSC2 to start the paging process. This message contains the Terminal Number, the zone routing number, an operations code, the PCSPID, and the UPT (if provided). At time sequence event R12, the PSC2 receives the messages and determines the intelligent base station associated with the zone routing. At time sequence event R13, PSC2 sends an ISDN non-call associated Page Request message to each intelligent base station in the zone. This message contains the called UPT, Terminal Number and personal communications service provider identification (PCSPID). At time sequence event R14, each intelligent base station receives the message sent by PSC2. At time sequence event R15, the intelligent base station broadcasts a Page Request to alert the fixed terminal. At time sequence event R16, the fixed terminal recognizes that it is being paged by the intelligent base station. At time sequence event R17, the fixed terminal sends a Page Response message to the appropriate intelligent base station (i.e., the intelligent base station with the better, higher quality signal and having available channels). This message contains the fixed terminal's identity (UPT, Terminal Number and Personal Communications Service Provider Identification [Service Control Point ID]). The intelligent base station receives the reply and associates an available "B" channel with the terminal for future use. At time sequence event R18, the intelligent base station receives the message. At time sequence event R19, the intelligent base station sends an ISDN non-call associated Page Response message to PSC2. This message contains the Terminal Number, the "B" channel to be used to deliver the call, terminal status of "busy", Base Station Routing Number and the UPT. At time sequence event R20, PSC2 receives the messages. Once PSC2 receives the message with status "user busy", PSC2 disregards all other messages of status "not here". At time sequence event R21, PSC2 sends an AIN Service Request message to the Service Control Point. This message contains the fixed terminal's identity (UPT, Terminal Number, Personal Communications Service Provider Identification (PCSPID)) and the status "user busy". At time sequence event R22, the Service Control Point receives the message. The Service Control Point determines that a call has been attempted to a busy user, and initiates the appropriate treatment (e.g., Call Forwarding). At time sequence event R23, the Service Control Point sends a Forward Call message to PSC2. This message contains the Calling Party ID, the forward to telephone number, Terminal Number, and UPT. At time sequence event R24, PSC2 receives the message and forwards the call.

For the specific functional message requirements for incoming call—user busy, see Appendix I, attached hereto and made a part hereof.

Figure 24:
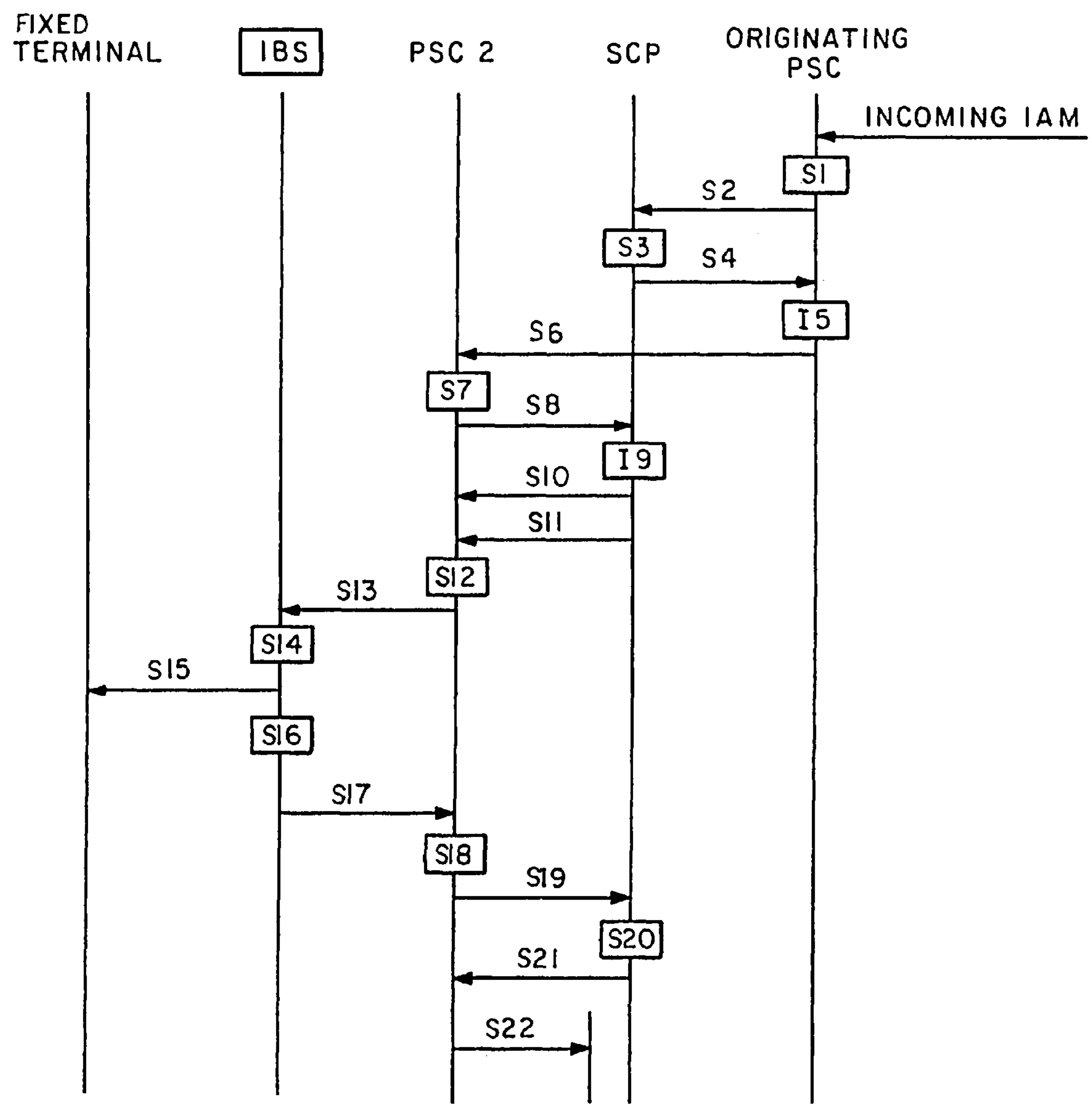
FIG. 24 is a time sequence diagrammatic flowchart illustrating an incoming call to an intelligent fixed terminal and the situation is "user not here" in the wireless digital personal communications system in accordance with the present invention.

FIG. 24 is a time sequence diagrammatic flowchart illustrating an incoming call to an intelligent fixed terminal and the situation is "user not here" in the wireless digital personal communications system in accordance with the present invention with respect to the specific call and signaling flows.

The incoming call—"not here" scenario illustrates how the PSC handles the particular scenario where the fixed terminal does not respond to a page. This is a case where the fixed terminal has either powered "OFF", which in turn allows for the condition where there is no deregistration. The call and signaling flows follows the normal call delivery process until all of the intelligent base station have responded to the PSC with the result of the page. In this case, all of the intelligent base station respond with the fixed terminal "not here". As a result the PSC determines that the fixed terminal is not responding to the page and thus sends a service request to the Service Control Point indicating a call was attempted to a fixed terminal that is no longer present. The Service Control Point can then direct the appropriate treatment (e.g., Call Forwarding).

Referring to FIG. 24, at time sequence event S1, a telephone number is called which results in the Originating PSC receiving an Initial Address Message (IAM). The Originating PSC determines that it is a call that results in a trigger at the Info_Analyzed trigger detection point. The trigger criteria is the Called Party Number. At time sequence event S2, the Originating PSC sends an AIN Infomation Analyzed message to the Service Control Point. The message contains the called number as the Called Party ID, and the Carrier ID (if available). At time sequence event S3, the Service Control Point receives the message sent by the Originating PSC and the Service Control Point translates the called number into the appropriate Terminal Number, Personal Communications Service Provider Identification (PCSPID), and Base Station Routing Number that is currently serving the specific fixed terminal. At time sequence event S4, the Service Control Point sends an AIN Route Analyzed message to the Originating PSC. This message contains the Called Party ID (Base Station Routing Number), the Called Party Subaddress ID (Terminal Number and Personal Communications Service Provider Identification (PCSPID)), the Redirecting Party ID (called number), and Primary Carrier (IC2) of the fixed terminal. At time sequence event S5, the Originating PSC receives the routing message sent by the Service Control Point. At time sequence event S6, the Originating PSC generates an ISUP Initial Address Message (IAM). This message contains the Called Party Number (Base Station Routing Number), the Terminal Number and Personal Communications Service Provider Identification (PCSPID)), Redirecting Number (called UPT), Calling Party Number, and the IC. This message is sent, the appropriate trunk seized, etc. At time sequence event S7, PSC2 receives the IAM. The Base Station Routing Number is a termination attempt trigger. Alternatively, PSC2 determines the appropriate zone based on the Base Station Routing Number. If PSC2 maintains a record of active fixed terminals, PSC2 determines the status of the fixed terminal. If the fixed terminal is "idle", it continues. At time sequence event S8, the PSC2 sends a Terminating Attempt message to the Service Control Point. This message contains the Calling Party ID, the Base Station Routing Number, the Terminal Number, the PCSPID and the called UPT. At time sequence event S9, the Service Control Point receives the message. At time sequence event S10, the Service Control Point sends a Play Announcement message to the PSC2. This message contains the Announcement ID. This can be any available announcement including ringing. At time sequence event S11, the Service Control Point sends a Paging Request message to the PSC2 to start the paging process. This message contains the Terminal Number, the Zone Routing Number, an Operations Code, the PCSPID and the UPT (if provided). At time sequence event S12, the PSC2 receives the messages and determines the intelligent base station associated with the Zone Routing. At time sequence event S13, PSC2 sends an ISDN non-call associated Page Request message to each intelligent base station in the zone. This message contains the called UPT, Terminal Number and Personal Communications Service Provider Identification (PCSPID). At time sequence event S14, each intelligent base station receives the message. At time sequence event S15, the intelligent base station broadcasts a Page Request to alert the fixed terminal. At time sequence event S16, the response timer expires in the intelligent base station. At time sequence event S17, the intelligent base station sends an ISDN non-call associated Page Response message to PSC2. This message contains the Terminal Number, the "B" channel to be used to deliver the call, fixed terminal status of "not here", Base Station Routing Number and the UPT. At time sequence event S18, PSC2 receives the messages. Once PSC2 receives a response from each intelligent base station in the zone, PSC2 determines that the fixed terminal is not present. At time sequence event S19, PSC2 sends an AIN Service Request message to the Service Control Point. This message contains the fixed terminal's identity (UPT, Terminal Number, Personal Communications Service Provider Identification (PCSPID), and the status of "not here". At time sequence event S20, the Service Control Point receives the message. The Service Control Point determines that a call has been attempted to a user that is not available, and initiates the appropriate treatment (e.g., Call Forwarding). At time sequence event S21, the Service Control Point sends a Forward Call message to PSC2. This message contains the Calling Routing ID, the Forward-To-Telephone Number, Terminal Number and UPT. At time sequence event S22, PSC2 receives the message and forwards the call.

For the specific functional message requirements for incoming call—not here, see Appendix I, attached hereto and made a part hereof.

Figure 25:
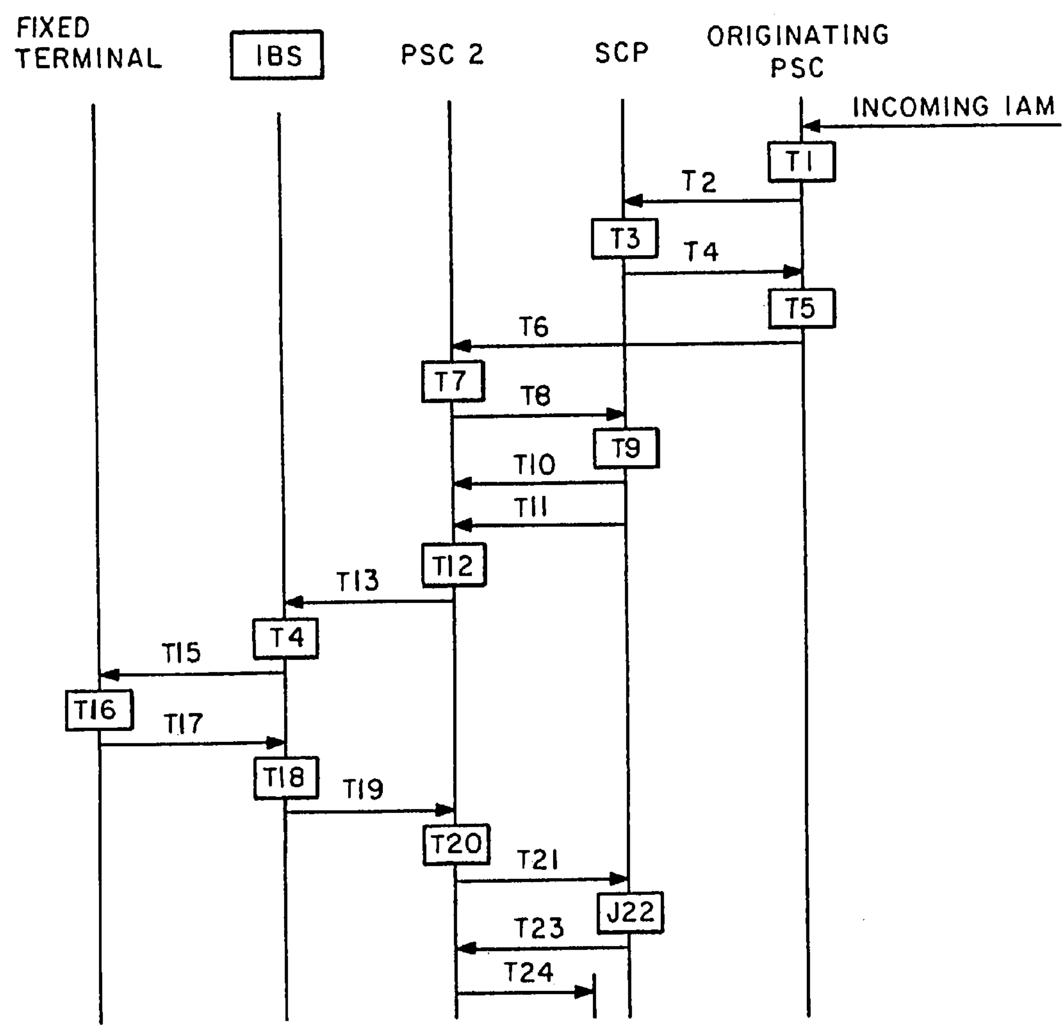
FIG. 25 is a time sequence diagrammatic flowchart illustrating an incoming call to an intelligent fixed terminal and the situation is "interface busy" in the wireless digital personal communications system in accordance with the present invention.

FIG. 25 is a time sequence diagrammatic flowchart illustrating an incoming call to an intelligent fixed terminal and the situation is "interface busy" in the wireless digital personal communications system in accordance with the present invention with respect to the specific call and signaling flows. The incoming call—"interface busy" scenario illustrates how the intelligent base station and PSC interact to handle this particular scenario. The call and signaling flows follow the normal call delivery process until an intelligent base station receives a response to the page. In this situation, an intelligent base station does not have an available "B" channel to the PSC. Accordingly, the intelligent base station thus sends a page response indicating the "interface busy" situation. The PSC receives the message, and in turn sends a service request to the Service Control Point indicating an intelligent base station responded to a page for an incoming call, however, the "interface busy" condition exists. The Service Control Point can then direct the appropriate treatment (e.g., Call Forwarding).

Referring to FIG. 25, at time sequence event T1, a telephone number is called which results in the Originating PSC receiving an Initial Address Message (IAM). The Originating PSC determines that it is a call that results in a trigger at the Info_Analyzed trigger detection point. The trigger criteria is the Called Party Number. At time sequence event T2, the Originating PSC sends an AIN Information Analyzed message to the Service Control Point. This message contains the called number as the Called Party ID and the Carrier ID (if available). At time sequence event T3, the Service Control Point receives the message sent by the Originating PSC and the Service Control Point translates the called number into the appropriate Terminal Number, Personal Communications Service Provider Identification (PCSPID), and Base Station Routing Number that is currently serving the specific fixed terminal. At time sequence event T4, the Service Control Point sends an AIN Route Analyzed message to the Originating PSC. This message contains the Called Party ID (Base Station Routing Number), the Called Party Subaddress ID (Terminal Number and Personal Communications Service Provider Identification (PCSPID)), the Redirecting Party ID (called number) and Primary Carrier (IC2) of the fixed terminal. At time sequence event T5, the Originating PSC receives the routing message sent by the Service Control Point. At time sequence event T6, the Originating PSC generates an ISUP Initial Address Message (IAM). This message contains the Called Party Number (Base Station Routing Number), the Terminal Number and Personal Communications Service Provider Identification (PCSPID)), Redirecting Number (called UPT), Calling Party Number, and the IC. This message is sent, the appropriate trunk seized, etc. At time sequence event T7, PSC2 receives the IAM. The Base Station Routing Number is a termination attempt trigger. Alternatively, PSC2 determines the appropriate zone based on the Base Station Routing Address. If PSC2 maintains a record of active fixed terminals, PSC2 determines the status of the fixed terminal. If the fixed terminal is "idle", PSC2 continues. At time sequence event T8, the PSC2 sends a Terminating Attempt message to the Service Control Point. This message contains the Calling Party ID, the Base Station Routing Number, the Terminal Number, the PCSPID, and the called UPT. At time sequence event T9, the Service Control Point receives the message. At time sequence event T10, the Service Control Point sends a Play Announcement message to the PSC2. This message contains the Announcement ID. This can be any available announcement including ringing. At time sequence event T11, the Service Control Point sends a Paging Request message to the PSC2 to start the paging process. This message contains the Terminal Number, the Zone Routing Number, an Operations Code, the PCSPID, and the UPT (if provided). At time sequence event T12, the PSC2 receives the messages and determines the intelligent base station associated with the Zone Routing. At time sequence event T13, PSC2 sends an ISDN non-call associated Page Request message to each intelligent base station in the zone. This message contains the called UPT, Terminal Number, and Personal Communications Service Provider Identification (PCSPID). At time sequence event T14, each intelligent base station received the message. At time sequence event T15, the intelligent base station broadcasts a Page Request to alert the fixed terminal. At time sequence event T16, the fixed terminal recognizes that is being paged. At time sequence event T17, the fixed terminal sends a Page Response to message the appropriate intelligent base station (i.e., the intelligent base station with the better, higher quality signal and having available channels). This message contains the fixed terminal's identity (UPT, Terminal Number, and Personal Communications Service Provider Identification (PCSPID). At time sequence event T18, the intelligent base station receives the message, but has no "B" channels available. At time sequence event T19, the intelligent base station sends an ISDN non-call associated Page Response message to PSC2. This message contains the Terminal Number, fixed terminal status of "interface busy", Base Station Routing Number, and the UPT. At time sequence event T20, PSC2 receives the messages. Once PSC2 receives the message with the status "interface busy" the PSC2 disregards all other messages of status "not here". Alternatively, the PSC2 receives all sent responses with status "not here" indicated; consequently, since the message was not sent to those intelligent base stations with no "B" channels available, the PSC2 sends a service request of "interface busy" to the Service Control Point. At time sequence event T21, PSC2 sends an AIN Service Request message to the Service Control Point. This message contains the fixed terminal's identity (UPT, Terminal Number, Personal Communications Service Provider Identification (PCSPID), and the status "user busy". At time sequence event T22, the Service Control Point receives the message. The Service Control Point determines that a call has been attempted to a busy user, and initiates the appropriate treatment (e.g., Call Forwarding). At time sequence event T23, the Service Control Point sends a Forward Call message to PSC2. This message contains the Calling Routing ID, the Forward-To-Telephone Number, Terminal Number, and UPT. At time sequence event T24, PSC2 receives the message and forwards the call.

For the specific functional message requirements for incoming call—"interface busy", see Appendix I, attached hereto and made a part hereof.

Figure 26:
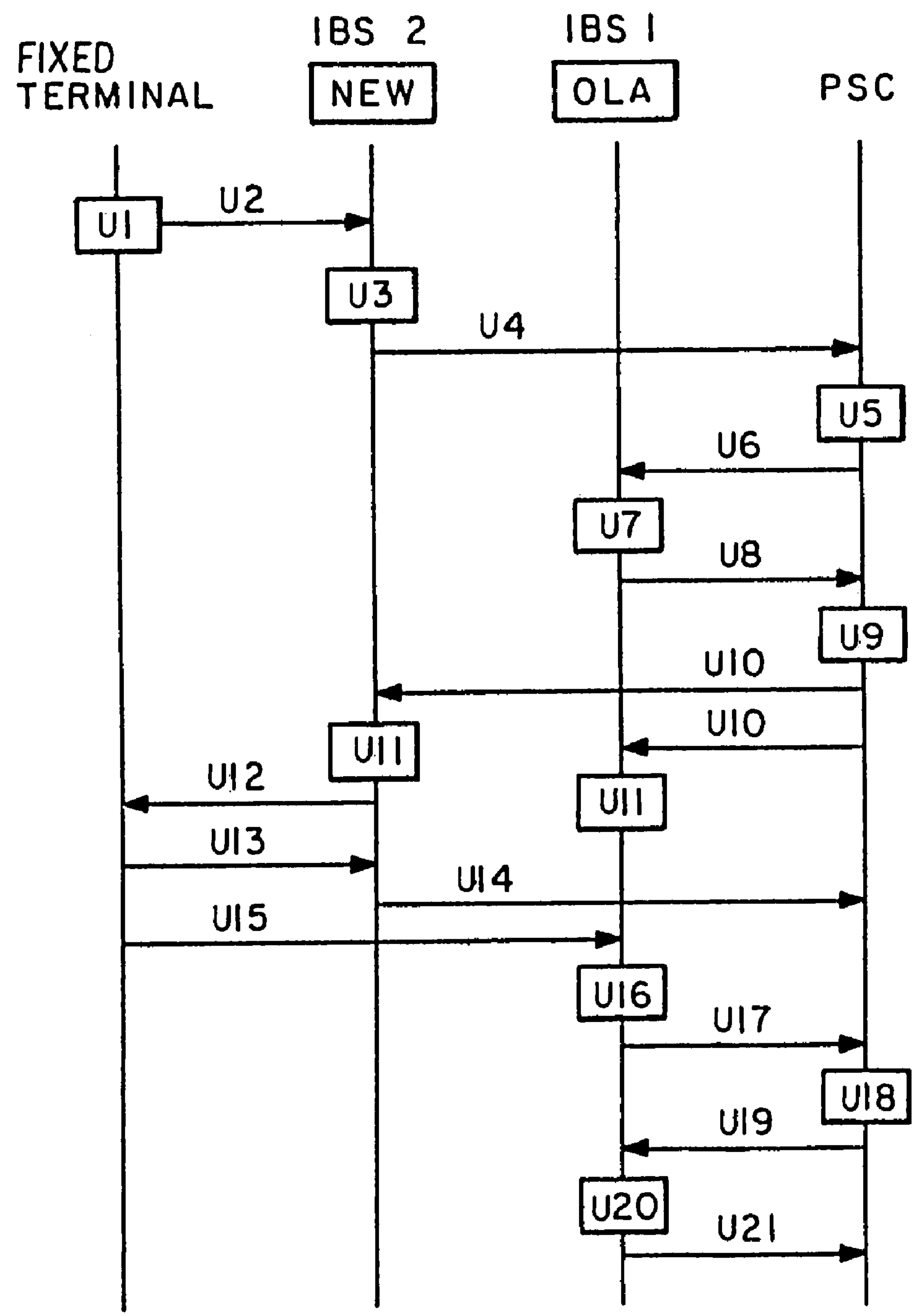
FIG. 26 is a time sequence diagrammatic flowchart illustrating the hand-off of an intelligent fixed terminal in the wireless digital personal communications system in accordance with the present invention.

FIG. 26 is a time sequence diagrammatic flowchart illustrating the hand-off of an intelligent fixed terminal in the wireless digital personal communications system in accordance with the present invention with respect to the specific call and signaling flows. The intelligent base station architecture utilizes the PSC for all hand-off(s). Thus, the particular scenario developed for hand-off targets maximum functionality in the PSC in support of a hand-off. The particular scenario illustrated assumes an intra-PSC hand-off; however, it is anticipated that it can be extended to an inter-switch hand-off with appropriate modifications to ISUP to carry the necessary information. In this situation, the hand-off process is driven by the fixed terminal determining that its signal quality is poor and that a hand-off to a higher quality signal from another intelligent base station is necessary. The fixed terminal initiates the hand-off by sending a request to a new intelligent base station with a higher quality signal (and having available channels). This request contains the Base Station Routing Number of the old intelligent base station, fixed Terminal Number and Personal Communications Service Provider Identification (PCSPID). The new intelligent base station initiates a call to the PSC indicating a hand-off, and carrying the information conveyed from the fixed terminal. When the PSC receives the request, it allocates a three port bridge (or utilizes some other method) for the hand-off, and sends a setup indicating hand-off to the old intelligent base station with the appropriate information. The old intelligent base station (IBS-old) validates the request, and responds with a connect message to the PSC containing the derived cipher key (DCK). The PSC connects the bridge and sends indications to the new and old intelligent base stations, along with the DCK to the new intelligent base station (IBS-new). The actual transfer then takes place and the old call is disconnected.

Referring to FIG. 26, at time sequence event U1, the fixed terminal detects an intelligent base station that could provide a better link than its current intelligent base station. At time sequence event U2, the fixed terminal sends a Setup with the external hand-off request indicator to the better intelligent base station. At time sequence event U3, the IBS-new receives the Setup message and determines that it is a Hand-Off request. This request contains the Base Station Routing Number of the IBS-old and the fixed terminal's identity (UPT, Terminal Number and Personal Communications Service Provider Identification (PCSPID)). At time sequence event U4, the IBS-new sends an ISDN Setup message to the PSC. This message contains the Feature Activator=Hand-Off, Calling Party Number of the interface, Called Party Number (Base Station Routing Number), the Terminal Number and Personal Communications Service Provider Identification (PCSPID) in the Called Party Subaddress Number. At time sequence event U5, the PSC receives the message and determines that it is a Hand-Off request. The PSC allocates a 3-port bridge (or some other method) for the hand-off. Alternatively, if the PSC maintains a record of active fixed terminals, it determines the "B" channel and DCK associated with the fixed terminal. The PSC would send a Setup ACKnowledge message to the IBS-new containing the DCK. Additionally, the PSC would record the new "B" channel to provide for subsequent hand-offs. At time sequence event U6, the PSC sends an ISDN Setup message to the IBS-old. This message contains a Feature Activator=Hand-Off, the Called Party Number (DN of IBS interface), Calling Party Number (DN of IBS-new), and Called Party Subaddress Number (Terminal Number and Personal Communications Service Provider Identification (PCSPID)). At time sequence event U7, the IBS-old receives the request and validates it. At time sequence event U8, IBS-old returns an ISDN Connect message to the PSC. This message contains the "B" channel and the Derived Cipher Key (DCK). At time sequence event U9, the PSC receives the message and the PSC recognizes this as a positive response to the hand-off attempt and thus connects the parties. At time sequence event U10, the PSC then sends an ISDN Connect message to the IBS-new. This contains the DCK. The PSC also sends a Connect Acknowledge to the IBS-old. At time sequence event U11, the IBS-new receives the message and recognizes that the hand-off is ready. The IBS-old receives the message. At time sequence event U12, the IBS-new sends a Setup Acknowledge message to the fixed terminal. At time sequence event U13, the fixed terminal sends a Notification message to the IBS-new to indicate its readiness. At time sequence event U14, the IBS-new sends a Connect Acknowledge to the PSC when the fixed terminal is ready. At time sequence event U15, the fixed terminal sends a disconnect message to the IBS-old. At time sequence event U16, the IBS-old receives a disconnect indication from the fixed terminal. At time sequence event U17, the IBS-old sends an ISDN Disconnect message to the PSC. At time sequence event U18, the PSC receives the message and the PSC in turn tears down the IBS-old "B" channel and releases the connection. At time sequence event U19, the PSC sends an ISDN Release message to the IBS-old. At time sequence event U20, the IBS-old receives the release message. At time sequence event U21, the IBS-old sends an ISDN Release Complete to the PSC to conclude the hand-off.

For the specific functional message requirements for hand-off, see Appendix I, attached hereto and made a part hereof.

A specific embodiment of a novel system for a wireless digital personal communications system with distributed logic present in the intelligent portable terminals, the intelligent fixed terminals, the intelligent base stations, and the public switched telephone network (or any switched network), and having a simplified system architecture along with a standard digital interface has been described for the purposes of illustrating the manner in which the present invention may be used and made. The features of the present invention which are believed to be novel are set forth below with particularity in the appended claims. It should be understood that the implementations of other variations and modifications of the invention in its various aspects will be apparent to those skilled in the art and that the present invention is not limited thereto by the specific embodiment described. It is therefore contemplated to cover by the present invention any and all modifications, variations or equivalents that fall within the true spirit and scope of the basic underlying principles disclosed and claimed herein.

APPENDIX I

| MESSAGE | ELEMENTS |
|---|---|
| I. FUNCTIONAL MESSAGE REQUIREMENTS FOR TERMINAL REGISTRATION: | |
| LOCate__REQuest | (PCSPID, Portable or Fixed Terminal Number, Universal Personal Telephone Number) Portable or Fixed Terminal-->IBS |
| REGister | (PCSPID, Portable or Fixed Terminal Number, Universal Personal Telephone Number, Base Station Routing Number, Operation Code) IBS-->PSC |
| NCA__REQuest | (PCSPID, Portable or Fixed Terminal Number, Base Station Routing number, Universal Personal Telephone Number, Operation Code) PSC-->SCP |
| NCA__RESponse | (Portable or Fixed Terminal Number, Acknowledgment code) SCP-->PSC |
| REGCANC | (PCSPID, Portable or Fixed Terminal Number, Universal Personal Telephone Number) Home SCP-->Previously Visited SCP |
| REGCANC__RESponse | (PCSPID, Portable or Fixed Terminal Number, Universal Personal Telephone Number) Previously Visited SCP-->Home SCP |
| RELease__COMplete | (Portable or Fixed Terminal Number, Acknowledgement code) PSC-->IBS |
| LOCate__ACCept | (PCSPID, Portable or Fixed Terminal Number, Universal Personal Telephone Number) IBS-->Portable or Fixed Terminal |
| LOCate__REJect | (Reject reason) IBS-->Portable or Fixed Terminal |
| II. FUNCTIONAL MESSAGE REQUIREMENTS FOR IBS AUTHENTICATION AND SECURITY KEY DERIVATION: | |
| NCA__REQuest | (PCSPID, Portable or Fixed Terminal Number, Universal Personal Telephone Number, RS, RAND__F, Base Station Routing Number) SCP-->PSC |
| REGister | (PCSPID, Portable of Fixed Terminal Number, Universal Personal Telephone Number, RS, RAND__F, Base Station Routing Number) PSC-->IBS |
| AUTHentication__REQuest | (RS, RAND__F) IBS-->Portable or Fixed Terminal |
| AUTHentication__REPly | (RES1) Portable or Fixed Terminal-->IBS |
| RELease__COMPlete | (RES1, Base Station Routing Number, Portable or Fixed Terminal Number, Operation Code) IBS-->PSC |
| NCA__RESPonse | (RES1, Base Station Routing Number, Portable or Fixed Terminal Number, Operation Code) PSC-->SCP |
| III. FUNCTIONAL MESSAGE REQUIREMENTS FOR TERMINAL REGISTRATION --- ROAMING: | |
| LOCate__REQuest | (PCSPID, Portable or Fixed Terminal Number, Universal Personal Telephone Number) Portable or Fixed Terminal-->IBS |
| REGister | (PCSPID, Portable or Fixed Terminal Number, Universal Personal Telephone Number, Base Station Routing Number) IBS-->PSC |

APPENDIX I-continued

| MESSAGE | ELEMENTS |
|---|---|
| NCA__REQuest | (PCSPID, Portable or Fixed Terminal Number, Base Station Routing Number, Universal Personal Telephone Number, Operation Code) PSC-->Visited SCP |
| REGNOT | (PCSPID, Portable or Fixed Terminal Number, Universal Personal Telephone Number, Base Station Routing Number) Visited SCP-->Home SCP |
| REGNOT | (PCSPID, Portable or Fixed Terminal Number, Universal Personal Telephone Number, User Profile, RS, KS) Home SCP-->Visited SCP |
| REGCANC | (PCSPID, Portable or Fixed Terminal Number, Universal Personal Telephone Number) Home SCP-->Previously Visited SCP |
| REGCANC | (PCSPID, Portable or Fixed Terminal Number, Universal Personal Telephone Number) Previously Visited SCP-->Home SCP |
| NCA__RESPonse | (Portable of Fixed Terminal Number, Acknowledgement Code, Base Station Routing Number) Visited SCP-->PSC |
| RELease__COMPlete | (Portable or Fixed Terminal Number, Acknowledgement Code, Base Station Routing Number) PSC-->IBS |
| LOCate__ACCept | (PCSPID, Portable or Fixed Terminal Number, Universal Personal Telephone Number) IBS-->Portable or Fixed Terminal |
| LOCate__REJect | (Reject reason) IBS-->Portable or Fixed Terminal |
| IV. FUNCTIONAL MESSAGE REQUIREMENTS FOR IBS AUTHENTICATION AND SECURITY KEY DERIVATION FOR ROAMING MODE OF OPERATION: | |
| NCA__REQuest | (PCSPID, Portable or Fixed Terminal Number, Universal Personal Telephone Number, RS, RAND__F, Base Station Routing Number) SCP-->PSC |
| Register__REQuest | (PCSPID, Portable or Fixed Terminal Number, Universal Personal Telephone Number, RS, RAND__F, Base Station Routing Number) PSC-->IBS |
| AUTHentication__REQuest | (RS, RAND__F) IBS-->Portable or Fixed Terminal |
| AUTHentication__REPly | (RES1, Base Station Routing Number, Portable or Fixed Terminal Number, Operation Code) Portable or Fixed Terminal-->IBS |
| RELease__COMplete | (RES1, Base Station Routing Number, Portable or Fixed Terminal Number, Operation Code) IBS-->PSC |
| NCA__RESPonse | (RES1, Base Station Routing Number, Portable or Fixed Terminal Number, Operation Code) PSC-->SCP |
| V. FUNCTIONAL MESSAGE REQUIREMENTS FOR IBS CALL ORIGINATION: | |
| SETup | (PCSPID, Portable or Fixed Terminal Number, Universal Personal Telephone Number) Portable or Fixed Terminal-->IBS |
| REGister | (PCSPID, Portable or Fixed Terminal Number, Universal Personal Telephone Number, Channel Identification, Base Station Routing Number, Operation Code) IBS-->PSC |

APPENDIX I-continued

| MESSAGE | ELEMENTS |
|---|---|
| NCA__REQuest | (PCSPID, Portable or Fixed Terminal Number, Universal Personal Telephone Number, Base Station Routing Number, Operation Code) PSC-->SCP |
| NCA__RESPonse | (Portable or Fixed Terminal Number, Derived Cipher Key, User Profile, Reason Code, Base Station Routing Number, Operation Code) SCP-->PSC |
| SERVice__REPly | (Portable or Fixed Terminal Number, Derived Cipher Key, Reason Code, Base Station Routing Number, Operation Code) PSC-->IBS |
| CIPHer__REQuest | (Cipher Information) IBS-->Portable or Fixed Terminal |
| SETup | (Channel Identification, Base Station Telephone Number, PCSPID, Portable or Fixed Terminal Number or Universal Personal Telephone Number) IBS-->PSC |
| SETup__ACKnowledge | (Progress Indicator, Signal) PSC-->IBS |
| SETup__ACKnowledge | (PCSPID, Portable or Fixed Terminal Number or Universal Personal Telephone Number, Progress Indicator, Signal) IBS-->Portable or Fixed Terminal |
| INFOrmation | (Portable or Fixed Terminal Number, Universal Personal Telephone Number, Keypad) Portable of Fixed Terminal-->IBS |
| INFOrmation | (Portable or Fixed Terminal Number or Universal Personal Telephone Number, Keypad) IBS-->PSC |
| INFOrmation__COLLected | (Portable or Fixed Terminal Number or Universal Personal Telephone Number, Keypad, Base Station Telephone Number) PSC-->SCP |
| ANALyze__ROUTe | (Portable or Fixed Terminal Number or Universal Personal Telephone Number, Called Party Number, Primary Carrier, Charge Number, Charge Party Station Type) SCP-->PSC |
| INITial__ADDRess__MESSage | (Calling Party Number, Called Party Number) PSC-->Called Office |
| CALL__PROCeeding | (Portable or Fixed Terminal Number or Universal Personal Telephone Number) PSC-->IBS |
| ADDRess__COMPlete | (Calling Party Number, Called Party Number) Called Office-->PSC |
| ALERTing | (Portable or Fixed Terminal Number or Universal Personal Telephone Number, Progress Indicator, Signal) PSC-->IBS |
| ALERTing | (Portable or Fixed Terminal Number or Universal Personal Telephone Number, Progress Indicator, Signal) IBS-->Portable or Fixed Terminal |
| ANSWer | (Calling Party Number, Called Party Number) Called Office-->PSC |
| CONNect | (Portable or Fixed Terminal Number or Universal Personal Telephone Number, Connected Number, Progress Indicator, Notification Indicator) PSC-->IBS |
| CONNect | (Progress Indicator) IBS-->Portable or Fixed Terminal |
| CONNect__ACKnowledge | IBS-->PSC |

APPENDIX I-continued

| MESSAGE | ELEMENTS |
|---|---|
| VI. FUNCTIONAL MESSAGE REQUIREMENTS FOR INCOMING CALL: | |
| INFOrmation__ANALyzed | (Calling Party Number, Called Party Number, Primary Carrier) AIN EndOffice/Tandem-->SCP |
| ANALyze__ROUTe | (Portable or Fixed Terminal Number, PCSPID, Universal Personal Telephone Number, Calling Party Number, Primary Carrier, Base Station Routing Number) SCP-->AIN EndOffice/Tandem |
| INITial__ADDRess__MESSage | (Calling Party Number, PCSPID, Portable or Fixed Terminal Number, Universal Personal Telephone Number, Base Station Routing Number) AIN EndOffice/Tandem-->PSC |
| TERMinating ATTempt | (Calling Party Number, Base Station Routing Number, PCSPID, Portable or Fixed Terminal Number, Universal Personal Telephone Number) PSC-->SCP |
| Send__To__RESource | (Announcement ID, play announcement) SCP-->PSC |
| NCA REQuest | (UPT, Portable or Fixed Terminal Number, Zone Routing Number, Operation Code, PCSPID) SCP-->IBS |
| REGister | (PCSPID, Portable or Fixed Terminal Number, Universal Personal Telephone Number, Operation Code) PSC-->IBS |
| PAGE__REQuest | (Portable or Fixed Terminal Number, Universal Personal Telephone Number) IBS-->Portable or Fixed Terminal |
| PAGE__RESPonse | (Portable or Fixed Terminal Number, Universal Personal Telephone Number) Portable or Fixed Terminal-->IBS |
| RELease__COMPlete | (Portable or Fixed Terminal Number, Channel Identification, Portable or Fixed Terminal Status, Universal Personal Telephone Number, Base Station Routing Number, UPT) IBS-->PSC |
| NCA__RESPonse | (PCSPID, Portable or Fixed Terminal Number, Universal Personal Telephone Number, Portable or Fixed Terminal Status, Base Station Telephone Number) PSC--->SCP |
| NCA__DATA | (Portable or Fixed Terminal Number, Derived Cipher Key, User Profile, Reason Code, Base Station Routing Number) SCP-->PSC |
| REGister | (Portable or Fixed Terminal Number, Base Station Routing Number, DCK, Operation Code, Reason Code) PSC-->IBS |
| CANCEL__RESource-Event | SCP-->PSC |
| RESource__Clear | SCP-->PSC |
| FORWard__CALL | (Base Station Telephone Number, Portable or Fixed Terminal Number, Universal Personal Telephone Number, Calling Party Number, UPT, Charge Number, Charge Party Station Type) SCP-->PSC |
| SETup | (PCSPID, Portable or Fixed Terminal Number, Universal Personal Telephone Number, Calling Party Number) PSC-->IBS |

APPENDIX I-continued

| MESSAGE | ELEMENTS |
|---|---|
| SETup | (Portable or Fixed Terminal Number, Universal Personal Telephone Number, Calling Party Number, Basic Service, Display, Signal) IBS-->Portable or Fixed Terminal |
| ALERTing | (Progress Indicator, Signal) IBS-->PSC |
| CONNect | Portable or Fixed Terminal-->IBS |
| CONNect | IBS-->PSC |
| ANSWer | PSC-->AIN EndOffice/Tandem |
| CONNect_ACKnowledge | PSC-->IBS |
| VII. FUNCTIONAL MESSAGE REQUIREMENTS FOR INCOMING CALL --- NO ANSWER: | |
| INFOrmation_ANALyzed | (Calling Party Number, Called Party Number, Primary Carrier) AIN EndOffice/Tandem-->SCP |
| ANALyze_ROUTe | (Portable or Fixed Terminal Number, PCSPID, Universal Personal Telephone Number, Calling Party Number, Primary Carrier, Base Station Routing Number) SCP-->AIN EndOffice/Tandem |
| INITial_ADDRess_MESSage | (Calling Party Number, PCSPID, Portable or Fixed Terminal Number, Universal Personal Telephone Number, Base Station Routing Number) AIN EndOffice/Tandem-->PSC |
| TERMinating ATTempt | (Calling Party Number, Base Station Routing Number, PCSPID, Portable or Fixed Terminal Number, Universal Personal Telephone Number) PSC-->SCP |
| Send_To_RESource | (Announcement ID, play announcement) SCP-->PSC |
| NCA_REQuest | (UPT Terminal Number, Zone Routing Number, Operation Code, PSCPID) SCP-->PSC |
| REGister | (PCSPID, Portable or Fixed Terminal Number, Universal Personal Telephone Number, Operation Code) PSC-->IBS |
| PAGE_REQuest | (Portable or Fixed Terminal Number, Universal Personal Telephone Number) IBS-->Portable or Fixed Terminal |
| PAGE_RESPonse | (Portable of Fixed Terminal Number, Universal Personal Telephone Number) Portable of Fixed Terminal-->IBS |
| RELease_COMPlete | (Portable or Fixed Terminal Number, Channel Identification, Portable or Fixed Terminal Status, Universal Personal Telephone Number, Base Station Routing Number, UPT) IBS-->PSC |
| NCA_RESPonse | (PCSPID, Portable or Fixed Terminal Number, Universal Personal Telephone Number, Portable or Fixed Terminal Status, Base Station Telephone Number) PSC-->SCP |
| NCA_DATA | (Portable or Fixed Terminal Number, Derived Cipher Key, User Profile, Reason Code, Base Station Routing Number) SCP-->PSC |
| REGister | (Portable of Fixed Terminal Number, Base Station Routing Number, DCK, Operation Code, Reason Code) PSC-->IBS |
| CANCEL_RESource-Event | SCP-->PSC |
| RESource_Clear | SCP-->PSC |

APPENDIX I-continued

| MESSAGE | ELEMENTS |
|---|---|
| Forward_Call | (Base Station Telephone Number, Portable or Fixed Terminal Number, Universal Personal Telephone Number, Calling Party Number, UPT, Charge Number, Charge Party Station Type) SCP-->PSC |
| SETup | (PCSPID, Portable of Fixed Terminal Number, Universal Personal Telephone Number, Calling Party Number) PSC-->IBS |
| SETup | (Portable or Fixed Terminal Number, Universal Personal Telephone Number, Calling Party Number, Basic Service, Display, Signal) IBS-->Portable or Fixed Terminal |
| ALERTing | (Progress Indicator, Signal) IBS-->PS |
| T_NO_ANSWER | (Calling Party Number, Base Station Telephone Number, Portable or Fixed Terminal Number or Universal Personal Telephone Number) PSC-->SCP |
| FORWard_CALL | (Calling Party Number, Forward to Telephone Number, Portable or Fixed Terminal Number or Universal Personal Telephone Number) SCP-->PSC |
| DISConnect | (Cause) PSC-->IBS |
| RELease | (Release Reason) IBS-->Portable or Fixed Terminal |
| RELease_COMplete | Portable or Fixed Terminal-->IBS |
| RELease | IBS-->PSC |
| RELease_COMPlete | PSC-->IBS |
| VIII. FUNCTIONAL MESSAGE REQUIREMENTS FOR INCOMING --- CALL USER BUSY: | |
| INFOrmation_ANALyzed | (Calling Party Number, Called Party Number, Primary Carrier) AIN EndOffice/Tandem-->SCP |
| ANALyze_ROUTe | (Portable or Fixed Terminal Number, PCSPID, Universal Personal Telephone Number, Calling Party Number, Primary Carrier, Base Station Routing Number) SCP-->AIN EndOffice/Tandem |
| INITial_ADDRess_MESSage | (Calling Party Number, PCSPID, Portable or Fixed Terminal Number, Universal Personal Telephone Number, Base Station Routing Number) AIN EndOffice/Tandem-->PSC |
| TERMinating ATTempt | (Calling Party Number, Base Station Routing Number, PCSPID, Portable or Fixed Terminal Number, Universal Personal Telephone Number) PSC-->SCP |
| Send_To_RESource | (Announcement ID, play announcement) SCP-->PSC |
| NCA_REQuest | (UPT, Portable or Fixed Terminal Number, Zone Routing Number, Operation Code, PCSPID) SCP-->PSC |
| REGister | (PCSPID, Portable or Fixed Terminal Number, Universal Personal Telephone Number, Operation Code) PSC-->IBS |
| PAGE_REQuest | (Portable or Fixed Terminal Number, Universal Personal Telephone Number) IBS-->Portable or Fixed Terminal |
| PAGE_RESPonse | (Portable or Fixed Terminal Number, Universal Personal Telephone Number) Portable or Fixed Terminal-->IBS |

APPENDIX I-continued

| MESSAGE | ELEMENTS |
|---|---|
| RELease__COMPlete | (Portable or Fixed Terminal Number, Channel Identification, Portable or Fixed Terminal Status, Universal Personal Telephone Number, Base Station Routing Number, UPT) IBS-->PSC |
| NCA__RESPonse | (PCSPID, Portable or Fixed Terminal Number, Universal Personal Telephone Number, Portable or Fixed Terminal Status, Base Station Telephone Number) PSC-->SCP |
| FORWard__CALL | (Calling Party Number, Forward to Telephone Number, Portable or Fixed Terminal Number, Universal Personal Telephone Number) SCP-->PSC |
| IX. FUNCTIONAL MESSAGE REQUIREMENTS FOR INCOMING CALL --- NOT HERE: | |
| INFOrmation__ANALyzed | (Calling Party Number, Called Party Number, Primary Carrier) AIN EndOffice/Tandem-->SCP |
| ANALyze__ROUTe | (Portable or Fixed Terminal Number, PCSPID, Universal Personal Telephone Number, Calling Party Number, Primary Carrier, Base Station Routing Number) SCP-->AIN EndOffice/Tandem |
| INITial__ADDRess__MESSage | (Calling Party Number, PCSPID, Portable or Fixed Terminal Number, Universal Personal Telephone Number, Base Station Routing Number) AIN EndOffice/Tandem-->PSC |
| TERMinating ATTempt | (Calling Party Number, Base Station Routing Number, PCSPID, Portable or Fixed Terminal Number, Universal Personal Telephone Number) PSC-->SCP |
| Send__To__RESource | (Announcement ID, Play Announcement) SCP-->PSC |
| NCA REQuest | (UPT, Portable or Fixed Terminal Number, Zone Routing Number, Operation Code, PSCPID) SCP-->PSC |
| REGister | (PSCPID, Portable or Fixed Terminal Number, Universal Personal Telephone Number, Operation Code) PSC-->IBS |
| PAGE__RESPonse | (Portable or Fixed Terminal Number, Universal Personal Telephone Number) IBS-->Portable or Fixed Terminal |
| RELease__COMplete | (Portable or Fixed Terminal Number, Channel Identification, Portable or Fixed Terminal Status, Universal Personal Telephone Number, Base Station Routing Number, UPT) IBS-->PSC |
| NCA__RESPonse | (PCSPID, Portable or Fixed Terminal Number, Universal Personal Telephone Number, Portable or Fixed Terminal Status, Base Station Telephone Number) PSC-->SCP |
| FORWard__CALL | (Calling Party Number, Forward to Telephone Number, Portable or Fixed Terminal Number, Universal Personal Telephone Number) SCP-->PSC |
| X. FUNCTIONAL MESSAGE REQUIREMENTS FOR INCOMING CALL --- INTERFACE BUSY: | |
| INFOrmation__ANALyzed | (Calling Party Number, Called Party Number, Primary Carrier) AIN EndOffice/Tandem-->SCP |

APPENDIX I-continued

| MESSAGE | ELEMENTS |
|---|---|
| ANALyze__ROUTe | (Portable or Fixed Terminal Number, PCSPID, Universal Personal Telephone Number, Calling Party Number, Primary Carrier, Base Station Routing Number) SCP-->AIN EndOffice/Tandem |
| INITial__ADDRess__MESSage | (Calling Party Number, PCSPID, Portable or Fixed Terminal Number, Universal Personal Telephone Number, Base Station Routing Number) AIN EndOffice/Tandem-->PSC |
| TERMinating__ATTempt | (Calling Party Number,Base Station Routing Number, PCSPID, Portable or Fixed Terminal Number, Universal Personal Telephone Number) PSC-->SCP |
| Send__To__RESource | (Announcement ID, Play Announcement) SCP-->PSC |
| NCA REQuest | (UPT, Portable or Fixed Terminal Number, Zone Routing Number, Operation Code, PSCPID) SCP-->PSC |
| REGister | (PCSPID, Portable or Fixed Terminal Number, Universal Personal Telephone Number, Operation Code) PSC-->IBS |
| PAGE__REQuest | (Portable or Fixed Terminal Number, Universal Personal Telephone Number) IBS-->Portable or Fixed Terminal |
| PAGE__RESPonse | (Portable or Fixed Terminal Number, Universal Personal Telephone Number) Portable or Fixed Terminal-->IBS |
| RELease__COMplete | (Portable or Fixed Terminal Number, Channel Identification, Terminal Status, Universal Personal Telephone Number, Base Station Routing Number, UPT) IBS-->PSC |
| NCA__RESponse | (PCSPID, Portable or Fixed Terminal Number, Universal Personal Telephone Number, Portable or Fixed Terminal Status, Base Station Telephone Number) PSC-->SCP |
| FORWard__CALL | (Calling Party Number, Forward to Telephone Number, Portable or Fixed Terminal Number, Universal Personal Telephone Number) SCP-->PSC |
| XI. FUNCTIONAL MESSAGE REQUIREMENTS FOR HAND-OFF | |
| SETup | (External Handoff Request, Base Station Telephone Number-Old, PCSPID, Portable or Fixed Terminal Number, Universal Personal Telephone Number) Portable or Fixed Terminal-->IBS-new |
| SETup | (Feature Activation-Handoff Request, Base Station Telephone Number-New, Base Station Telephone Number-Old, Portable or Fixed Terminal Number, Universal Personal Telephone Number) IBS-new-->PSC |
| SETup | (Feature Activation-Handoff Request, Base Station Telephone Number-Old, Base Station Telephone Number New, Portable or Fixed Terminal Number, Universal Personal Telephone Number) PSC-->IBS-old |
| CONNect | (Channel Identification, Derived Cipher Key) IBS-old-->PSC |
| CONNect | (Derived Cipher Key) PSC-->IBS-new |

APPENDIX I-continued

| MESSAGE | ELEMENTS |
|---|---|
| CONNect__ACKnowledge | PSC-->IBS-old |
| SETup__ACKnowledge | (Portable or Fixed Terminal Number, Universal Personal Telephone Number, Information Type) |
| | IBS-new-->Portable or Fixed Terminal |
| FACility | (Feature Activate) |
| | Portable or Fixed Terminal-->IBS-new |
| CONNect__ACKnowledge | IBS-new-->PSC |
| RELease | (Release Reason) |
| | Portable or Fixed Terminal->IBS-old |
| DISConnect | (Cause) |
| | IBS-old-->PSC |
| RELease | (Cause, Feature Indication) |
| | PSC-->IBS-old |
| RELease COMPlete | IBS-old-->PSC |

XII. PCS DEFINITIONS

| | |
|---|---|
| Acknowledgement Code | This is utilized to commute a specific functional components that indicate the success or failure of a registration request. |
| Base Station Routing Number | The routing telephone number of a group of base stations. |
| Base Station Telephone Number | The actual routing number of a single Base Station "B" Channel |
| Base Station Telephone Number - old | The actual routing number of a single Base Station "B" Channel that has current control of a call that requires hand-off. |
| Base Station Telephone Number - new | The actual routing number of a single Base Station "B" Channel that has been selected to request a hand-off from the network. |
| Basic Service: | This allows the user to specify the basic aspects of the service requested. |
| Called Party Number | The telephone number of the called party. |
| Calling Party Number | The telephone number of the calling party. |
| Cause | A value that is returned to describe why a message was received. |
| Channel Identification | The "B" channel that is identified for use during a specific call. |
| Cipher Information | Information relevant to enabling the cipher, identifying the algorithm to be utilized and the cipher type. |
| Connected Number | This is delivered to calling party if the called number was re-directed in any way. |
| Derived Cipher Key(DCK) | The key utilized for ciphering and deciphering data delivered over the air. |
| Display | This provides information that can be viewed with a terminal capable of displaying incoming data. |
| External Handoff Request | This element signal that a hand-off process should be started. |
| Feature Activate | This signals that a specific feature should be activated. |
| Feature Activation | Utilized to activate a specific feature as specified. |
| Feature Indication | Provided to signal an indication of a feature. |
| Forward to Telephone Number | This provides routing information relevant to a re-routing of a specific call. |
| Information Type | Defines specific call information. |
| Keypad | This element provides call information related to user dialed digits. |
| Notification Indicator | Provides a notice that a certain event has occurred. |
| Operation Code | Informs functional component regarding operation to perform. |

APPENDIX I-continued

| MESSAGE | ELEMENTS |
|---|---|
| Personal Communications Service Provider Identity (PCSPID) | The Numerical representation of a specific PCS provider. |
| Primary Carrier | This specifies the user primary inter-exchange carrier. |
| Progress Indicator | This provides certain indications during a call process. |
| Reason Code | Provides information regarding a rejection during a Service Request operation. |
| Reject Reason | Provides information regarding the rejection of an operation. |
| Release Reason | Provides information relevant to a release signal. |
| Random Number fixed part (RAND__F) | A number, generated at the SCP that is utilized to calculate responses to an issued challenge and derive a cipher key agreement. |
| Result 1 (RES1) | A result that is calculated at the terminal and passed over the network to prove authenticity of the terminal. |
| RS | A specific value that is resident in the Providers database that is utilized to calculate responses to a challenge to achieve authentication and to derive a cipher key agreement. |
| Session Key (KS) | This is derived at the users home SCP and in the users terminal handset and is utilized to calculate responses to a challenge to achieve authentication and to derive a cipher key agreement. |
| Signal | Provides the appropriate indication that defines the signal that is being applied. |
| Terminal Number (Portable or Fixed) | This is the unique identification of the Coded terminal. It takes the Decimal form of a 10 digit telephone number (UPT or NAMP) that has been provisioned into the terminal device by the PCSPID. |
| Terminal Status (Portable or Fixed) | This element commutes the status of a user or the interface such as user busy, user not here, interface busy. |
| Universal Personal Telephone Number (UPT) | A telephone number that is not tied to any Coded geographic location. It provides the user with personal mobility. |
| User Profile | This user profile carries user specific information, such as: No Answer Timer, billing number, carrier selection, class of service, calling restrictions, billing rate, charge type, deregistration time-out, vertical services, etc. |

What is claimed:

1. A wireless digital personal communications system, said system having a plurality of predetermined areas of radio cell coverage, said system having incoming and outgoing calling capability for either voice/data/image information, or any combination thereof, said system having an ISDN interface which allows for the interconnection and switching of wireless traffic through a switched network and for connecting at least one radio cell with a switched network, said system having a service control point data base using transaction application protocols, said system having intercell hand-off provided through distributed logic that is resident in the portable handset terminals, distributed logic that is resident in the fixed terminals, distributed logic that is resident in the radio cell base stations, and distributed logic that is resident at predetermined locations in the switched network, said system comprising in combination:

a plurality of radio cell base station means, each radio cell base station means having a predetermined radio cell coverage area, each radio cell base station means having means for receiving and transmitting signal messages and a plurality of communications messages, each radio cell base station means including:

means for digital communications with the ISDN interface;

means for assigning a communications channel to a specific portable handset terminal means in the coverage area from a plurality of available communications channels;

means for assigning a communications channel to a specific fixed terminal means in the coverage area from a plurality of available communications channels;

means for registration of a portable handset terminal means within a radio cell coverage area for incoming or outgoing calling on the assigned communications channel;

means for registration of a fixed terminal means within a radio cell coverage area for incoming or outgoing calling on the assigned communications channel;

means for effectuating communications between each portable handset terminal means in said radio cell coverage area and a switched network means; and means for effectuating communications between each fixed terminal means in said radio cell coverage area and a switched network means;

a plurality of portable handset terminal means, each portable handset terminal means operatively disposed with said radio cell base station means, each portable handset terminal means having means for receiving and transmitting signal messages and a plurality of communications messages, each portable handset terminal means including:

means for initially selecting a radio cell base station means for registration of the portable handset terminal means with a switched network means;

means for selecting a communications channel of an operatively disposed radio cell base station means by scanning the available channels, comparing the quality of the signals, and then selecting the communications channel based upon said comparison; and means for seeking and determining an intercell hand-off from an existing radio cell base station means to a second radio cell base station means;

a plurality of fixed terminal means, each fixed terminal means operatively disposed with said radio cell base station means, each fixed terminal means having means for receiving and transmitting signal messages and a plurality of communications messages, each fixed terminal means including:

means for initially selecting a radio cell base station means for registration of the fixed terminal means with a switched network means;

means for selecting a communications channel of an operatively disposed radio cell base station means by scanning the available channels, comparing the quality of the signals, and then selecting the communications channel based upon said comparison; and means for seeking and determining an intercell hand-off from an existing radio cell base station means to a second radio cell base station means;

at least one switched network means, each switched network means operatively disposed with said radio cell base station means, each switched network means including:

means for connecting the digital network to each of the radio cell base station means to the switched network means;

means for effectuating intercell hand-off from a first radio cell coverage area to a second radio cell coverage area;

means for converting a first predetermined digital network protocol to a second protocol for interconnection to a service control point data base means; and means for determining and accepting calls to and from a plurality of switched networks means; and a service control point data base means including:

means for registration of the portable handset terminal means with a specific radio cell coverage area; and means for registration of the fixed terminal means with a specific radio cell coverage area, whereby the personal communications system facilitates interconnection and switching of wireless call traffic through the ISDN interface and the public switched telephone network, or any switched network.

2. The wireless digital personal communications system of claim 1 where the means for converting the first predetermined digital network protocol to a second protocol, said second protocol is a transaction application protocol.

3. The wireless digital personal communications system of claim 2 where said transaction application protocol is the Advanced Intelligent Network (AIN) protocol.

4. The wireless digital personal communications system of claim 2 where said transaction application protocol is the X.25 protocol.

5. The wireless digital personal communications system of claim 1 where the means for registration of the portable handset terminal means includes a means for storing the portable handset terminal feature profiles.

6. The wireless digital personal communications system of claim 1 where the means for registration of the fixed terminal means includes a means for storing the fixed terminal feature profiles.

7. The wireless digital personal communications system of claim 1 where the means for registration of the portable handset terminal means includes a means for storing the portable handset terminal user profiles.

8. The wireless digital personal communications system of claim 1 where the means for registration of the fixed handset terminal means includes a means for storing the fixed terminal user profiles.

9. The wireless digital personal communications system of claim 1 where the radio cell coverage area has a radius of less than 5,280 feet.

10. A wireless digital personal communications system, said system having a plurality of predetermined areas of radio cell coverage, said system having incoming and outgoing calling capability for either voice/data/image information, or any combination thereof, said system having an ISDN interface which allows for the interconnection and switching of wireless traffic through a switched network and for connecting at least one radio cell with a switched network, said system having a service control point data base using transaction application protocols, said system having a predetermined authentication routine for validating a remote device, said system having intercell hand-off provided through distributed logic that is resident in the portable handset terminals, distributed logic that is resident in the fixed terminals, distributed logic that is resident in the radio cell base stations, and distributed logic that is resident at predetermined locations in the switched network, said system comprising in combination:

a plurality of radio cell base station means, each radio cell base station means having a predetermined radio cell coverage area, each radio cell base station means having means for receiving and transmitting signal messages and a plurality of communications messages, each radio cell base station means including:

means for digital communications with the ISDN interface;

means for assigning a communications channel to a specific portable handset terminal means in the coverage area from a plurality of available communications channels;

means for assigning a communications channel to a specific fixed terminal means in the coverage area from a plurality of available communications channels;

means for registration of a portable handset terminal means within a radio cell coverage area for incoming or outgoing calling on the assigned communications channel;

means for registration of a fixed terminal means within a radio cell coverage area for incoming or outgoing calling on the assigned communications channel;

means for effectuating communications between each portable handset terminal means in said radio cell coverage area and a switched network means;

means for effectuating communications between each fixed terminal means in said radio cell coverage area and a switched network means;

means for authenticating each portable handset terminal means in a predetermined manner; and means for authenticating each fixed terminal means in a predetermined manner;

a plurality of portable handset terminal means, each portable handset terminal means operatively disposed with said radio cell base station means, each portable handset terminal means having means for receiving and transmitting signal messages and a plurality of communications messages, each portable handset terminal means including:

means for initially selecting a radio cell base station means for registration of the portable handset terminal means with a switched network means;

means for selecting a communications channel of an operatively disposed radio cell base station means by scanning the available channels, comparing the quality of the signals, and then selecting the communications channel based upon said comparison;

means for seeking and determining an intercell hand-off from an existing radio cell base station means to a second radio cell base station means; and means for authenticating each portable handset terminal means in a predetermined manner;

a plurality of fixed terminal means, each fixed terminal means operatively disposed with said radio cell base station means, each fixed terminal means having means for receiving and transmitting signal messages and a plurality of communications messages, each fixed terminal means including:

means for initially selecting a radio cell base station means for registration of the fixed terminal means with a switched network means;

means for selecting a communications channel of an operatively disposed radio cell base station means by scanning the available channels, comparing the quality of the signals, and then selecting the communications channel based upon said comparison; and means for seeking and determining an intercell hand-off from an existing radio cell base station means to a second radio cell base station means;

at least one switched network means, each switched network means operatively disposed with said radio cell base station means, each switched network means including:

means for connecting the digital network to each of the radio cell base station means to the switched network means;

means for effectuating intercell hand-off from a first radio cell coverage area to a second radio cell coverage area;

means for converting a first predetermined digital network protocol to a second protocol for interconnection to a service control point data base means; and means for determining and accepting calls to and from a plurality of switched networks means; and a service control point data base means including:

means for registration of the portable handset terminal means with a specific radio cell coverage area;

means for registration of the fixed terminal means with a specific radio cell coverage area;

means for authenticating each portable handset terminal means in a predetermined manner; and means for authenticating each fixed terminal means in a predetermined manner, whereby the personal communications system facilitates interconnection and switching of wireless call traffic through the ISDN interface and the public switched telephone network, or any switched network.

11. The wireless digital personal communications system of claim 10 where the means for converting the first predetermined digital network protocol to a second protocol, said second protocol is a transaction application protocol.

12. The wireless digital personal communications system of claim 11 where said transaction application protocol is the Advanced Intelligent Network (AIN) protocol.

13. The wireless digital personal communications system of claim 11 where said transaction application protocol is the X.25 protocol.

14. The wireless digital personal communications system of claim 10 where the means for registration of the portable handset terminal means includes a means for storing the portable handset terminal feature profiles.

15. The wireless digital personal communications system of claim 10 where the means for registration of the fixed terminal means includes a means for storing the fixed terminal feature profiles.

16. The wireless digital personal communications system of claim 10 where the means for registration of the portable handset terminal means includes a means for storing the portable handset terminal user profiles.

17. The wireless digital personal communications system of claim 10 where the means for registration of the fixed handset terminal means includes a means for storing the fixed terminal user profiles.

18. The wireless digital personal communications system of claim 10 where the radio cell coverage area has a radius of less than 5,280 feet.

19. A wireless digital personal communications system, said system having a plurality of predetermined areas of radio cell coverage, said system having incoming and outgoing calling capability for either voice/data/image information, or any combination thereof, said system having an ISDN interface which allows for the interconnection and switching of wireless traffic through a switched network and for connecting at least one radio cell with a switched network, said system having a service control point data base using transaction application protocols, said system having a predetermined authentication and security routine for validating a remote device and for securing communications between a remote device and a radio cell base station means, said system having intercell hand-off provided through distributed logic that is resident in the portable handset terminals, distributed logic that is resident in the fixed terminals, distributed logic that is resident in the radio cell base stations, and distributed logic that is resident at predetermined locations in the switched network, said system comprising in combination:

a plurality of radio cell base station means, each radio cell base station means having a predetermined radio cell coverage area, each radio cell base station means having means for receiving and transmitting signal messages and a plurality of communications messages, each radio cell base station means including:

means for digital communications with the ISDN interface;

means for assigning a communications channel to a specific portable handset terminal means in the coverage area from a plurality of available communications channels;

means for assigning a communications channel to a specific fixed terminal means in the coverage area from a plurality of available communications channels;

means for registration of a portable handset terminal means within a radio cell coverage area for incoming or outgoing calling on the assigned communications channel;

means for registration of a fixed terminal means within a radio cell coverage area for incoming or outgoing calling on the assigned communications channel;

means for effectuating communications between each portable handset terminal means in said radio cell coverage area and a switched network means;

means for effectuating communications between each fixed terminal means in said radio cell coverage area and a switched network means;

means for authenticating each portable handset terminal means in a predetermined manner;

means for authenticating each fixed terminal means in a predetermined manner;

means for securing communications between each portable handset terminal means and said radio cell base station means, said means for security including means for security in accordance with a predetermined encryption and decryption technique; and means for securing communications between each fixed terminal means and said radio cell base station means, said means for security including means for security in accordance with a predetermined encryption and decryption technique;

a plurality of portable handset terminal means, each portable handset terminal means operatively disposed with said radio cell base station means, each portable handset terminal means having means for receiving and transmitting signal messages and a plurality of communications messages, each portable handset terminal means including:

means for initially selecting a radio cell base station means for registration of the portable handset terminal means with a switched network means;

means for selecting a communications channel of an operatively disposed radio cell base station means by scanning the available channels, comparing the quality of the signals, and then selecting the communications channel based upon said comparison;

means for seeking and determining an intercell hand-off from an existing radio cell base station means to a second radio cell base station means;

means for authenticating each portable handset terminal means in a predetermined manner; and means for securing communications between each portable handset terminal means and said radio cell base station means, said means for security including means for security in accordance with a predetermined encryption and decryption technique;

a plurality of fixed terminal means, each fixed terminal means operatively disposed with said radio cell base station means, each fixed terminal means having means for receiving and transmitting signal messages and a plurality of communications messages, each fixed terminal means including:

means for initially selecting a radio cell base station means for registration of the fixed terminal means with a switched network means;

means for selecting a communications channel of an operatively disposed radio cell base station means by scanning the available channels, comparing the quality of the signals, and then selecting the communications channel based upon said comparison;

means for seeking and determining an intercell hand-off from an existing radio cell base station means to a second radio cell base station means;

means for authenticating each fixed terminal means in a predetermined manner; and means for securing communications between each fixed terminal means and said radio cell base station means, said means for security including means for security in accordance with a predetermined encryption and decryption technique;

at least one switched network means, each switched network means operatively disposed with said radio cell base station means, each switched network means including:

means for connecting the digital network to each of the radio cell base station means to the switched network means;

means for effectuating intercell hand-off from a first radio cell coverage area to a second radio cell coverage area;

means for converting a first predetermined digital network protocol to a second protocol for interconnection to a service control point data base means; and means for determining and accepting calls to and from a plurality of switched networks means; and a service control point data base means including:

means for registration of the portable handset terminal means with a specific radio cell coverage area;

means for registration of the fixed terminal means with a specific radio cell coverage area;

means for authenticating each portable handset terminal means in a predetermined manner;

means for authenticating each fixed terminal means in a predetermined manner;

means for securing communications between each portable handset terminal means and said radio cell base station means, said means for security including means for security in accordance with a predetermined encryption and decryption technique; and means for securing communications between each fixed terminal means and said radio cell base station means, said means for security including means for security in accordance with a predetermined encryption and decryption technique, whereby the personal communications system facilitates interconnection and switching of wireless call traffic through the ISDN interface and the public switched telephone network, or any switched network.

20. The wireless digital personal communications system of claim 19 where the means for converting the first predetermined digital network protocol to a second protocol, said second protocol is a transaction application protocol.

21. The wireless digital personal communications system of claim 20 where said transaction application protocol is the Advanced Intelligent Network (AIN) protocol.

22. The wireless digital personal communications system of claim 20 where said transaction application protocol is the X.25 protocol.

23. The wireless digital personal communications system of claim 19 where the means for registration of the portable handset terminal means includes a means for storing the portable handset terminal feature profiles.

24. The wireless digital personal communications system of claim 19 where the means for registration of the fixed terminal means includes a means for storing the fixed terminal feature profiles.

25. The wireless digital personal communications system of claim 19 where the means for registration of the portable handset terminal means includes a means for storing the portable handset terminal user profiles.

26. The wireless digital personal communications system of claim 19 where the means for registration of the fixed handset terminal means includes a means for storing the fixed terminal user profiles.

27. The wireless digital personal communications system of claim 19 where the radio cell coverage area has a radius of less than 5,280 feet.

* * * * *